(12) United States Patent
De Witt et al.

(10) Patent No.: US 11,060,378 B2
(45) Date of Patent: Jul. 13, 2021

(54) HIGH POWER LASER FLOW ASSURANCE SYSTEMS, TOOLS AND METHODS

(71) Applicant: Foro Energy, Inc., Houston, TX (US)

(72) Inventors: Ronald A. De Witt, Katy, TX (US); James P. Nehlsen, E. Stroudsburg, PA (US); Joel F. Moxley, Highlands Ranch, CO (US); Mark S. Zediker, Castle Rock, CO (US); Charles C. Rinzler, Boston, MA (US); Brian O. Faircloth, Evergreen, CO (US); Daryl L. Grubb, Houston, TX (US); Paul D. Deutch, Houston, TX (US)

(73) Assignee: Foro Energy, Inc., Houston, TX (US)

( * ) Notice: Subject to any disclaimer, the term of this patent is extended or adjusted under 35 U.S.C. 154(b) by 0 days.

(21) Appl. No.: 16/807,016

(22) Filed: Mar. 2, 2020

(65) Prior Publication Data
US 2020/0325754 A1 Oct. 15, 2020

Related U.S. Application Data

(63) Continuation of application No. 16/409,815, filed on May 11, 2019, now abandoned, which is a
(Continued)

(51) Int. Cl.
*E21B 37/00* (2006.01)
*E21B 43/00* (2006.01)
(Continued)

(52) U.S. Cl.
CPC ............ *E21B 37/00* (2013.01); *B08B 7/0042* (2013.01); *B08B 9/043* (2013.01); *B23K 26/064* (2015.10); *B23K 26/0652* (2013.01); *B23K 26/106* (2013.01); *B23K 26/127* (2013.01); *B23K 26/1224* (2015.10); *B23K 26/146* (2015.10); *B23K 26/1464* (2013.01); *B23K 26/38* (2013.01); *B23K 26/40* (2013.01); *E21B 7/14* (2013.01); *E21B 10/60* (2013.01);
(Continued)

(58) Field of Classification Search
CPC .......... E21B 37/00; E21B 43/01; E21B 43/00; E21B 37/08; E21B 36/04; E21B 29/02; E21B 10/60; E21B 7/14; B23K 26/1224; B23K 26/146; B23K 26/0652; B23K 26/064; B23K 26/38; B23K 26/1464; B23K 26/127; B23K 26/106; B23K 26/40; B23K 2103/10; B08B 9/043; B08B 7/0042; G21C 17/017
USPC .................................. 166/344, 345, 302, 57
See application file for complete search history.

(56) References Cited

U.S. PATENT DOCUMENTS

| 914,636 | A | * | 3/1909 | Case | ......................... E21D 9/10 175/15 |
| 2,548,463 | A | * | 4/1951 | Blood | ....................... E21B 7/14 116/22 A |

(Continued)

*Primary Examiner* — Edwin J Toledo-Duran
(74) *Attorney, Agent, or Firm* — Glen P. Belvis; Belvis Law, LLC.

(57) ABSTRACT

A high power laser system for providing laser beams in various laser beam patterns along a laser beam path that is positioned to provide for the in situ laser processing of materials in tubulars, such as pipes in a hydrocarbon producing well. Laser treating for providing flow assurance by direct and indirect laser processing of materials interfering with flow.

18 Claims, 20 Drawing Sheets

Related U.S. Application Data continuation of application No. 14/214,304, filed on Mar. 14, 2014, now Pat. No. 10,301,912, which is a continuation-in-part of application No. 13/222,931, filed on Aug. 31, 2011, now abandoned, and a continuation-in-part of application No. 13/565,345, filed on Aug. 2, 2012, now Pat. No. 9,089,928, and a continuation-in-part of application No. 13/347,445, filed on Jan. 10, 2012, now Pat. No. 9,080,425, and a continuation-in-part of application No. 13/403,741, filed on Feb. 23, 2012, now abandoned, and a continuation-in-part of application No. 12/543,986, filed on Aug. 19, 2009, now Pat. No. 8,826,973, and a continuation-in-part of application No. 14/099,948, filed on Dec. 7, 2013, now abandoned.

(60) Provisional application No. 61/786,687, filed on Mar. 15, 2013, provisional application No. 61/786,763, filed on Mar. 15, 2013, provisional application No. 61/378,910, filed on Aug. 31, 2010, provisional application No. 61/605,422, filed on Mar. 1, 2012, provisional application No. 61/431,830, filed on Feb. 7, 2011, provisional application No. 61/446,312, filed on Feb. 24, 2011, provisional application No. 61/153,271, filed on Feb. 17, 2009, provisional application No. 61/106,472, filed on Oct. 17, 2008, provisional application No. 61/102,730, filed on Oct. 3, 2008, provisional application No. 61/090,384, filed on Aug. 20, 2008, provisional application No. 61/734,809, filed on Dec. 7, 2012.

(51) Int. Cl.
```
B23K 26/00      (2014.01)
B23K 26/40      (2014.01)
B08B 7/00       (2006.01)
B23K 26/06      (2014.01)
B23K 26/10      (2006.01)
B23K 26/12      (2014.01)
B23K 26/14      (2014.01)
B23K 26/38      (2014.01)
E21B 7/14       (2006.01)
E21B 10/60      (2006.01)
B23K 26/064     (2014.01)
B23K 26/146     (2014.01)
B08B 9/043      (2006.01)
E21B 29/02      (2006.01)
E21B 36/04      (2006.01)
E21B 37/08      (2006.01)
E21B 43/01      (2006.01)
G21C 17/017     (2006.01)
B23K 103/10     (2006.01)
```
(52) U.S. Cl.
CPC .............. *E21B 29/02* (2013.01); *E21B 36/04* (2013.01); *E21B 37/08* (2013.01); *E21B 43/00* (2013.01); *E21B 43/01* (2013.01); *B23K 2103/10* (2018.08); *G21C 17/017* (2013.01)

(56) References Cited

U.S. PATENT DOCUMENTS

| | | | | |
|---|---|---|---|---|
| 2,673,452 A * | 3/1954 | Glaze | ............ | E21D 20/003 173/152 |
| 2,741,461 A * | 4/1956 | Joy | ............ | E21D 20/003 173/150 |
| 2,742,555 A * | 4/1956 | Murray | ............ | E21B 7/15 173/74 |
| 3,122,212 A * | 2/1964 | Karlovitz | ............ | B28D 1/14 175/14 |
| 3,383,491 A * | 5/1968 | Muncheryan | ............ | B23K 26/02 219/121.63 |
| 3,461,964 A * | 8/1969 | Venghiattis | ............ | E21B 7/15 166/297 |
| 3,493,060 A * | 2/1970 | Van Dyk | ............ | B23K 26/123 175/16 |
| 3,503,804 A * | 3/1970 | Schneider | ............ | B05B 7/228 134/1 |
| 3,539,221 A * | 11/1970 | Gladstone | ............ | E21B 7/15 125/1 |
| 3,544,165 A * | 12/1970 | Snedden | ............ | G01C 7/06 175/15 |
| 3,556,600 A * | 1/1971 | Shoupp et al. | ............ | B28D 1/221 125/1 |
| 3,574,357 A * | 4/1971 | Alexandru | ............ | E21B 17/04 138/149 |
| 3,586,413 A * | 6/1971 | Adams | ............ | B04B 5/0442 359/212.2 |
| 3,652,447 A * | 3/1972 | Yant | ............ | C10G 1/02 201/19 |
| 3,693,718 A * | 9/1972 | Stout | ............ | E21B 7/15 166/302 |
| 3,699,649 A * | 10/1972 | McWilliams | ............ | H01C 17/242 219/121.68 |
| 3,802,203 A * | 4/1974 | Ichise | ............ | E02D 3/12 405/264 |
| 3,820,605 A * | 6/1974 | Barber et al. | ............ | E21B 36/003 166/302 |
| 3,821,510 A * | 6/1974 | Muncheryan | ............ | A61B 18/22 219/121.79 |
| 3,823,788 A * | 7/1974 | Garrison | ............ | E21B 4/00 166/191 |
| 3,871,485 A * | 3/1975 | Keenan, Jr. | ............ | E21B 7/15 175/16 |
| 3,882,945 A * | 5/1975 | Keenan, Jr. | ............ | E21B 4/02 175/107 |
| 3,938,599 A * | 2/1976 | Horn | ............ | E21B 10/46 175/434 |
| 3,960,448 A * | 6/1976 | Schmidt | ............ | E02D 1/022 356/32 |
| 3,973,409 A * | 8/1976 | Asayama | ............ | E02D 5/74 405/259.5 |
| 3,977,478 A * | 8/1976 | Shuck | ............ | E21B 7/15 175/16 |
| 3,992,095 A * | 11/1976 | Jacoby | ............ | E21B 47/0002 356/32 |
| 3,998,281 A * | 12/1976 | Salisbury | ............ | E21B 7/15 175/16 |
| 4,019,331 A * | 4/1977 | Rom | ............ | E02D 3/11 166/288 |
| 4,025,091 A * | 5/1977 | Zeile, Jr. | ............ | F16L 59/166 138/149 |
| 4,026,356 A * | 5/1977 | Shuck | ............ | E21B 7/14 166/245 |
| 4,046,191 A * | 9/1977 | Neath | ............ | E21B 21/001 166/352 |
| 4,047,580 A * | 9/1977 | Yahiro | ............ | E02F 3/90 175/424 |
| 4,057,118 A * | 11/1977 | Ford | ............ | E21B 17/1064 166/152 |
| 4,061,190 A * | 12/1977 | Bloomfield | ............ | E21B 43/2401 166/248 |
| 4,066,138 A * | 1/1978 | Salisbury | ............ | E21B 7/15 175/16 |
| 4,090,572 A * | 5/1978 | Welch | ............ | B23K 26/1476 175/16 |
| 4,113,036 A * | 9/1978 | Stout | ............ | E21B 7/15 166/248 |
| 4,125,757 A * | 11/1978 | Ross | ............ | B23K 26/14 219/121.67 |
| 4,151,393 A * | 4/1979 | Fenneman | ............ | B23K 26/364 219/121.6 |
| 4,162,400 A * | 7/1979 | Pitts, Jr. | ............ | E21B 47/123 250/256 |

(56) References Cited

U.S. PATENT DOCUMENTS

| | | | | |
|---|---|---|---|---|
| 4,189,705 A * | 2/1980 | Pitts, Jr. | E21B 47/123 | 166/66 |
| 4,194,536 A * | 3/1980 | Stine | F16L 59/145 | 138/103 |
| 4,199,034 A * | 4/1980 | Salisbury | E21B 7/15 | 166/308.1 |
| 4,226,559 A * | 10/1980 | Prebensen | E21B 7/025 | 173/184 |
| 4,227,582 A * | 10/1980 | Price | E21B 7/15 | 166/297 |
| 4,228,856 A * | 10/1980 | Reale | E21B 36/02 | 166/256 |
| 4,243,298 A * | 1/1981 | Kao | C03B 37/01205 | 385/128 |
| 4,249,925 A * | 2/1981 | Kawashima | C03B 37/027 | 65/430 |
| 4,252,015 A * | 2/1981 | Harbon | G01L 11/006 | 73/152.18 |
| 4,256,146 A * | 3/1981 | Genini | E21B 17/203 | 138/111 |
| 4,266,609 A * | 5/1981 | Rom | E21B 7/15 | 166/250.15 |
| 4,274,762 A * | 6/1981 | Johnson | E21D 20/00 | 405/259.1 |
| 4,280,535 A * | 7/1981 | Willis | F16L 7/00 | 138/112 |
| 4,281,891 A * | 8/1981 | Shinohara | G02B 6/4212 | 250/552 |
| 4,282,940 A * | 8/1981 | Salisbury | B26F 1/31 | 175/11 |
| 4,313,628 A * | 2/1982 | Duenke | F16L 31/00 | 285/115 |
| 4,332,401 A * | 6/1982 | Stephenson | F16L 59/21 | 138/149 |
| 4,336,415 A * | 6/1982 | Walling | F16L 11/22 | 138/111 |
| 4,340,245 A * | 7/1982 | Stalder | F16L 59/181 | 285/53 |
| 4,344,599 A * | 8/1982 | Herron | E21B 3/04 | 173/28 |
| 4,351,625 A * | 9/1982 | Selestam | E21D 20/003 | 405/303 |
| 4,367,917 A * | 1/1983 | Gray | G02B 6/2558 | 385/102 |
| 4,370,886 A * | 2/1983 | Smith, Jr. | E21B 47/065 | 175/40 |
| 4,374,530 A * | 2/1983 | Walling | E21B 17/20 | 137/355.26 |
| 4,375,164 A * | 3/1983 | Dodge | E21B 47/06 | 374/136 |
| 4,389,645 A * | 6/1983 | Wharton | G02B 6/3604 | 340/854.7 |
| 4,398,850 A * | 8/1983 | Talvensaari | E21D 20/006 | 173/193 |
| 4,415,184 A * | 11/1983 | Stephenson | E21B 17/00 | 138/149 |
| 4,417,603 A * | 11/1983 | Argy | F16L 59/141 | 138/149 |
| 4,436,177 A * | 3/1984 | Elliston | B62D 33/0612 | 180/324 |
| 4,444,420 A * | 4/1984 | McStravick | E21B 17/00 | 138/149 |
| 4,453,570 A * | 6/1984 | Hutchison | E21B 36/003 | 138/149 |
| 4,459,731 A * | 7/1984 | Hutchison | E21B 17/00 | 285/332.3 |
| 4,477,106 A * | 10/1984 | Hutchison | E21B 17/00 | 138/149 |
| 4,504,112 A * | 3/1985 | Gould | G02B 6/4436 | 219/121.63 |
| 4,522,464 A * | 6/1985 | Thompson | G02B 6/4436 | 385/107 |
| 4,531,552 A * | 7/1985 | Kim | F16L 59/16 | 138/113 |
| 4,533,814 A * | 8/1985 | Ward | B23K 26/282 | 219/121.63 |
| 4,565,351 A * | 1/1986 | Conti | H02G 1/081 | 138/108 |
| 4,588,037 A * | 5/1986 | Combet | E21D 20/003 | 173/192 |
| 4,662,437 A * | 5/1987 | Renfro | E21B 17/00 | 166/248 |
| 4,690,212 A * | 9/1987 | Termohlen | H01R 13/523 | 166/65.1 |
| 4,694,865 A * | 9/1987 | Tauschmann | F16L 59/06 | 138/113 |
| 4,708,533 A * | 11/1987 | Leppanen | E21D 20/028 | 137/355.12 |
| 4,725,116 A * | 2/1988 | Spencer | G02B 6/3604 | 385/26 |
| 4,732,509 A * | 3/1988 | Leppanen | E21D 20/028 | 405/259.5 |
| 4,741,405 A * | 5/1988 | Moeny | E21B 7/15 | 175/16 |
| 4,770,493 A * | 9/1988 | Ara | G02B 6/06 | 385/102 |
| 4,774,420 A * | 9/1988 | Sutton | H03K 17/567 | 327/109 |
| 4,793,383 A * | 12/1988 | Gyory | F16L 59/12 | 138/114 |
| 4,830,113 A * | 5/1989 | Geyer | E21B 17/206 | 166/369 |
| 4,860,654 A * | 8/1989 | Chawla | E21B 43/117 | 102/306 |
| 4,860,655 A * | 8/1989 | Chawla | E21B 43/117 | 102/306 |
| 4,872,520 A * | 10/1989 | Nelson | E21B 10/5673 | 175/430 |
| 4,924,870 A * | 5/1990 | Wlodarczyk | A61B 5/02154 | 600/480 |
| 4,952,771 A * | 8/1990 | Wrobel | A61B 18/20 | 219/121.67 |
| 4,989,236 A * | 1/1991 | Myllymaki | H04B 14/004 | 370/296 |
| 4,997,250 A * | 3/1991 | Ortiz, Jr. | B23K 26/06 | 219/121.75 |
| 5,003,144 A * | 3/1991 | Lindroth | E21C 37/00 | 219/679 |
| 5,004,166 A * | 4/1991 | Sellar | B02C 19/18 | 241/1 |
| 5,033,545 A * | 7/1991 | Sudol | B08B 9/035 | 134/167 C |
| 5,049,738 A * | 9/1991 | Gergely | E21B 49/08 | 250/255 |
| 5,084,617 A * | 1/1992 | Gergely | E21B 49/005 | 250/227.23 |
| 5,086,842 A * | 2/1992 | Cholet | B05B 1/267 | 134/167 C |
| 5,107,936 A * | 4/1992 | Foppe | E21B 7/14 | 175/11 |
| 5,114,279 A * | 5/1992 | Bjerngren | E21D 20/006 | 405/259.1 |
| 5,121,872 A * | 6/1992 | Legget | B21C 37/08 | 228/148 |
| 5,125,061 A * | 6/1992 | Marlier | G02B 6/4416 | 174/70 R |
| 5,125,063 A * | 6/1992 | Panuska | G02B 6/4405 | 385/109 |
| 5,128,882 A * | 7/1992 | Cooper | E21B 49/00 | 250/253 |
| 5,140,664 A * | 8/1992 | Bosisio | G02B 6/4492 | 385/100 |
| 5,163,321 A * | 11/1992 | Perales | E21B 17/206 | 374/136 |
| 5,165,825 A * | 11/1992 | Wallin | E21D 20/003 | 405/259.6 |
| 5,168,940 A * | 12/1992 | Foppe | E21B 7/14 | 175/11 |

(56) References Cited

U.S. PATENT DOCUMENTS

| | | | | |
|---|---|---|---|---|
| 5,172,112 A * | 12/1992 | Jennings | E21B 47/0001 | 166/336 |
| 5,212,755 A * | 5/1993 | Holmberg | G02B 6/4429 | 385/104 |
| 5,269,377 A * | 12/1993 | Martin | E21B 17/003 | 166/385 |
| 5,285,204 A * | 2/1994 | Sas-Jaworsky | E21B 17/203 | 175/40 |
| 5,348,097 A * | 9/1994 | Giannesini | E21B 17/206 | 166/385 |
| 5,351,533 A * | 10/1994 | Macadam | E21B 19/22 | 166/316 |
| 5,353,875 A * | 10/1994 | Schultz | E21B 43/116 | 166/297 |
| 5,355,967 A * | 10/1994 | Mueller | E21B 10/60 | 175/339 |
| 5,356,081 A * | 10/1994 | Sellar | B23K 26/032 | 241/1 |
| 5,396,805 A * | 3/1995 | Surjaatmadja | E21B 47/06 | 356/32 |
| 5,411,081 A * | 5/1995 | Moore | E21B 17/20 | 166/120 |
| 5,411,105 A * | 5/1995 | Gray | E21B 21/02 | 175/69 |
| 5,413,045 A * | 5/1995 | Miszewski | E21B 43/1185 | 102/201 |
| 5,419,188 A * | 5/1995 | Rademaker | E21B 17/203 | 367/35 |
| 5,435,351 A * | 7/1995 | Head | E21B 17/206 | 138/111 |
| 5,435,395 A * | 7/1995 | Connell | E21B 17/025 | 166/384 |
| 5,463,711 A * | 10/1995 | Chu | G02B 6/4416 | 174/70 R |
| 5,469,878 A * | 11/1995 | Pringle | E21B 17/20 | 137/155 |
| 5,479,860 A * | 1/1996 | Ellis | E21B 43/1185 | 102/202.7 |
| 5,483,988 A * | 1/1996 | Pringle | E21B 17/20 | 137/155 |
| 5,500,768 A * | 3/1996 | Doggett | G01N 21/274 | 359/652 |
| 5,503,014 A * | 4/1996 | Griffith | E21B 17/203 | 166/250.17 |
| 5,503,370 A * | 4/1996 | Newman | E21B 17/206 | 254/134.3 FT |
| 5,505,259 A * | 4/1996 | Wittrisch | E21B 47/00 | 166/250.01 |
| 5,515,926 A * | 5/1996 | Boychuk | E21B 33/0422 | 166/379 |
| 5,526,887 A * | 6/1996 | Vestavik | E21B 4/00 | 175/213 |
| 5,561,516 A * | 10/1996 | Noble | E21B 19/15 | 250/253 |
| 5,566,764 A * | 10/1996 | Elliston | E21B 19/22 | 166/385 |
| 5,573,225 A * | 11/1996 | Boyle | E21B 17/206 | 254/134.4 |
| 5,577,560 A * | 11/1996 | Coronado | E21B 17/003 | 166/106 |
| 5,583,342 A * | 12/1996 | Ichie | G02B 5/001 | 250/458.1 |
| 5,586,609 A * | 12/1996 | Schuh | E21B 17/18 | 175/215 |
| 5,599,004 A * | 2/1997 | Newman | E21B 17/206 | 254/134.3 FT |
| 5,615,052 A * | 3/1997 | Doggett | G01N 21/274 | 359/642 |
| 5,638,904 A * | 6/1997 | Misselbrook | E21B 17/203 | 166/384 |
| 5,655,745 A * | 8/1997 | Morrill | E21B 33/062 | 166/92.1 |
| 5,694,408 A * | 12/1997 | Bott | H01S 3/2383 | 372/108 |
| 5,707,939 A * | 1/1998 | Patel | C09K 8/34 | 507/127 |
| 5,735,502 A * | 4/1998 | Levett | E21B 33/062 | 251/1.1 |
| 5,757,484 A * | 5/1998 | Miles | G01N 21/718 | 356/318 |
| 5,759,859 A * | 6/1998 | Sausa | G01N 33/227 | 436/106 |
| 5,771,984 A * | 6/1998 | Potter | E21B 7/14 | 175/14 |
| 5,773,791 A * | 6/1998 | Kuykendal | B23K 26/14 | 219/121.84 |
| 5,794,703 A * | 8/1998 | Newman | E21B 4/18 | 166/206 |
| 5,813,465 A * | 9/1998 | Terrell | E21B 4/18 | 166/298 |
| 5,828,003 A * | 10/1998 | Thomeer | E21B 17/06 | 174/69 |
| 5,832,006 A * | 11/1998 | Rice | A61N 5/062 | 372/3 |
| 5,833,003 A * | 11/1998 | Longbottom | E21B 7/007 | 166/298 |
| 5,847,825 A * | 12/1998 | Alexander | G01N 21/718 | 356/318 |
| 5,862,273 A * | 1/1999 | Pelletier | G01N 21/65 | 356/301 |
| 5,862,862 A * | 1/1999 | Terrell | E21B 29/06 | 166/298 |
| 5,864,113 A * | 1/1999 | Cossi | B23K 26/103 | 219/121.67 |
| 5,896,482 A * | 4/1999 | Blee | G02B 6/4427 | 385/107 |
| 5,896,938 A * | 4/1999 | Moeny | E21C 37/18 | 166/249 |
| 5,902,499 A * | 5/1999 | Richerzhagen | B23K 26/06 | 219/121.67 |
| 5,909,306 A * | 6/1999 | Goldberg | G03F 7/704 | 359/337.1 |
| 5,913,337 A * | 6/1999 | Williams | E21B 17/206 | 138/125 |
| 5,924,489 A * | 7/1999 | Hatcher | E21B 29/02 | 166/298 |
| 5,929,986 A * | 7/1999 | Slater | G01J 3/28 | 356/326 |
| 5,938,954 A * | 8/1999 | Onuma | B23K 26/1224 | 219/121.6 |
| 5,963,359 A * | 10/1999 | Shinozaki | G02B 3/06 | 359/326 |
| 5,973,783 A * | 10/1999 | Goldner | G01C 19/722 | 356/465 |
| 5,986,236 A * | 11/1999 | Gainand | B23K 26/046 | 219/121.82 |
| 5,986,756 A * | 11/1999 | Slater | G01N 21/31 | 250/458.1 |
| 6,015,015 A * | 1/2000 | Luft | E21B 17/1007 | 166/241.6 |
| 6,038,363 A * | 3/2000 | Slater | G01J 3/44 | 356/301 |
| 6,059,037 A * | 5/2000 | Longbottom | E21B 4/18 | 166/298 |
| 6,060,662 A * | 5/2000 | Rafie | E21B 17/206 | 174/106 R |
| 6,076,602 A * | 6/2000 | Gano | E21B 4/18 | 166/117.6 |
| 6,084,203 A * | 7/2000 | Bonigen | B23K 26/04 | 219/121.63 |
| 6,092,601 A * | 7/2000 | Gano | E21B 4/18 | 166/117.6 |
| 6,104,022 A * | 8/2000 | Young | H01J 17/40 | 250/214.1 |
| 6,116,344 A * | 9/2000 | Longbottom | E21B 41/0042 | 166/298 |
| 6,135,206 A * | 10/2000 | Gano | E21B 7/061 | 166/297 |

(56) References Cited

U.S. PATENT DOCUMENTS

| | | | | |
|---|---|---|---|---|
| 6,147,754 A * | 11/2000 | Theriault | ............ | E21B 47/0002 356/318 |
| 6,157,893 A * | 12/2000 | Berger | ................. | E21B 49/008 702/12 |
| 6,166,546 A * | 12/2000 | Scheihing | ............... | E21B 49/02 324/376 |
| 6,215,734 B1 * | 4/2001 | Moeny | .................... | E21B 7/007 181/106 |
| 6,227,200 B1 * | 5/2001 | Crump | .................... | A61M 16/0463 128/207.14 |
| 6,250,391 B1 * | 6/2001 | Proudfoot | ............... | E21B 43/38 166/244.1 |
| 6,273,193 B1 * | 8/2001 | Hermann | ................ | E21B 7/128 166/350 |
| 6,275,645 B1 * | 8/2001 | Vereecken | ............. | G01N 33/24 250/254 |
| 6,281,489 B1 * | 8/2001 | Tubel | ...................... | E21B 47/00 166/250.15 |
| 6,301,423 B1 * | 10/2001 | Olson | .................. | G02B 6/02176 385/12 |
| 6,307,191 B1 * | 10/2001 | Waycuilis | ............. | B08B 9/0326 219/687 |
| 6,309,195 B1 * | 10/2001 | Bottos | .................. | F04C 2/1075 418/178 |
| 6,321,839 B1 * | 11/2001 | Vereecken | .......... | E21B 47/1015 166/250.16 |
| 6,352,114 B1 * | 3/2002 | Toalson | .................. | E21B 17/01 166/339 |
| 6,355,928 B1 * | 3/2002 | Skinner | ................. | E21B 47/102 250/227.27 |
| 6,356,683 B1 * | 3/2002 | Hu | ........................ | G02B 6/0218 385/15 |
| 6,377,591 B1 * | 4/2002 | Hollister | ............... | H01S 3/2383 372/34 |
| 6,384,738 B1 * | 5/2002 | Carstensen | ............. | E21B 34/06 340/854.3 |
| 6,386,300 B1 * | 5/2002 | Curlett | ..................... | E21B 7/16 175/424 |
| 6,401,825 B1 * | 6/2002 | Woodrow | ............. | B63B 21/502 166/350 |
| 6,426,479 B1 * | 7/2002 | Bischof | ................ | B23K 26/123 219/121.5 |
| 6,437,326 B1 * | 8/2002 | Yamate | ................... | B08B 7/028 250/256 |
| 6,447,210 B1 * | 9/2002 | Coombs | ................ | E21D 20/025 405/259.5 |
| 6,450,257 B1 * | 9/2002 | Douglas | ................. | E21B 43/02 166/250.01 |
| 6,494,259 B2 * | 12/2002 | Surjaatmadja | ............ | C23C 4/12 166/115 |
| 6,557,249 B1 * | 5/2003 | Pruett | .................. | G02B 6/4486 29/33 D |
| 6,561,289 B2 * | 5/2003 | Portman | ................. | E21B 4/006 166/66.4 |
| 6,564,046 B1 * | 5/2003 | Chateau | .............. | H04W 52/029 455/343.1 |
| 6,591,046 B2 * | 7/2003 | Stottlemyer | ......... | G02B 6/4432 385/100 |
| 6,615,922 B2 * | 9/2003 | Deul | ...................... | E21B 17/01 166/367 |
| 6,644,848 B1 * | 11/2003 | Clayton | .................. | E21B 17/01 250/227.14 |
| 6,661,815 B1 * | 12/2003 | Kozlovsky | ......... | H04B 10/2537 372/20 |
| 6,712,150 B1 * | 3/2004 | Misselbrook | .......... | E21B 17/203 166/384 |
| 6,737,605 B1 * | 5/2004 | Kern | ...................... | B23K 26/04 219/121.67 |
| 6,747,743 B2 * | 6/2004 | Skinner | .............. | G01D 5/35303 356/477 |
| 6,808,023 B2 * | 10/2004 | Smith | ..................... | E21B 17/20 166/242.7 |
| 6,832,654 B2 * | 12/2004 | Ravensbergen | ........ | E21B 17/06 166/177.5 |
| 6,847,034 B2 * | 1/2005 | Shah | ...................... | E21B 23/08 166/250.01 |
| 6,851,488 B2 * | 2/2005 | Batarseh | ................ | E21B 33/138 175/11 |
| 6,867,858 B2 * | 3/2005 | Owen | .................... | G01N 21/65 356/301 |
| 6,874,361 B1 * | 4/2005 | Meltz | ..................... | E21B 43/14 73/152.32 |
| 6,880,646 B2 * | 4/2005 | Batarseh | ................ | E21B 43/11 166/222 |
| 6,912,898 B2 * | 7/2005 | Jones | ...................... | E21B 25/00 73/152.11 |
| 6,939,082 B1 * | 9/2005 | Baugh | .................... | B08B 7/0071 405/145 |
| 6,978,832 B2 * | 12/2005 | Gardner | ................. | E21B 43/26 166/250.01 |
| 6,994,162 B2 * | 2/2006 | Robison | .................. | E21B 29/02 166/250.01 |
| 7,040,746 B2 * | 5/2006 | McCain | ................. | C09D 11/32 106/31.27 |
| 7,087,865 B2 * | 8/2006 | Lerner | ................... | G02B 6/001 219/445.1 |
| 7,088,437 B2 * | 8/2006 | Blomster | ............... | G01M 11/35 356/73.1 |
| 7,134,488 B2 * | 11/2006 | Tudor | ................... | E21B 33/124 166/184 |
| 7,134,514 B2 * | 11/2006 | Riel | ........................ | E21B 7/068 175/320 |
| 7,152,700 B2 * | 12/2006 | Church | .................. | E21B 7/068 175/320 |
| 7,172,026 B2 * | 2/2007 | Misselbrook | ........... | E21B 17/20 166/173 |
| 7,174,067 B2 * | 2/2007 | Murshid | ................ | B64D 47/02 385/31 |
| 7,188,687 B2 * | 3/2007 | Rudd | ..................... | B21D 17/04 166/207 |
| 7,201,222 B2 * | 4/2007 | Kanady | ................. | E21B 43/126 166/105 |
| 7,249,633 B2 * | 7/2007 | Ravensbergen | ........ | E21B 17/06 166/242.6 |
| 7,264,057 B2 * | 9/2007 | Rytlewski | ............. | B63G 8/001 166/338 |
| 7,270,195 B2 * | 9/2007 | MacGregor | ........... | B23K 10/00 175/16 |
| 7,273,108 B2 * | 9/2007 | Misselbrook | ............ | E21B 17/20 166/381 |
| 7,395,866 B2 * | 7/2008 | Milberger | ............. | E21B 33/043 166/345 |
| 7,407,344 B2 * | 8/2008 | Hinshaw | ............... | E21D 20/006 175/52 |
| 7,416,032 B2 * | 8/2008 | Moeny | .................. | B23H 1/08 175/16 |
| 7,416,033 B2 * | 8/2008 | Hinshaw | ............... | E21D 20/003 175/122 |
| 7,424,190 B2 * | 9/2008 | Dowd | .................... | G02B 6/4492 385/109 |
| 7,527,108 B2 * | 5/2009 | Moeny | .................... | E21B 7/15 175/16 |
| 7,559,378 B2 * | 7/2009 | Moeny | .................... | E21B 7/15 175/16 |
| 7,600,564 B2 * | 10/2009 | Shampine | ............. | E21B 17/05 166/77.2 |
| 7,603,011 B2 * | 10/2009 | Varkey | .................. | G02B 6/4486 285/102 |
| 7,607,866 B2 * | 10/2009 | Eddowes | ............... | E21B 19/086 211/70 |
| 7,624,743 B2 * | 12/2009 | Sarkar | .................... | C09K 8/524 134/22.11 |
| 7,646,953 B2 * | 1/2010 | Dowd | .................... | E21B 17/206 385/109 |
| 7,715,664 B1 * | 5/2010 | Shou | ..................... | G02B 6/4208 385/11 |
| 7,720,323 B2 * | 5/2010 | Yamate | ................. | E21B 47/123 166/244.1 |

(56) References Cited

U.S. PATENT DOCUMENTS

| | | | | |
|---|---|---|---|---|
| 7,848,368 B2* | 12/2010 | Gapontsev | H01S 3/094003 | 372/108 |
| 8,175,433 B2* | 5/2012 | Caldwell | G02B 6/4494 | 264/1.29 |
| 8,322,441 B2* | 12/2012 | Fenton | E21B 17/1007 | 166/339 |
| 8,627,901 B1* | 1/2014 | Underwood | E21B 7/14 | 175/107 |
| 9,419,388 B2* | 8/2016 | Montena | H01R 24/38 | |
| 9,664,012 B2* | 5/2017 | Deutch | E21B 29/00 | |
| 9,784,037 B2* | 10/2017 | Grubb | B23K 26/0093 | |
| 10,046,415 B2* | 8/2018 | Pereira Masiero | B23K 26/16 | |
| 2002/0007945 A1* | 1/2002 | Neuroth | E21B 17/20 | 166/66 |
| 2002/0039465 A1* | 4/2002 | Skinner | E21B 41/0085 | 385/15 |
| 2002/0119014 A1* | 8/2002 | Coombs | E21D 20/025 | 405/269 |
| 2002/0189806 A1* | 12/2002 | Davidson | E21B 33/0355 | 166/250.01 |
| 2003/0000741 A1* | 1/2003 | Rosa | E21B 7/15 | 175/65 |
| 2003/0053783 A1* | 3/2003 | Shirasaki | G02B 6/0218 | 385/128 |
| 2003/0056990 A1* | 3/2003 | Oglesby | E21B 4/003 | 175/57 |
| 2003/0085040 A1* | 5/2003 | Hemphill | E21B 33/062 | 166/377 |
| 2003/0094281 A1* | 5/2003 | Tubel | E21B 47/00 | 166/250.03 |
| 2003/0132029 A1* | 7/2003 | Parker | B23K 26/0604 | 175/11 |
| 2003/0145991 A1* | 8/2003 | Olsen | E21B 37/00 | 166/265 |
| 2003/0159283 A1* | 8/2003 | White | G02B 6/4486 | 29/885 |
| 2003/0160164 A1* | 8/2003 | Jones | G01N 21/31 | 250/269.1 |
| 2003/0226826 A1* | 12/2003 | Kobayashi | B23K 26/14 | 219/121.7 |
| 2004/0006429 A1* | 1/2004 | Brown | E21B 47/1005 | 702/12 |
| 2004/0016295 A1* | 1/2004 | Skinner | E21B 47/0006 | 73/152.52 |
| 2004/0020643 A1* | 2/2004 | Thomeer | E21B 47/01 | 166/250.01 |
| 2004/0026382 A1* | 2/2004 | Richerzhagen | H01L 21/67092 | 219/121.6 |
| 2004/0033017 A1* | 2/2004 | Kringlebotn | E21B 47/101 | 385/31 |
| 2004/0074979 A1* | 4/2004 | McGuire | B05B 7/0425 | 239/1 |
| 2004/0093950 A1* | 5/2004 | Bohnert | G01L 11/025 | 73/705 |
| 2004/0112642 A1* | 6/2004 | Krueger | E21B 21/00 | 175/57 |
| 2004/0119471 A1* | 6/2004 | Blanz | E21B 49/00 | 324/303 |
| 2004/0129418 A1* | 7/2004 | Jee | C12N 13/00 | 166/250.01 |
| 2004/0195003 A1* | 10/2004 | Batarseh | E21B 7/14 | 175/16 |
| 2004/0206505 A1* | 10/2004 | Batarseh | E21B 43/11 | 166/302 |
| 2004/0207731 A1* | 10/2004 | Bearman | G01N 15/1463 | 348/207.99 |
| 2004/0211894 A1* | 10/2004 | Hother | E21B 47/0002 | 250/269.1 |
| 2004/0218176 A1* | 11/2004 | Shammai | E21B 49/081 | 356/326 |
| 2004/0244970 A1* | 12/2004 | Smith, Jr. | E21B 7/14 | 166/250.01 |
| 2004/0252748 A1* | 12/2004 | Gleitman | E21B 47/06 | 374/130 |
| 2004/0256103 A1* | 12/2004 | Batarseh | B23K 26/0648 | 166/297 |
| 2005/0007583 A1* | 1/2005 | DiFoggio | G01V 8/02 | 356/301 |
| 2005/0012244 A1* | 1/2005 | Jones | C08L 63/00 | 264/400 |
| 2005/0034857 A1* | 2/2005 | Defretin | E21B 47/10 | 166/250.01 |
| 2005/0094129 A1* | 5/2005 | MacDougall | E21B 47/065 | 356/73.1 |
| 2005/0099618 A1* | 5/2005 | DiFoggio | E21B 47/06 | 356/70 |
| 2005/0115741 A1* | 6/2005 | Terry | G01V 3/30 | 175/61 |
| 2005/0121094 A1* | 6/2005 | Quigley | D04C 1/06 | 138/125 |
| 2005/0121235 A1* | 6/2005 | Larsen | E21B 10/18 | 175/340 |
| 2005/0201652 A1* | 9/2005 | Ellwood, Jr. | D03D 25/005 | 385/1 |
| 2005/0230107 A1* | 10/2005 | McDaniel | E21B 43/25 | 166/249 |
| 2005/0252286 A1* | 11/2005 | Ibrahim | E21B 49/005 | 73/152.55 |
| 2005/0263281 A1* | 12/2005 | Lovell | E21B 47/123 | 166/255.1 |
| 2005/0268704 A1* | 12/2005 | Bissonnette | A63B 24/0003 | 73/65.03 |
| 2005/0269132 A1* | 12/2005 | Batarseh | E21B 7/15 | 175/40 |
| 2005/0272512 A1* | 12/2005 | Bissonnette | A63B 24/0003 | 473/151 |
| 2005/0272513 A1* | 12/2005 | Bissonnette | A63B 24/0003 | 473/151 |
| 2005/0272514 A1* | 12/2005 | Bissonnette | A63B 24/0003 | 473/151 |
| 2005/0282645 A1* | 12/2005 | Bissonnette | A63B 24/0003 | 473/131 |
| 2006/0038997 A1* | 2/2006 | Julian | G01J 3/02 | 356/328 |
| 2006/0049345 A1* | 3/2006 | Rao | G01T 1/20 | 250/269.1 |
| 2006/0065815 A1* | 3/2006 | Jurca | G02B 27/0905 | 250/216 |
| 2006/0070770 A1* | 4/2006 | Marsh | E21B 44/00 | 175/27 |
| 2006/0102343 A1* | 5/2006 | Skinner | E21B 7/15 | 166/250.1 |
| 2006/0118303 A1* | 6/2006 | Schultz | E21B 43/088 | 166/297 |
| 2006/0137875 A1* | 6/2006 | Dusterhoft | C09K 8/508 | 166/276 |
| 2006/0204188 A1* | 9/2006 | Clarkson | G02B 6/4206 | 385/123 |
| 2006/0207799 A1* | 9/2006 | Yu | E21B 43/2406 | 175/78 |
| 2006/0231257 A1* | 10/2006 | Reed | B28D 1/00 | 166/297 |
| 2006/0237233 A1* | 10/2006 | Reed | B23K 26/0604 | 175/56 |
| 2006/0257150 A1* | 11/2006 | Tsuchiya | H04J 14/02 | 398/79 |
| 2006/0260832 A1* | 11/2006 | McKay | G02B 6/3604 | 174/1 |
| 2006/0266522 A1* | 11/2006 | Eoff | C09K 8/508 | 166/278 |
| 2006/0283592 A1* | 12/2006 | Sierra | C09K 8/50 | 166/281 |
| 2006/0289724 A1* | 12/2006 | Skinner | G01D 5/268 | 250/221 |
| 2007/0031196 A1* | 2/2007 | Bruneau | E21D 21/0026 | 405/259.4 |
| 2007/0034409 A1* | 2/2007 | Dale | E21B 7/061 | 175/61 |

(56) References Cited

U.S. PATENT DOCUMENTS

| | | | |
|---|---|---|---|
| 2007/0081157 A1* | 4/2007 | Csutak | G01N 21/39 356/301 |
| 2007/0125163 A1* | 6/2007 | Dria | E21B 17/206 73/152.18 |
| 2007/0193990 A1* | 8/2007 | Richerzhagen | B23K 26/146 219/121.84 |
| 2007/0217736 A1* | 9/2007 | Zhang | G02B 6/3604 385/26 |
| 2007/0227741 A1* | 10/2007 | Lovell | E21B 19/22 166/380 |
| 2007/0242265 A1* | 10/2007 | Vessereau | E21B 47/0002 356/241.1 |
| 2007/0247701 A1* | 10/2007 | Akasaka | H01S 3/06754 359/334 |
| 2007/0267220 A1* | 11/2007 | Magiawala | E21B 7/14 175/12 |
| 2007/0278195 A1* | 12/2007 | Richerzhagen | B23K 26/0665 219/121.69 |
| 2007/0280615 A1* | 12/2007 | de Montmorillon | G02B 6/03688 385/127 |
| 2008/0023202 A1* | 1/2008 | Keatch | B26D 3/001 166/311 |
| 2008/0073077 A1* | 3/2008 | Tunc | E21B 23/14 166/250.01 |
| 2008/0093125 A1* | 4/2008 | Potter | E21B 7/001 175/67 |
| 2008/0112760 A1* | 5/2008 | Curlett | B65G 5/00 405/55 |
| 2008/0128123 A1* | 6/2008 | Gold | E21B 41/0085 166/66 |
| 2008/0138022 A1* | 6/2008 | Tassone | G02B 6/02333 385/124 |
| 2008/0165356 A1* | 7/2008 | Difoggio | G01N 21/31 356/326 |
| 2008/0166132 A1* | 7/2008 | Lynde | E21B 29/06 398/142 |
| 2008/0180787 A1* | 7/2008 | DiGiovanni | G02B 6/02019 359/334 |
| 2008/0245568 A1* | 10/2008 | Jeffryes | E21B 7/06 175/16 |
| 2008/0273852 A1* | 11/2008 | Parker | G01J 5/08 385/128 |
| 2009/0031870 A1* | 2/2009 | O'Connor | B23K 26/0846 83/13 |
| 2009/0033176 A1* | 2/2009 | Huang | E21B 41/0085 310/334 |
| 2009/0045176 A1* | 2/2009 | Wawers | G02B 27/40 219/121.67 |
| 2009/0049345 A1* | 2/2009 | Mock | G05B 23/0281 714/57 |
| 2009/0050371 A1* | 2/2009 | Moeny | E21B 10/00 175/57 |
| 2009/0078467 A1* | 3/2009 | Castillo | E21B 25/10 175/249 |
| 2009/0126235 A1* | 5/2009 | Kobayashi | E21B 7/00 37/195 |
| 2009/0133929 A1* | 5/2009 | Rodland | E21B 7/15 175/16 |
| 2009/0166042 A1* | 7/2009 | Skinner | E21B 47/06 166/305.1 |
| 2009/0190887 A1* | 7/2009 | Freeland | G02B 6/4433 385/100 |
| 2009/0194292 A1* | 8/2009 | Oglesby | E21B 7/061 166/369 |
| 2009/0205675 A1* | 8/2009 | Sarkar | B08B 7/0042 134/1 |
| 2009/0260834 A1* | 10/2009 | Henson | E21B 17/206 166/385 |
| 2009/0266552 A1* | 10/2009 | Barra | E21B 19/002 166/339 |
| 2009/0266562 A1* | 10/2009 | Greenaway | E21B 17/18 166/385 |
| 2009/0272424 A1* | 11/2009 | Ortabasi | H01L 31/0543 136/246 |
| 2009/0279835 A1* | 11/2009 | de Montmorillon | G02B 6/0365 385/127 |
| 2009/0294050 A1* | 12/2009 | Traggis | C03C 27/06 156/275.5 |
| 2009/0308852 A1* | 12/2009 | Alpay | B23K 26/046 219/121.72 |
| 2009/0324183 A1* | 12/2009 | Bringuier | G02B 6/02357 385/113 |
| 2010/0000790 A1* | 1/2010 | Moeny | E21B 7/15 175/16 |
| 2010/0001179 A1* | 1/2010 | Kobayashi | B23K 26/382 250/253 |
| 2010/0008631 A1* | 1/2010 | Herbst | G02B 6/4416 385/101 |
| 2010/0013663 A1* | 1/2010 | Cavender | G01V 11/002 340/854.3 |
| 2010/0025032 A1* | 2/2010 | Smith | E21B 23/00 166/244.1 |
| 2010/0044102 A1* | 2/2010 | Rinzler | E21B 7/14 175/15 |
| 2010/0071794 A1* | 3/2010 | Homan | E21B 47/01 138/125 |
| 2010/0078414 A1* | 4/2010 | Perry | B23K 26/106 219/121.67 |
| 2010/0084132 A1* | 4/2010 | Noya | E21B 17/206 166/254.2 |
| 2010/0089571 A1* | 4/2010 | Revellat | E21B 17/206 166/254.2 |
| 2010/0089574 A1* | 4/2010 | Wideman | E21B 7/14 166/272.1 |
| 2010/0139924 A1* | 6/2010 | Abney | E21B 36/005 166/335 |
| 2010/0155059 A1* | 6/2010 | Ullah | E21B 17/206 166/254.2 |
| 2010/0170672 A1* | 7/2010 | Schwoebel | E21B 43/305 166/245 |
| 2010/0170680 A1* | 7/2010 | McGregor | E21B 17/02 166/385 |
| 2010/0187010 A1* | 7/2010 | Abbasi | E21B 10/26 175/57 |
| 2010/0197116 A1* | 8/2010 | Shah | B23K 26/38 438/463 |
| 2010/0215326 A1* | 8/2010 | Zediker | E21B 7/14 385/100 |
| 2010/0224408 A1* | 9/2010 | Kocis | E21B 7/14 175/11 |
| 2010/0226135 A1* | 9/2010 | Chen | B23K 26/146 362/318 |
| 2010/0236785 A1* | 9/2010 | Collis | B08B 9/0436 166/339 |
| 2010/0326659 A1* | 12/2010 | Schultz | E21B 29/02 166/297 |
| 2010/0326665 A1* | 12/2010 | Redlinger | E21B 29/005 166/339 |
| 2011/0030367 A1* | 2/2011 | Dadd | F02G 1/0435 60/526 |
| 2011/0035154 A1* | 2/2011 | Kendall | C04B 7/364 702/14 |
| 2011/0048743 A1* | 3/2011 | Stafford | E21B 33/134 166/386 |
| 2011/0061869 A1* | 3/2011 | Abass | E21B 43/26 166/308.1 |
| 2011/0079437 A1* | 4/2011 | Hopkins | E21B 7/046 175/61 |
| 2011/0127028 A1* | 6/2011 | Strickland | E21B 33/12 166/55.1 |
| 2011/0139450 A1* | 6/2011 | Vasques | E21B 33/1246 166/264 |
| 2011/0147013 A1* | 6/2011 | Kilgore | E21B 33/1285 166/387 |

(56) References Cited

U.S. PATENT DOCUMENTS

| | | | |
|---|---|---|---|
| 2011/0162854 A1* | 7/2011 | Bailey | C09K 8/508 166/381 |
| 2011/0168443 A1* | 7/2011 | Smolka | E21B 7/14 175/15 |
| 2011/0186298 A1* | 8/2011 | Clark | E21B 43/14 166/310 |
| 2011/0198075 A1* | 8/2011 | Okada | F16L 55/28 166/170 |
| 2011/0205652 A1* | 8/2011 | Abbasi | E21B 7/14 359/896 |
| 2011/0220409 A1* | 9/2011 | Foppe | E21B 7/14 175/16 |
| 2011/0266062 A1* | 11/2011 | Shuman, V | E21B 7/046 175/74 |
| 2011/0278070 A1* | 11/2011 | Hopkins | E21B 4/02 175/61 |
| 2011/0290563 A1* | 12/2011 | Kocis | E21B 7/14 175/57 |
| 2011/0303460 A1* | 12/2011 | Rudolf Von Rohr | E21B 7/14 175/14 |
| 2012/0000646 A1* | 1/2012 | Liotta | E21B 33/062 166/85.4 |
| 2012/0012393 A1* | 1/2012 | Kumar | E21B 25/00 175/58 |
| 2012/0020631 A1* | 1/2012 | Rinzler | G02B 6/4402 385/109 |
| 2012/0048568 A1* | 3/2012 | Li | E21B 43/121 166/369 |
| 2012/0061091 A1* | 3/2012 | Radi | E21B 19/004 166/350 |
| 2012/0067643 A1* | 3/2012 | DeWitt | E21B 4/18 175/15 |
| 2012/0068086 A1* | 3/2012 | DeWitt | E21B 7/14 250/492.1 |
| 2012/0068523 A1* | 3/2012 | Bowles | E21C 35/08 299/1.4 |
| 2012/0074110 A1* | 3/2012 | Zediker | B08B 7/0042 219/121.72 |
| 2012/0111578 A1* | 5/2012 | Tverlid | E21B 33/138 166/382 |
| 2012/0118568 A1* | 5/2012 | Kleefisch | E21B 7/14 166/297 |
| 2012/0163924 A1* | 6/2012 | Rataj | E21D 21/0033 405/259.3 |
| 2012/0217015 A1* | 8/2012 | Zediker | E21B 7/12 166/338 |
| 2012/0217017 A1* | 8/2012 | Zediker | E21B 29/08 166/358 |
| 2012/0217018 A1* | 8/2012 | Zediker | E21B 33/063 166/361 |
| 2012/0217019 A1* | 8/2012 | Zediker | E21B 33/063 166/363 |
| 2012/0239013 A1* | 9/2012 | Islam | H01S 5/0064 606/3 |
| 2012/0248078 A1* | 10/2012 | Zediker | E21B 7/14 219/121.67 |
| 2012/0255774 A1* | 10/2012 | Grubb | E21B 7/14 175/16 |
| 2012/0255933 A1* | 10/2012 | McKay | B08B 9/02 219/61 |
| 2012/0266803 A1* | 10/2012 | Zediker | B63G 8/001 114/337 |
| 2012/0267168 A1* | 10/2012 | Grubb | B23K 26/0093 175/16 |
| 2012/0273269 A1* | 11/2012 | Rinzler | E21B 7/14 175/16 |
| 2012/0273470 A1* | 11/2012 | Zediker | B23K 26/14 219/121.61 |
| 2012/0275159 A1* | 11/2012 | Fraze | G02B 6/32 362/259 |
| 2013/0011102 A1* | 1/2013 | Rinzler | G02B 6/3813 385/89 |
| 2013/0228372 A1* | 9/2013 | Linyaev | E21B 7/15 175/16 |
| 2013/0228557 A1* | 9/2013 | Zediker | B23K 26/00 219/121.61 |
| 2013/0266031 A1* | 10/2013 | Norton | H01S 3/08 372/9 |
| 2013/0319984 A1* | 12/2013 | Linyaev | B23K 26/106 219/121.72 |
| 2014/0000902 A1* | 1/2014 | Wolfe | E21B 33/063 166/361 |
| 2014/0067268 A1* | 3/2014 | Tunheim | G01M 3/22 702/2 |
| 2014/0069896 A1* | 3/2014 | Deutch | E21B 29/02 219/121.67 |
| 2014/0090846 A1* | 4/2014 | Deutch | E21B 29/00 166/297 |
| 2014/0112724 A1* | 4/2014 | Nelson | E21D 20/00 405/259.1 |
| 2014/0190949 A1* | 7/2014 | Zediker | B23K 26/282 219/121.72 |
| 2014/0231085 A1* | 8/2014 | Zediker | E21B 29/02 166/288 |
| 2014/0231398 A1* | 8/2014 | Land | B23K 26/0093 219/121.72 |
| 2014/0256055 A1* | 9/2014 | Pottorf | G01V 9/007 436/163 |
| 2016/0151810 A1* | 6/2016 | Bozso | B08B 7/0071 134/1 |

* cited by examiner

HIGH POWER LASER FLOW ASSURANCE SYSTEMS, TOOLS AND METHODS

This application is a continuation of U.S. patent application Ser. No. 16/409,815 filed May 11, 2019 which is a continuation of U.S. patent application Ser. No. 14/214,304 filed Mar. 14, 2014, which: (i) claims under U.S.C. § 119(e)(1), the benefit of the filing date of Mar. 15, 2013 of provisional application Ser. No. 61/786,687; (ii) claims under U.S.C. § 119(e)(1), the benefit of the filing date of Mar. 15, 2013 of provisional application Ser. No. 61/786,763; (iii) is a continuation-in-part of U.S. patent application Ser. No. 13/222,931 filed Aug. 31, 2011, which claims under 35 U.S.C. § 119(e)(1), the benefit of the filing date of Aug. 31, 2010 of provisional application Ser. No. 61/378,910; (iv) is a continuation-in-part of U.S. patent application Ser. No. 13/565,345 filed Aug. 2, 2012, which claims under 35 U.S.C. § 119(e)(1), the benefit of the filing date of Mar. 1, 2012 of provisional application Ser. No. 61/605,422; (v) is a continuation-in-part of U.S. patent application Ser. No. 13/347,445 filed Jan. 10, 2012, which claims under 35 U.S.C. § 119(e)(1), the benefit of the filing date of Feb. 7, 2011 of provisional application Ser. No. 61/431,830; (vi) is a continuation-in-part of U.S. patent application Ser. No. 13/403,741 filed Feb. 23, 2012, which claims under 35 U.S.C. § 119(e)(1), the benefit of the filing date of Feb. 24, 2011 of provisional application Ser. No. 61/446,312; (vii) is a continuation-in-part of U.S. patent application Ser. No. 12/543,986 filed Aug. 19, 2009, which claims under 35 U.S.C. § 119(e)(1) the benefit of the filing date of Feb. 17, 2009 of US provisional application Ser. No. 61/153,271, the benefit of the filing date of Oct. 17, 2008 of U.S. provisional application Ser. No. 61/106,472, the benefit of the filing date of Oct. 3, 2008 of U.S. provisional application Ser. No. 61/102,730, and the benefit of the filing date of Aug. 20, 2008 of US provisional application Ser. No. 61/090,384; and (viii) is a continuation-in-part of U.S. patent application Ser. No. 14/099,948 filed Dec. 7, 2013, which claims under 35 U.S.C. § 119(e)(1) the benefit of the filing date of Mar. 15, 2013 of U.S. provisional application Ser. No. 61/786,763 and the benefit of the filing date of Dec. 7, 2012 of U.S. provisional application Ser. No. 61/734,809, the entire disclosures of each of which are incorporated herein by reference.

BACKGROUND OF THE INVENTION

Field of the Invention

The present inventions relate to methods, apparatus and systems for the delivery of high power laser beams over a distance to a conduit, pipe, pipeline, production tubing, tubular or other device used for the flowing or transporting of a material, to perform laser and laser assisted operations, such as, cleaning, removing, ablating, fracturing, treating, melting, cleaving, and combinations and various of these.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, ores, minerals, overburden, marble, rhyolite, quartzite and shale rock.

As used herein, unless specified otherwise, the terms "well," "tunnel" and "borehole" and similar such terms should be given their broadest possible meaning and include any opening that is created in the earth, in a structure (e.g., building, protected military installation, nuclear plant, or ship), in a work surface, or in a structure in the ground, (e.g., foundation, roadway, airstrip, cave or subterranean structure) that is substantially longer than it is wide, such as a well, a tunnel, a hole, a well bore, a well hole, a micro hole, slimhole and other terms commonly used or known in the arts to define these types of narrow long passages. These terms would further include, for example, exploratory, production, abandoned, reentered, reworked, and injection wells.

Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole farthest along the path of the borehole from the borehole's opening, the surface of the earth, or the borehole's beginning.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three or four sections of drill pipe that have been connected, e.g., joined together, typically by joints having threaded connections. As used herein the terms "drill string," "string," "string of drill pipe," string of pipe" and similar type terms should be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes drill pipe, casing, riser, coiled tube, composite tube, vacuum insulated tubing ("VIT"), production tubing and any similar structures having at least one channel therein that are, or could be used, in the drilling industry. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of tubular is the thickness of the material between the internal diameter of the tubular and the external diameter of the tubular.

As used herein, unless specified otherwise the terms "blowout preventer," "BOP," and "BOP stack" should be given their broadest possible meaning, and include: (i) devices positioned at or near the borehole surface, e.g., the surface of the earth including dry land or the seafloor, which are used to contain or manage pressures or flows associated with a borehole; (ii) devices for containing or managing pressures or flows in a borehole that are associated with a subsea riser or a connector; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise the term "fixed platform," would include any structure that has at least a portion of its weight supported by the seafloor. Fixed platforms would include structures such as: free-standing caissons, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water a top of vertical support members that extend down in to the water to the seafloor.

As used herein the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long. Pipelines may be located below the earth, above the earth, under water, within a structure, or combinations of these and other locations. Pipelines may be made from metal, steel, plastics, ceramics, composite materials, or other materials and compositions know to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

Pipelines may be, in part, characterized as gathering pipelines, transportation pipelines and distribution pipelines, although these characterizations may be blurred and may not cover all potential types of pipelines. Gathering pipelines are a number of smaller interconnected pipelines that form a network of pipelines for bringing together a number of sources, such as for example bringing together hydrocarbons being produced from a number of wells. Transportation pipelines are what can be considered as a traditional pipeline for moving products over longer distances for example between two cities, two countries, and a production location and a shipping, storage or distribution location. The Alaskan oil pipeline is an example of a transportation pipeline. Distribution pipelines can be small pipelines that are made up of several interconnected pipelines and are used for the distribution to for example an end user, of the material that is being delivered by the pipeline, such as for example the feeder lines used to provide natural gas to individual homes. As used herein the term pipeline includes all of these and other characterizations of pipelines that are known to or used in the pipeline arts.

As used herein the terms "removal of material," "removing material," "remove" and similar such terms should be given their broadest possible meaning, unless expressly stated otherwise. Thus, such terms would include melting, flowing, vaporization, spalling, chipping, cracking, softening, laser induced break down, ablation, degradation, as well as, combinations and variations of these, and other processes and phenomena that can occur when directed energy from, for example, a laser beam is delivered to a material, object or work surface. Such terms would further include combinations of the forgoing performed with a high power laser; and would induce such laser processes and phenomena with the energy that, for example, a fluid jet may impart to the material to be removed. Moreover, irrespective of the processes or phenomena taking place, such terms would include the lessening, opening, cutting, severing or sectioning of the material, object or targeted structure.

As used herein the terms "work piece," "work surface," "work area" "target" and similar such terms should be given their broadest possible meaning, unless expressly stated otherwise. Thus, such terms would include any and all types of objects, organisms, coatings, buildups, materials, formations, tubulars, substances or things, and combinations and variations of these, that are intended to be, or planned to be, struck, e.g., illuminated or contacted, by a high power laser beam.

As used herein, unless expressly stated otherwise, the terms "workover," "completion" and "workover and completion" and similar such terms should be given their broadest possible meanings and would include activities that place at or near the completion of drilling a well, activities that take place at or the near the commencement of production from the well, activities that take place on the well when the well is producing or operating well, activities that take place to reopen or reenter an abandoned or plugged well or branch of a well, and would also include for example, perforating, cementing, acidizing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, crack, alter, chemically change, cleave, desiccate and combinations and variations of these, materials in a well, or other structure, to remove, assist in their removal, cleanout, condition and combinations and variation of these, such materials.

As used herein, unless expressly stated otherwise, the term "flow assurance" should be given its broadest possible meaning, and would include for example, activities relating to maintaining, assuring, enhancing, restoring, improving, and achieving the flow of materials, such as liquids, gasses, slurries, and mixtures, in a tubular. This term would cover such activities along the entire stream of commerce; for example from delivery to and use by a consumer or customer back along the chain of commerce to the origins of the material, or its raw material, e.g., the removal or harvesting of the raw material or resource from the earth or a body of water. This term would be applicable to such activities, for example, in the geothermal, hydrocarbon, oil and natural gas, water, waste treatment, chemical, food processing, biologic and pharmaceutical industries, to name a few. This term would also include the activities that come under the range of activities that have been recently used in the oil and natural gas industries to describe the assurance that hydrocarbons can be brought out of the earth and delivered to a customer, or end user.

SUMMARY

There has been a long standing need to assure and maintain the flow of materials in tubulars. The present inventions, among other things, solve these and other needs by providing the articles of manufacture, devices and processes taught herein.

There is provided a high power laser system for performing laser operation on a material in a borehole, the system having: a high power laser having the capability of providing a laser beam having at least about 20 kW of power; a long distance high power transmission cable for providing the high power laser energy deep within a borehole hole; and, a high power laser tool having a high power laser optic to provide an annular laser beam pattern.

Further, there is provided a high power laser system for performing in situ high power laser processing of a material in a borehole, the system having: a laser capability of providing a laser beam having at least about 20 kW of power; a long distance high power transmission cable for transmitting the high power laser; a high power in situ processing laser tool optically associated with the transmission cable and the laser; the laser tool positioned in the borehole adjacent an area of likely flow impediment; and, the high power laser tool having: (i) a high power laser optic to provide the laser beam in a laser beam pattern and along a laser beam path; (ii) a laser flow passage, the flow passage configured to, at least in part, operationally influence a flowing hydrocarbons in the borehole; wherein the laser beam path, at least in part, travels through the laser flow passage, whereby flowing hydrocarbons are capable of being processed by the laser beam delivered along the laser beam path in the laser beam pattern.

Additionally, there is provided the high power laser systems and methods for performing in situ high power laser processing of materials that may have one or more of the following features: wherein the laser tool is located at least about 1,000 feet from a surface of the borehole; wherein the laser tool is located at least about 2,000 feet from a surface of the borehole; wherein the laser tool is located at least about 3,000 feet from a surface of the borehole; wherein the laser tool is located at least about 1,000 feet from a surface of the borehole and the system has a second high power laser tool having a high power laser optic to provide the laser beam in a laser beam pattern and along a laser beam path, a laser flow passage, the flow passage configured to, at least in part, operationally influence the flowing hydrocarbons in the borehole; wherein the laser tool is located at least about 1,000 feet from a surface of the borehole and the system has a polished stinger sub and a sealing member; wherein the laser tool is located at least about 10,000 feet from a surface of the borehole and the system has a polished stinger sub, a sealing member, and a second high power laser tool having a high power laser optic to provide the laser beam in a laser beam pattern and along a laser beam path, a laser flow passage, the flow passage configured to, at least in part, operationally influence the flowing hydrocarbons in the borehole and a third high power laser tool having a high power laser optic to provide the laser beam in a laser beam pattern and along a laser beam path, a laser flow passage, the flow passage configured to, at least in part, operationally influence the flowing hydrocarbons in the borehole; wherein hydrocarbons are flowing in the borehole and the flowing hydrocarbon has at least about 0.4 wt % asphaltene; wherein hydrocarbons are flowing in the borehole and wherein the flowing hydrocarbon has at least about 1 wt % asphaltene; wherein hydrocarbons are flowing in the borehole and the flowing hydrocarbon has at least about 1.2 wt % asphaltene; wherein hydrocarbons are flowing in the borehole and the flowing hydrocarbon has at least about 4 wt % asphaltene; wherein hydrocarbons are flowing in the borehole and the flowing hydrocarbon has at least about 6 wt % asphaltene; wherein hydrocarbons are flowing in the borehole and the flowing hydrocarbon has at least about 10 wt % asphaltene; wherein the system is capable of increasing the S-value of the flowing hydrocarbon by at about 0.05; wherein the system is capable of increasing the S-value of the flowing hydrocarbon by at about 0.01; wherein the system is capable of increasing the S-value of the flowing hydrocarbon by at about 0.02; wherein the system is capable of increasing the S-value of the flowing hydrocarbon by at about 1; and wherein the system is capable of increasing the S-value of the flowing hydrocarbon by at about 2.

Yet further, there is provided a high power laser system for performing in situ high power laser processing of flowing material in a borehole, the system having: a high power laser capable of delivering a high power laser beam; a high power in situ processing laser tool optically associated with the transmission cable and positioned in the borehole; and, the high power laser tool having a high power laser optic to provide the laser beam in a laser beam pattern and along a laser beam path, a laser flow passage, the flow passage configured to, at least in part, channel a flowing hydrocarbons in the borehole; wherein the laser beam path, at least in part, travels through the flow passage, whereby the flowing hydrocarbons are capable of being processed by the laser beam delivered along the laser beam path in the laser beam pattern.

Further, there is provided a high power laser system for performing in situ high power laser processing of a material in a borehole, the system having: a high power laser system associated with a borehole, the borehole producing flowing hydrocarbons; the high power laser system having the capability of providing a laser beam having at least about 10 kW of power; the high power laser system having a long distance high power transmission cable for transmitting the high power laser; a high power in situ processing laser tool optically associated with the transmission cable and positioned in the borehole adjacent an area of the borehole having a flow impediment material; and, the high power laser tool having a high power laser optic to provide the laser beam in a laser beam pattern and along a laser beam path, the laser beam path intersecting a borehole sidewall; wherein the laser beam path, at least in part, travels through a flow impediment material, whereby the flow impediment material is removed without damaging the sidewall of the borehole.

Moreover, there is provided the high power laser systems and methods for performing in situ high power laser processing of materials that may have one or more of the following features: wherein the laser tool is located at least about 5,000 feet from a surface of the borehole; wherein the flow impediment material has a precipitate; wherein the the flow impediment material has an asphaltene; wherein the flow impediment material has Barium Sulfate; wherein the the flow impediment material has a metal organic compound; wherein the the flow impediment material has a gas hydrate; wherein the flow impediment material has a clathrate hydrate; wherein the flow impediment material has a wax; and wherein the flow impediment material has a solid.

Still additionally, there is provide a high power laser system for performing in situ high power laser processing of a material in a borehole, the system having: a long distance high power transmission cable for transmitting the high power laser; a high power in situ processing laser tool optically associated with the transmission cable and positioned in the borehole; and, the high power laser tool having a high power laser optic to provide the laser beam in a laser beam pattern and along a laser beam path, the laser beam path intersecting a borehole sidewall; wherein the laser beam path, at least in part, travels through a flow impediment material, whereby the flow impediment material is removed without damaging the sidewall of the borehole.

Moreover, there is provided the high power laser systems and methods for performing in situ high power laser processing of materials that may have one or more of the following features: wherein the flow impediment material has at least about a 10% blockage of a passage in the borehole; wherein the flow impediment material has at least about a 20% blockage of a passage in the borehole; wherein the flow impediment material has at least about a 50% blockage of a passage in the borehole; wherein the flow impediment material has at least about a 90% blockage of a passage in the borehole; wherein the flow impediment material has at least about a 10% blockage of a passage in the borehole and the flow impediment material is one of a precipitate, a solid, a paraffins, a wax, an asphaltene, a gas hydrate, a scale, Barium Sulfate, and calcium carbonate; wherein the flow impediment material has at least about a 20% blockage of a passage in the borehole and the flow impediment material is a material selected from a precipitate, a solid, a paraffins, a wax, an asphaltene, a gas hydrate, a scale, Barium Sulfate, and calcium carbonate; wherein the flow impediment material has at least about a 75% blockage of a passage in the borehole and the flow impediment material is one of a precipitate, a solid, a paraffins, a wax, an asphaltene, a gas hydrate, a scale, Barium Sulfate, and calcium carbonate.

Yet further, there is provided the high power laser systems and methods for performing in situ high power laser processing of materials that may have one or more of the following features: wherein the laser beam pattern is annular; wherein the laser beam pattern is scanned; and wherein the laser beam pattern is one of a radially expanding conical beam pattern and a collimated circular beam pattern.

In addition, there is provided a method of in situ high power laser processing of flowing material in a borehole, the method having: associating a high power laser system with a borehole, the borehole producing flowing hydrocarbons; the high power laser system having the capability of providing a laser beam having at least about 10 kW of power; the high power laser system having a long distance high power transmission cable for transmitting the high power laser; a high power in situ processing laser tool optically associated with the transmission cable and positioned in the borehole adjacent an area of likely flow impediment; and, the high power laser tool having a high power laser optic to provide the laser beam in a laser beam pattern and along a laser beam path, a laser flow passage, the flow passage configured to, at least in part, operationally influence the flowing hydrocarbons in the borehole; delivering the high power laser beam along the laser beam path wherein the laser beam path, at least in part, travels through the flow passage, whereby the flowing hydrocarbons are processed by the laser.

Further, there is provided a method of in situ high power laser processing of a material in a borehole, the system having: associating a high power laser system with a borehole, the borehole producing flowing hydrocarbons; the high power laser system having the capability of providing a laser beam having at least about 10 kW of power; the high power laser system having a long distance high power transmission cable for transmitting the high power laser; a high power in situ processing laser tool optically associated with the transmission cable and positioned in the borehole adjacent an area of the borehole having a flow impediment material; and, the high power laser tool having a high power laser optic to provide the laser beam in a laser beam pattern and along a laser beam path, the laser beam path intersecting a borehole side wall; delivering the laser beam along the laser beam path wherein the laser beam, at least in part, strikes the flow impediment material, whereby the flow impediment material is lessened.

Still additionally, there is provided a high power laser system for performing in situ high power laser processing of flowing material in a tubular, the system having: a high power laser system associated with a tubular, the tubular having a flowing material; the high power laser system having the capability of providing a laser beam having at least about 5 kW of power; the high power laser system having a long distance high power transmission cable for transmitting the high power laser; a high power in situ processing laser tool optically associated with the transmission cable and positioned in the tubular adjacent an area of likely flow impediment; and, the high power laser tool having a high power laser optic to provide the laser beam in a laser beam pattern and along a laser beam path, a laser flow passage, the flow passage configured to, at least in part, operationally influence the flowing material in the tubular; wherein the laser beam path, at least in part, travels through the flow passage, whereby the flowing material is processed by the laser beam.

Moreover there is provided the high power laser systems and methods for performing in situ high power laser processing of materials associated with or in a tubular that may have one or more of the following features: wherein the tubular is associated with or a part of a boiler; wherein the tubular is associated with or apart of a desalinization system;

wherein the tubular is a pipeline; wherein the tubular is associated with or a part of a chemical processing plant; and wherein the tubular is associated with or a part of a nuclear power plant.

Further, there is provided a high power laser system for performing in situ high power laser processing of a material in a tubular, the system having: a high power laser system associated with a tubular, the tubular having a a flowing material; the high power laser system having the capability of providing a laser beam having at least about 10 kW of power; the high power laser system having a long distance high power transmission cable for transmitting the high power laser; a high power in situ processing laser tool optically associated with the transmission cable and positioned in the tubular adjacent an area of the tubular having a flow impediment material; and, the high power laser tool having a high power laser optic to provide the laser beam in a laser beam pattern and along a laser beam path, the laser beam path intersecting tubular side wall; delivering a laser beam along the laser beam path, wherein the laser beam path, at least in part, strikes the flow impediment material, whereby the flow impediment material is lessened.

Additionally, there is provide a method of addressing hydrate formation in subsea structures, including: positioning a submersible assembly adjacent to a subsea structure; the submersible assembly comprising a laser tool in optical communication with a high power laser; the laser tool delivering a high power laser beam to the subsea structure, wherein the high power laser beam heats the subsea structure and thereby mitigates hydrate formation.

Still further there is provided system and methods having one or more of the following features: wherein the subsea structure is only optically contacted by the submersible assembly; wherein the subsea structure is not physically contacted; wherein the subsea structure is comprises a component of a deep water offshore hydrocarbon production system; wherein the submersible assembly is an ROV; wherein the subsea structure is selected from the group consisting of a line, a flow line, a line along the sea floor, a tree, a manifold, a BOP, a riser, devices and equipment; wherein the wavelength of the laser is from about 455 nm to about 2100 nm; wherein the wavelength is from about 400 nm to about 800 nm; and wherein the laser beam is delivered through a laser fluid jet.

Moreover there is provided a method of mitigating hydrate formation in subsea flow lines, equipment, structures or devices in subsea oil fields, including: positioning an ROV, comprising a high power laser tool, near a subsea structure in a subsea oil field; and, heating an area of the subsea structure with a laser beam delivered from the high power laser tool; whereby the heating mitigates hydrate formation.

Still further there is provided system and methods having one or more of the following features: wherein the subsea structure is heated above a temperature for hydrate formation in the structure; wherein the heating maintains the subsea structure at a predetermined temperature; and wherein the predetermined temperature is above a temperature for hydrate formation in the structure; and wherein the hydrate comprises methane.

Yet further, there is provided a method of in situ high power laser processing of a material in a tubular, the system having: associating a high power laser system with a tubular; the high power laser system having the capability of providing a laser beam having at least about 10 kW of power, at least about 20 kW of power and at least about 30 kW of power; the high power laser system having a long distance high power transmission cable for transmitting the high power laser; a high power in situ processing laser tool optically associated with the transmission cable and positioned in the tubular adjacent an area of the borehole having a flow impediment material; and, the high power laser tool having a high power laser optic to provide the laser beam in a laser beam pattern and along a laser beam path, the laser beam path intersecting a tubular side wall; delivering the laser beam along the laser beam path wherein the laser beam, at least in part, strikes the flow impediment material, whereby the flow impediment material is lessened.

Still moreover, there is provided a high power laser system for performing in situ high power laser processing of flowing material in a borehole, the system having: a high power laser system associated with a borehole, the borehole producing flowing hydrocarbons; the high power laser system having the capability of providing a laser beam having at least about 20 kW of power; the high power laser system having a long distance high power transmission cable for transmitting the high power laser; a high power in situ processing laser tool optically associated with the transmission cable and positioned in the borehole adjacent an area of likely flow impediment; and, the high power laser tool having a high power laser optic to provide the laser beam in a laser beam pattern and along a laser beam path, a laser flow passage, the flow passage configured to, at least in part, operationally influence the flowing hydrocarbons in the borehole; wherein the laser beam path, at least in part, travels through the flow passage, whereby the flowing hydrocarbons are capable of being processed by the laser beam delivered along the laser beam path in the laser beam pattern.

Moreover there is provided the high power laser systems and methods for performing in situ high power laser processing of materials that may have one or more of the following features: wherein the laser tool is located at least about 1,000 feet from a surface of the borehole; wherein the laser tool is located at least about 2,000 feet from a surface of the borehole; wherein the laser tool is located at least about 3,000 feet from a surface of the borehole; wherein the laser tool is located at least about 5,000 feet from a surface of the borehole; wherein the laser tool is located at least about 10,000 feet from a surface of the borehole; wherein the system has a polished stinger sub; wherein the system has a sealing member; and wherein the laser tool is located at least about 15,000 feet from a surface of the borehole.

Yet further there is provided a high power laser system for performing in situ high power laser processing of flowing material in a borehole, the system having: a high power laser system associated with a borehole; the high power laser system having the capability of providing a laser beam having at least about 20 kW of power; the high power laser system having a long distance high power transmission cable for transmitting the high power laser; a high power in situ processing laser tool optically associated with the transmission cable and positioned in the borehole adjacent an area of likely flow impediment; and, the high power laser tool having a high power laser optic to provide the laser beam in a laser beam pattern and along a laser beam path, a laser flow passage, the flow passage configured to, at least in part, channel the flowing hydrocarbons in the borehole; wherein the laser beam path, at least in part, travels through the flow passage, whereby the flowing hydrocarbons are capable of being processed by the laser beam delivered along the laser beam path in the laser beam pattern.

Still additionally there is provided a high power laser system and method for performing in situ high power laser processing of flowing material in a borehole, the system having: a high power laser system associated with a borehole, the borehole producing flowing hydrocarbons; the high power laser system having the capability of providing a laser beam having at least about 10 kW of power; the high power laser system having a long distance high power transmission cable for transmitting the high power laser; a high power in situ processing laser tool optically associated with the transmission cable and positioned in the borehole adjacent an area of likely flow impediment; and, the high power laser tool having a high power laser optic to provide the laser beam in a laser beam pattern and along a laser beam path, a laser flow passage, the flow passage configured to, at least in part, operationally influence the flowing hydrocarbons in the borehole; wherein the laser beam path, at least in part, travels through the flow passage, whereby the flowing hydrocarbons are capable of being processed by the laser beam delivered along the laser beam path in the laser beam pattern.

Still moreover there is provided a high power laser system and method for performing in situ high power laser processing of flowing material in a borehole, the system having: a high power laser system associated with a borehole, the borehole producing flowing hydrocarbons; the high power laser system having the capability of providing a laser beam having at least about 10 kW of power; the high power laser system having a long distance high power transmission cable for transmitting the high power laser; a high power in situ processing laser tool optically associated with the transmission cable and positioned in the borehole adjacent an area of likely flow impediment; and, the high power laser tool having a high power laser optic to provide the laser beam in a laser beam pattern and along a laser beam path, a laser flow passage, the flow passage configured to, at least in part, channel the flowing hydrocarbons in the borehole; wherein the laser beam path, at least in part, travels through the flow passage, whereby the flowing hydrocarbons are capable of being processed by the laser beam delivered along the laser beam path in the laser beam pattern.

DESCRIPTION OF THE PREFERRED EMBODIMENTS

Figure 1:
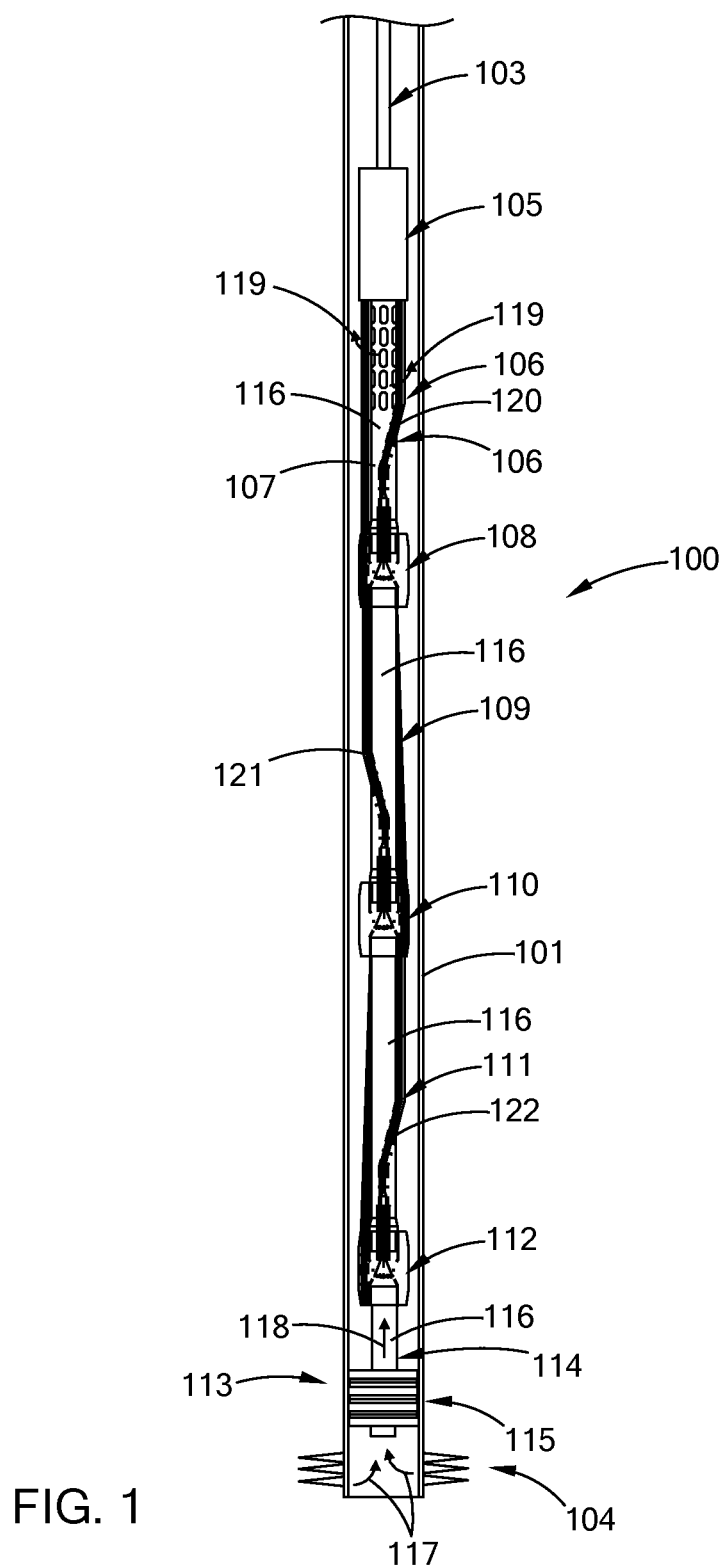
FIG. 1 is a cross sectional view of an embodiment of a laser tool in accordance with the present inventions.

In general, the systems, tools and methods of the present inventions are directed to, and provide for, activities such as the cleaning, resurfacing, removal, preventing, managing, cracking, cleaving, melting, altering, changing, phase changing, chemically changing, mitigation and clearing away of unwanted materials (e.g., build-ups, foulings, deposits, corrosion, or other substances) from, at, in, on, or around structures (e.g., a work piece, work area, target area, target surface or work surface, including interior surface). Such unwanted materials could include, by way of example, asphaltenes, rust, corrosion, corrosion by products, precipitates, waxes, degraded or old paints, calcium carbonates, barium sulfates, gas hydrates, clathrate hydrate, degraded or old coatings, paints, NORM (naturally occurring radio active materials), coatings, waxes, hydrates, microbes, paraffins, residual materials, biofilms, tars, sludges, scales and slimes. The present inventions utilize high power directed energy in novel and unique manners to perform such operations and activities.

Generally, directed energy in the form of high power directed energy having sufficient power, properties and characteristics, for delivery to and utilization at remote and difficult to access locations may be used to perform such directed energy operations and activities. These directed energy operations and activities include directed energy flow assurance, which includes directed energy operations and activities to, for example, maintain, assure, enhance, restore, improve, and achieve the flow of materials, such as liquids, gasses, slurries, and mixtures, in articles and structures such as in a tubular, pipe, pipeline, flow line, tunnel, conduit, channel, and production tubing. These directed energy flow assurance techniques and systems can provide flow assurance from start to finish, and any point in between, in a materials utilization and disposal, including reuse or recycling, after the material's initial use. Thus, these directed energy systems, tools and methods may find application anywhere from the removal of the material, or its source, from the earth, a body water or other source, through any and all processing and delivery steps until the material reaches and is used by a consumer or customer, and its disposal, recycle or reuse. The present directed energy flow assurance methods, systems and tools are applicable to, for example, the geothermal, pipeline, waste handling, water, hydrocarbon, oil and natural gas, chemical, food processing, and pharmaceutical industries.

For example, the directed energy may be in the form of high power laser energy, e.g., a high power laser beam, having sufficient power, properties and characteristics, for delivery to and utilization at remote and difficult to access locations and perform such directed energy operations and activities. These laser operations and activities include laser flow assurance, which includes laser operations and activities to, for example, maintain, assure, enhance, restore, improve, and achieve the flow of materials, such as liquids, gasses, slurries, and mixtures, in articles and structures such as in a tubular, pipe, pipeline, flow line, tunnel, conduit, channel, and production tubing. These laser flow assurance techniques and systems can provide flow assurance from start to finish, and any point in between, in a materials utilization and disposal, including reuse or recycling, after the material's initial use. Thus, these laser systems, tools and methods may find application anywhere from the removal of the material, or its source, from the earth, a body water or other source, through any and all processing and delivery steps until the material reaches and is used by a consumer or customer, and its disposal, recycle or reuse. The present laser flow assurance methods, systems and tools are applicable to, for example, the geothermal, pipeline, waste handling, water, hydrocarbon, oil and natural gas, chemical, food processing, and pharmaceutical industries.

To illustrate these wide and varying systems, tools, methods, techniques and applications, this specification will turn to laser flow assurance in oil and natural gas applications. It being noted that these and variations of these embodiments, as well as others, may be used in other industries and in other applications, e.g., geothermal, desalinization units, turbines, boilers, pharmaceutical, and chemical, without departing from the spirit of the present inventions. And thus, these illustrative oil and natural gas flow assurance embodiments and teachings do not, and should not be used to limit the scope of the present inventions.

During oil and natural gas exploration, production, collection, transportation and processing (e.g., refining), there are many varied conditions that can occur in related equipment and structures that disrupts, fouls, slows down, prevents, or otherwise impedes the flow of hydrocarbons, e.g., oil, crude oil and natural gas. These conditions can develop gradually over time, develop slowly and then accelerate, or develop very quickly and in either anticipated or unanticipated manners. These condition have the potential to greatly reduce production or other activities, if not halt it entirely. They can result in blockages that can cause substantial damage to existing equipment and piping resulting in this equipment having to be removed and replaced, with the associated costs and loss of production time. These blockages may further break free on their own, or during remediation steps, and travel down stream striking and damages other equipment, as well as forming new flow impediments. In some situations the blockages and flow impeding conditions may be so sever as to require abandonment of a well. These flow impeding conditions may be temperature dependent, flow rate dependent, pressure dependent, hydrocarbon composition dependent, and variations and combinations of these, among other contributing factors, which factors are known to those of skill in the oil and gas arts.

In general, laser flow assurance can be conducted by delivering a high power laser beam preferably having a predetermined energy, pattern and beam characteristics to a predetermined area in a well, related equipment, or other equipment, to perform a laser operation that: changes, alters or disrupts one or more of the contributing factors to lessen, or drive conditions away from, the formation of flow impediments; ablates, melts, spalls, vaporizes, softens, solubilizes, and combinations and variations of these, a flow impediment; enhances, causes or drives the action of a cleaning chemical or solvent to remove a flow impediment, lessen the likelihood of formation of a flow impediment, or both; and combinations and variations of these. The laser beam can be delivered as a continuous wave ("CW") or pulsed laser and combinations and variations of these.

The laser beam can be delivered to the work area, as a prophylactic measure to prevent, lessen, manage, or minimize the formation of flow impediments. In this prophylactic application, the laser beam (whether CW or pulsed) can be fired continuously, at set times and for set durations, or it can be fired when well sensors or tests indicate that conditions for creating flow impediments are developing, or that flow has begun to slow.

For active, prophylactic or both, flow assurance measures, the laser beam delivery apparatus can be moved into the well and positioned at the desired location by for example a mobile laser unit, for example and preferably of the type disclosed and taught in US Patent Application Publication No. 2012/0068086, the entire disclosure of which is incorporated herein by reference. The laser beam delivery apparatus can also be prepositioned in the well or equipment at various locations where there is a high or predictable likelihood that a flow impediment may form, or where there is a high or predictable likelihood that the laser can function in a prophylactic manner, and combinations and variations of these. Thus, the laser beam delivery apparatus can be distributed throughout a well, related equipment, other equipment or process equipment at predetermined locations. For such laser flow assurance systems, the laser beam delivery apparatus can be: integral with well tubulars or structures, e.g., casing or production tubing, and related equipment; it can be prepositioned during drilling or casing of the well; it can be positioned as the well is being completed; it can be positioned after completion; and combinations and variations of these. In other applications, such as processing applications, the laser systems and laser delivery apparatus can be similarly positioned or distributed throughout the equipment or infrastructure at strategic, needed or predetermined locations.

Generally, the duration of laser firing (e.g., laser beam propagation to the work area) will exceed the duration (e.g., pulse width) of a single pulse for a pulsed laser; for a CW laser this is not pertinent as both durations are the same. Thus, and typically, during the firing of a pulsed laser for a laser flow assurance operation, there may be hundreds, thousands, and hundreds-of-thousands of individual pulses delivered. However, it should be noted that if the duration of firing is equal to the pulse width, than these two times may be equal.

Laser flow assurance may be conduced during any phase of operation of hydrocarbon production, refining, transport and use. Thus, for example, Laser flow assurance may be conducted: on live wells while they are flowing or producing; on evacuated areas of producing wells that have been sealed (e.g., with a plug); on shut in wells; on plugged wells; on abandoned wells; on horizontal wells; on the junction of horizontal and parent wells; on subsea collection equipment; on subsea production equipment; on well heads; on areas deep within a well; on perforations and perforation areas; on screens; on production areas of a well; on pay zones of a well; on areas of a well near or at the sea floor; on areas of a well deep beneath the seafloor; on areas of a well below the permafrost zone; on areas of a well near or in the permafrost zone; on areas of a well near or at the top of a marine riser; on areas of a well at or near the bottom of a marine rise; on subsea production tubing; on areas of a well at or near the top of the well; on areas of a well at or near a rig floor; on areas of a well at or near the surface of a body of water; on collecting piping, and on transferring piping. It being understood that "on" as used herein, unless expressly provided otherwise, is used in a broad, expansive, and non-limiting manner. Thus, the phrase "on" a tubular would include, for example, within the tubular, in the tubular, adjacent the tubular, at the tubular, at an inner surface of the tubular, and at an outer surface of the tubular.

In embodiments of the present inventions high powered lasers can be used to prevent or remove deposits from wells, pipelines and other pressure containment equipment. Laser flow assurance systems can deliver high power laser beams having greater than about 5 kW, greater than about 10 kW, greater than about 15 kW, greater than about 20 kW, greater than about 40 kW, and greater to target areas or locations near the surface, one the surface, above the surface, or deep within a well. As used in this specification, unless expressly provided otherwise, the term "about" would include reasonable measuring, analysis and experimental errors, and would include up to ranges of plus or minus 10%.

The fouling, e.g., impairment of flow, of conduits, equipment and tubulars used in obtaining, refining and delivering hydrocarbons, among other reasons, may occur from the deposition of heavy organic molecules. The heavier organic molecules or compounds that may deposit out a hydrocarbon stream, e.g., a petroleum fluid and crude oil, would included asphaltenes, asphaltogenic acids, diamondoids, paraffins, waxes, and potentially resins. These compounds separate out from the oil for various reasons and under various conditions and form depositions on components, which can foul the reservoir, the well, pipelines, and oil production and processing equipment and facilities. Asphaltene is one of the more problematic of these fouling compounds and can generally be viewed as acting like a glue or mortar clogging up the flow channels of a system. Among other reasons, mercaptans and organometallics can deposit because of dissociation and solubility effects, as well as, attachment to surfaces. Among other reasons, asphaltenese and asphaltogenic acids deposit because of variations in temperature, pressure, pH, composition of the flow (e.g., mixing of different crude oils), flow regime, surface effects, and electro-kinetic phenomena.

Gas hydrates, e.g., clathrate hydrates, (including methane clathrate or methane hydrate) from when water is present with a gas, e.g., methane and the pressure and temperature conditions become such that an ice crystalline structure forms around a methane molecule. Gas hydrates have the ability to severely restrict flow, to break free and damage downstream equipment, to reform at down stream locations and thus, prior to the present inventions, have proven to be very problematic, difficult to address and costly to hydrocarbon production.

Additionally, scales such a Barium Sulfate, calcium carbonate and other type of inorganic, and metal organic compounds and salts deposit and create flow impairments. These scales are generally characterized by very low, if no, solubility in water. Typically, Barium Sulfate is a major constituent of scales that are found in oil and gas production systems and equipment. These scales are very difficult to remove and at some points they can become so entrenched that, prior to the present inventions, they could only be removed by mechanical milling. Such scale build up could cover tens, hundreds and thousands of feet of piping. They may form, and be quite problematic, at perforation areas and at screens.

Generally, a high power laser beam can be directed to a flow impeding deposit and the deposit can be removed by the laser energies interaction with the deposit. Thus, the wavelength of the laser beam can be such that it is highly absorbed by a bond, or bonds in the deposit, or more preferably the material causing the deposit, and in this way the molecular weight of the material, or the size of an agglomeration of the material, is reduced to a point where it will be carried away by, e.g., solubilized by, or dispersed in, the flow of the hydrocarbon, e.g., the crude oil. In performing such laser operations, the wavelength can be selected to have much greater absorption for the targeted problematic materials and lower absorption for the remaining components of the hydrocarbon flow. The high power laser energy may also be directed on to the deposition gradually melting it and removing it as an obstruction, such as for example with a paraffin blockage or a hydrate blockage. The high power laser energy may also be used to spall, thermally crack, or otherwise fracture and weaken the blockage or build up to the extent that is can be carried away by the flow of the hydrocarbon or more readily acted upon by other treatment chemicals or regimes. Generally, in selecting the laser delivery head and the wave length of the laser beam, the ability to keep the optics clean and free of debris and to have the laser beam path, along which the laser beam travels after being launched from the optics, in good optical communication with the target area, surface or material, e.g., the build up, should preferably be a factor, and more preferably is an important consideration.

Thus, generally, in an embodiment of a preventative technique, the laser energy can be used to alter or "crack" long chain (i.e., high molecular weight) hydrocarbon materials into shorter chain (i.e., lower molecular weight) materials that are less likely to, or will not, impeded the flow of the hydrocarbons from the well, e.g., the shorter chain molecules will not build up and plug the pipes. In many situations these longer chain hydrocarbons, such as asphaltenes, will only cause an impediment to flow under certain conditions. For example, if certain temperatures and pressures are present the asphaltenes can come out of the crude oil, deposit on the inner surface of the well, e.g., the production tubing, and form a blockage in the well, which blockage can severely impede flow, if not stop it all together. Such asphaltene deposits can be over may feet of tubing in the well, from 10 feet, to hundreds of feet, to potentially thousands of feet.

Hydrocarbon product with high asphaltene content can create restrictions or blockage of flow paths in wells, pipelines and production equipment, manifest as deposits on the walls of the transport components, initiated by temperature changes during the transport process.

Asphaltenes are a characterization or group of compounds that covers a range of carbon-based compounds found in hydrocarbon resources such as crude oil and coal. In general, they are organic materials having aromatic and naphthenic ring compounds containing nitrogen, sulfur and oxygen molecules. Asphaltenes are soluble in carbon disulfide; but are insoluble in lighter alkanes, such as n-pentane and n-heptane. When present in oil, Asphaltenes can exist as a colloidal suspension, or a dispersion, stabilized by resin molecules, which can be aromatic ring systems, that are present in the oil. The stability of asphaltene in the oil depends on the ratio of resin to asphaltene molecules, as well as, the quantity of the resin that is present.

Asphaltene precipitates, disassociates or comes out of the suspension or dispersion, as a result of changes in conditions, such as, pressure drop, shear (turbulent flow), acids, solution carbon dioxide, injected condensate, mixing of incompatible crude oils and combinations and various of these and other conditions that weaken or destroy the stability of the asphaltene dispersion in the oil. This coming out of the oil, can cause substantial harm to the production equipment and the ability of the well to produce oil, including a complete stoppage of all flow.

In addition to hydrogen and carbon, Asphaltenes general may contain oxygen, nitrogen, sulfur and trace amounts of metals, such as vanadium and nickel. In general, asphaltenes may have a C:H ratio in the range of about 0.9 to about 1.5, and more typically have been reported at about 1:1.2, and typically have been reported to have molecular weights in the range of about 1,000 Da (Daltons) to about 2,000,000 Da. However, there is a debate as to whether these molecules actually have a weight of about 400-1,500 Da (or potentially even less) but aggregate into larger structures (which are not bonded, and so are technically not a single molecule). Regardless of the outcome of this debate, it is these large structures in the 1,000-2,000,000 Da range that cause flow assurance problems, and which the present inventions, among other things, seek to address. Asphaltenes can have a structure that can be viewed as having a center of stacked, flat sheets of condensed (joined) aromatic rings linked at their edges by chains of alipathic and/or naphthenic-aromatic ring systems. Asphaltenes may aggregate or agglomerate giving rise to compounds or structure of much higher molecular weight, and more complex forms. By way of example, it is believed that an Asphaltene molecule could be on the order of about 1.5 nm in size; a nanoaggregate on the order of about 2-3 nm in size, and a cluster on the order of about 4-6 nm in size.

Further, and generally, asphaltenes may be defined as a family of compounds based on their solubility, which is also the case for resins. Generally, asphaltenes are soluble in an aromatic solvent (toluene) and not in a paraffinic one (n-heptane).

The resin in crude oil, that keeps the Asphaltenes from depositing, e.g., contributes to the Asphaltenes remaining in solution or otherwise dispersed within the oil, are much smaller molecules and are on the range of about 78 to 1,000 Da.

The relatively large size of the Asphaltenes when compared to other components typically found in hydrocarbon production, e.g., crude oil, and due to its size and composition, make the asphaltenes reactive to direct exposure to the energy of a high powered laser beam.

The laser delivery head of a laser flow assurance system can be deployed into a flow of hydrocarbon production and be used to project a high powered laser beam into the flow of production (i.e., in situ), altering at a molecular level the composition of the product to either mitigate or eliminate the potential for deposition of the asphaltene on components, and in particular, on downstream components. In general, an embodiment of a system for in situ treatment of product can have: surface equipment, e.g., above the ground or surface of a body of water; deployment equipment, e.g., an umbilical and an advancement and retrieval device such as a spool, kreel or reel; and down hole components, e.g., a laser treatment assembly or device. The deployment device connects the laser and other surface equipment, such as electrical, control, data acquisition, and operating fluids, with the down hole components; and is used to advance, e.g., lower and raise the down hole components, to the work area, e.g., the location where the laser operation is to take place. The surface equipment and deployment equipment may be of the types disclosed and taught in US Patent Application Publication Nos. 2012/0068086, 2012/0248078, 2010/0044103, 2010/0215326, 2010/0044106, 2012/0020631, and 2013/0266031, the entire disclosures of each of which are incorporated herein by reference.

An embodiment of an in situ laser flow assurance system is shown and described in FIG. 1. A laser treatment assembly 100 is shown deployed in a producing well 101. The laser treatment assembly 100 is deployed in the well 101 by primary umbilical 103. The well 101 has a perforation area 104 into which hydrocarbon product (also referred to herein as product), e.g., crude oil, flows into the well and up to the surface. The laser treatment assembly has a distribution sub 105. The distribution sub 105 is connected to the primary umbilical 103 and an out flow section 106, e.g., a section of perforated deployment tubing. The out flow section 106 is connected by way of deployment tubing section 107, to a first laser module 108. The first laser module 108 is connected by way of deployment tubing 109 to a second laser module 110. Laser module 110 is connected by way of deployment tubing 111, to a third laser module 112. Laser module 112 is connected to a flow inlet section 113. The in flow section 113 has a polished stinger sub 114 that has a sealing member, e.g., a packer 115, associated with it. The laser treatment assembly 100 has an internal processing flow channel 116 that passes through, e.g., connects the flow inlet section 113, the laser modules 112, 110, 108 and the out flow section 106.

In operation the laser treatment assembly 100 is lowered into the well 101 to a position just down stream from, e.g., in FIG. 1 just above, the perforation area 104 where the product is flowing into the well from the formation. (It should be noted that although FIG. 1 shows an essentially vertical well, this assembly and other embodiments of the present inventions can be used in wells other than vertical wells, such as side tracks, horizontally drilled wells, and well of other angles, orientations and configurations.) The packer 115 is set, forming a seal against the inner surface of the well 101 and the outer surface of the polished stinger sub 114. Once sealed the flow of the product from the formation, as shown by arrows 117 flows into the flow inlet section 113 (in this configuration all of the flow from the formation) entering into the polished stinger sub 114 and flowing up (as shown in FIG. 1) the internal flow channel 116, as represented by arrow 118. In this manner all of the flow of product from the well is carried by the internal flow channel 116 from the in flow section 113 to the third laser module 112, where it is laser processed, then to the second laser module 110, where it is further laser processes, and to the first laser module 108, where it is further laser, after which the laser processed product is returned to the well by the out flow section 106, as shown by arrows 119.

Using analytic techniques the percentage of asphaltenes to resins, and the relative ratios of these two components of a crude oil and be determined. SARA-separation is an example of one type of analysis that can be used to make these determinations. In SARA-seperation analysis the crude is characterized into four groupings: saturates; aromatics; resins; and asphaltenes. ASTM standards relating to this analysis are for example ASTM D4124-09, ASTM D3279-07, and ASTM D6560-12. Other techniques for determining the resin:asphaltene ratio and percentages may also be employed. For example these techniques are discussed in N. Aske, *Characterization of Crude Oil Components, Asphaltene Aggregation and Emulsion Stability by means of Near Infrared Spectroscopy and Multivariate Analysis* (Thesis, Dept. of Chem., Norwegian University of Science and Technology Trondheim, 2002) (hereinafter "Aske, Characterization of Crude"), A Hammami, et al., *Asphaltenic Crude Oil Characterization: An Experimental Investigation of the Effect of Resins on the Stability of Asphaltenes*, Petroleum Science and Technology, Vol. 16, Issue 3-4, pages 227-249 (1998), S. Andersen, *Petroleum Resins: Separation, Character, and Role in Petroleum*, Petroleum Science and Technology, Vol. 19, Issue 1-2, pages 1-34 (2001), the entire disclosure of each of which are incorporated herein by reference.

The following table provides examples of likely values for asphaltene and resin contents of crudes, and examples of likely changed content of these crudes from a laser cracking treatment.

can: reduce the amount of asphaltenes in the crude oil by at least about 5% (relative % change, e.g., 5% of the original asphaltenes), by at last about 10%, by at least about 25%, by at least about 50% and more; increase the amount of resins in the crude oil by about 1% or more, by about 5% or more, by about 10% or more, by about 15% or more and by about 25% or more; a decrease in the relative percentage asphaltene to resin value $$\left(\frac{\text{Aslphaltene } wt \text{ \% of crude}}{(\text{Aslphatene } wt \text{ \% of crude} + \text{Resin } wt \text{ \% of crude})} \times 100\right)$$

by at least about 0.1 percentage points, by at least about 0.2 percentage points, by at least about 0.5 percentage points, by at least about 1 percentage points, by at least about 2, percentage points, by at least about 5 percentage points, by at least about 10 percentage points, by at least about 15 percentage points, and more; and combinations and variations of these.

Further, and in particular, for several reasons laser processing has the ability to increase the stability of the asphaltenes in the oil, thus preventing, greatly reducing, or reducing the likelihood that they will precipitate out of the oil. Thus, the laser processing can provide an increase in S-value (S-value as determined by ASTM D157-09), and preferably an increase of at least about 0.05, about 0.1, about 0.15, about 0.2 and greater.

In the embodiment of FIG. 1 the three laser modules 108, 110, 112 are evenly spaced, i.e., the length of deployment tubing 111 and deployment tubing 109 are essentially the same. In this embodiment the laser modules 108, 110, 112 are also serially configured, i.e., the flow from the first proceeds to the second and so one. It should be understood

| wt % resin (R) | wt % asphaltene (A) | Relative % Asphaltene to Resin = A/(A + R)*100 ("% AR") | First Laser Process[1] | | Second Laser Process[2] | | Third Laser Process[3] | |
|---|---|---|---|---|---|---|---|---|
| | | | wt % asph. | % AR | wt % asph. | % AR | wt % asph. | % AR |
| 15.2 | 0.4 | 2.6% | 0.3 | 2.2% | 0.3 | 2.0% | 0.3 | 1.7% |
| 14.2 | 0.3 | 2.1% | 0.3 | 1.8% | 0.3 | 1.6% | 0.2 | 1.4% |
| 20.4 | 2.1 | 9.3% | 1.8 | 8.0% | 1.8 | 7.4% | 1.7 | 6.5% |
| 12.2 | 1.5 | 10.9% | 1.3 | 9.5% | 1.3 | 8.7% | 1.2 | 7.6% |
| 16.0 | 1.4 | 8.0% | 1.2 | 6.9% | 1.2 | 6.3% | 1.1 | 5.6% |
| 24.5 | 3.5 | 12.5% | 3.0 | 10.8% | 3.0 | 9.9% | 2.8 | 8.8% |
| 3.6 | 10.4 | 74.3% | 8.8 | 71.1% | 8.8 | 69.1% | 8.3 | 66.0% |
| 4.3 | 3.4 | 44.2% | 2.9 | 40.2% | 2.9 | 37.9% | 2.7 | 34.7% |
| 19.9 | 12.4 | 38.4% | 10.5 | 34.6% | 10.5 | 32.5% | 9.9 | 29.5% |
| 15.2 | 6.6 | 30.3% | 5.6 | 27.0% | 5.6 | 25.1% | 5.3 | 22.6% |
| 14.2 | 12.3 | 46.4% | 10.5 | 42.4% | 10.5 | 40.1% | 9.8 | 36.8% |
| 20.4 | 12.4 | 37.8% | 10.5 | 34.1% | 10.5 | 32.0% | 9.9 | 29.0% |
| 12.2 | 8.6 | 41.3% | 7.3 | 37.5% | 7.3 | 35.3% | 6.9 | 32.2% |
| 16.0 | 5.0 | 23.8% | 4.3 | 21.0% | 4.3 | 19.5% | 4.0 | 17.4% |
| 24.5 | 13.0 | 34.7% | 11.1 | 31.1% | 11.1 | 29.1% | 10.4 | 26.3% |
| 3.6 | 1.5 | 29.4% | 1.3 | 26.2% | 1.3 | 24.4% | 1.2 | 21.9% |
| 4.3 | 5.5 | 56.1% | 4.7 | 52.1% | 4.7 | 49.7% | 4.4 | 46.2% |
| 19.9 | 3.4 | 14.6% | 2.9 | 12.7% | 2.9 | 11.7% | 2.7 | 10.3% |
| 9.2 | 9.3 | 50.3% | 7.9 | 46.2% | 7.9 | 43.9% | 7.4 | 40.5% |

[1] 15% reduction in Asphaltenes
[2] 15% reduction in Asphaltenes, 10% increase in resin
[3] 20% reduction in Asphaltenes, 19% increase in resin Laser in situ processing of crude oil reduces the relative amount of asphaltenes present, to increase the relative amount of resin present, and combinations and variation of both, to lessen, reduce or eliminate the deposition of asphaltene containing deposits. Thus, laser in situ processing that that the spacing between the modules may be different, and that more or fewer modules may be used in a laser treatment assembly. Additionally, the modules may be arranged such that some or all of their flow paths are in parallel. If configured in parallel, more than one module may see, e.g., process, unprocessed product, i.e., product that has not been laser treated, exposed to the laser beam. For example, and depending upon flow rate, down hole conditions, and characteristics of the hydrocarbon product flowing from the formation, two modules may be used to process the product flowing from the formation (unprocessed product, crude) and the flow of laser processed product from these two modules combined to a third laser module, with the now twice-processed product from the third laser module flowing to a fourth laser module. Other configurations of modules may be used, for example two parallel flow configurations of three serially connected modules each. While the flow may be parallel, the actual location of the modules in the laser treatment assembly may be stacked, e.g., positioned one after the other along the longitudinal axis of the assembly. Additionally, the modules may be operated simultaneously, or on different, varied, but preferable predetermined and coordinated duty cycles.

Turning back to the embodiment of FIG. 1, the primary umbilical 103 contains three stainless steel umbilicals, 120, 121, 122, each having a high power optical fiber, and fluid communications line for a laser module, these umbilicals may also have additional lines for data and control information and for electric power associated with them. The stainless steel umbilicals 120, 121, 122 leave the distribution sub 105 and travel down the exterior of the tubing joints to each to their respective laser module: umbilical 120 to module 108; umbilical 121 to module 110; and umbilical 122 to module 112. It being understood that the individual umbilical and fiber could originate at the distribution sub, or could extend within the primary umbilical to the surface. A control line for the packer 115 may be associated with umbilical 122 or it may be separately run to the packer 115.

Figure 2:
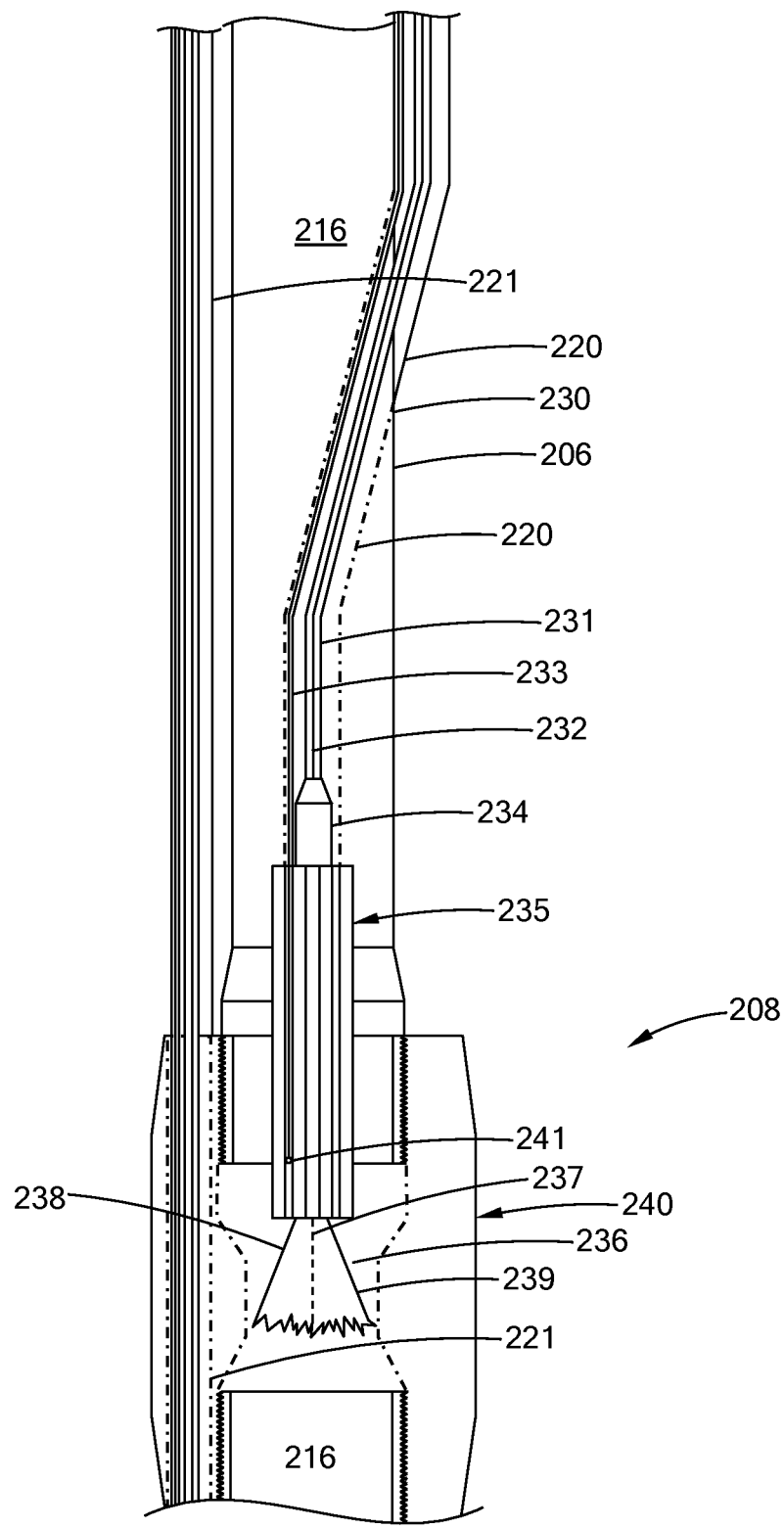
FIG. 2 is cross sectional view of an embodiment of a laser tool in accordance with the present inventions.

An embodiment of a laser module that may be used in a laser treatment assembly is shown and described in FIG. 2. The laser module 208 is attached to deployment tubing 206. Stainless steel umbilical 220 enters into the deployment tubing 206 through opening 230 in tubing 206. In this manner umbilical 220 passes from outside the deployment tubing 206 (in the annular space between the tubing 206 and the well) to inside the deployment tubing 206, and into the internal flow channel 216. The stainless steel umbilical 220 has an optical fiber 232 enclosed in a metal tube 231 ("FIMT"). The stainless steel umbilical 220 has associated with it an electric conductor 233. The FIMT 232, 231 terminates at a high power optical connector 234 (which for example may be of the type disclosed and taught in U.S. patent Ser. No. 13/486,795, the entire disclosure of which is incorporated herein by reference), which launches the laser beam along a laser beam path into the optics package 235, having an optics assembly having for example beam shaping and characterizing optics such as a collimator and a focusing lens. The laser beam 236 exits, i.e., is launched, propagate, fired from, the optics package 235 and travels along laser beam path 237 in product treatment area 239. The laser beam 236 is configured to have a predetermined laser beam pattern 238, which pattern is provided by the optical assembly.

The laser beam pattern 238, and the energy that this pattern delivers to the hydrocarbon product as that product flows through the treatment area 239, is determined based upon several factors, such as, the flow rate of the product, the transitivity of the product for the selected wavelength of the laser beam, the power of the laser beam, e.g., kW, the total number of modules that are going to be deployed, the desired end point characterization of the product (e.g., amount of asphaltene reduction to reach acceptable limits to avoid impeding flow), the power density of the laser beam, e.g., $kW/cm^2$, the nature of the asphaltenes or other larger molecules that are to be changed by the laser treatment process, as well as the relationship of the module to any other modules that may be present in the laser treatment assembly, or assemblies.

Additionally, care should be taken to configure the treatment area 239 and optics package 235 to minimize and preferably prevent the laser launch face, e.g., a window, of the optics package 235 from becoming contaminated with hydrocarbons, dirt, debris or other materials that could cause rapid heating from the laser beam and the potential failure of the optics package and surrounding structures. For example, a gas, e.g., air, nitrogen, or inert gas, or a fluid, e.g., water, oil, that has good transmissivity for the laser beam wavelength may be discharged and used to keep launch face clean. Additionally a solvent of other chemical to assist in the laser treatment process may be injected at this point. Such treatment fluids, if having acceptable, and preferably low, absorptivity for the wavelength of the laser may be used to keep the launch face clean.

The distal end of the optics package 235 and the treatment area 239 are housed by a module body 240. Temperature sensor 241, as well as other sensors or monitoring devices may be associated with the treatment area 239, or the flow channel either downstream, upstream, or both from the treatment area 239. There is also a section of the stainless steel umbilical 221 for an upstream laser module (not shown in FIG. 2, and which would be below module 208 in the orientation of FIG. 2).

As hydrocarbon product flows downstream, (upward as oriented on FIG. 2) it moves along flow channel 216 and enters the treatment area, where it passes through the laser beam pattern 238, in this configuration the operable area of the laser beam pattern 238 extends out to the inner surface of the flow channel. Other configurations of the laser pattern, with respect to the shape of the flow channel in the treatment area are contemplated. Thus, the laser beam pattern may only treat a portion of the hydrocarbon flow, e.g., about 80%, about 70%, about 50% or less, with down stream serially positioned modules doing the same or more. Although this may require more modules positioned serially in the laser treatment assembly, or more serially positioned laser treatment assemblies in the well, it could reduce the risk to optics packages by providing for the removal of laser processed product from the beam pattern by the product flow that is moving around the beam pattern. Other configurations and shapes of the flow cavity before, in and after the laser treatment area are contemplated.

In general, laser flow assurance modules or assemblies can be lowered in to the well or pipeline using a deployment tubing, for example, coiled tubing or wireline, and if needed with a setting component, an isolation sealing component and a latch/unlatch component. Preferably, the umbilical is continuous to surface, with the umbilical sealed at the wellhead. Contained within the umbilical can be the high power laser optic fiber(s), which can be housed in stainless steel protective tube(s), the electrical conductor(s), and an area, e.g., a channel, for the flow of fluid, e.g., liquid or gas, to provide any needed fluid feed to the modules. The umbilical is attached to, e.g., in optical communication with, a source of a high power laser beam, and depending up the desired requirements and performance features, may also be attached to a source for electrical feed, a source for sending or receiving data and control information, and a source for providing a fluid flow. Thus, the umbilical and surface equipment, systems, may be of the type disclosed and taught by US Patent Application Publications 2012/0068086 and 2012/0248078, the entire disclosures of each of which are incorporated herein by reference.

In an embodiment, the laser module preferably has an outside diameter to fit appropriately within the production tubing or casing of the well, or within the pipeline inside diameter if installing into a pipeline. These modules can be connected with deployment tubing joints, with the stainless steel protective tubing housing the optical fiber running to the outside of the deployment tubing until just above the receiving module, at which point the tubing will enter to the interior of the deployment tubing. Inside the deployment tubing, just above the module, the optical fiber may terminate to a connector, with a finned collimator fitted with lenses.

In an embodiment a laser fluid, e.g., a liquid or gas that the laser beam at a predetermined wavelength can be readily transmitted through with acceptable losses and heat generation, will fill the umbilical protective tubing and be used to keep product and debris from the launch face of an optics package, as well as, potentially to keep the optics assembly clean and to potentially manage the temperature of the optics assembly, e.g., cool it. The laser fluid, along with the flowing hydrocarbon product, can be used to dissipate heat from the connector, the optics package, and other components within a laser treatment assembly. Safety shut down systems may be employed such as the use of a temperature sensor, mounted within the optics package and connected to surface via an electric conductor. Such system can be used to monitor the temperature of the optical, or other, components and shut down the laser should the temperature increase above acceptable levels. The increased heat may be a result of decreased well flow, or due to a malfunction of the laser fluid fill within the stainless steel umbilical protective tubing or for other reasons. Monitoring, control and safety systems for high power field laser systems are taught and disclose in the following US patent applications, publication nos. 2012/0273269, 2012/0248078, and 2012/0068086 the entire disclosures of each of which are incorporated herein by reference.

The total number of modules to be run in to a well may be determined by, among other things, the transmissivity of the flowing product, the flow rate of the product, any change in transmissivity of the product if the modules are in a serial processing configuration, the amount of asphaltene within the product, the amount of resin within the product, the desired resin to asphaltene ratio that the laser processing is to obtain, and combinations and variation of these.

Deployment of the laser modules can be for example done in a two-step process, with either coiled tubing or a wireline unit setting a packer within the tubing, and then a coiled tubing unit used to deploy a module assembly or laser treatment assembly. A distribution sub, sitting atop the assembly can serve as the connection for deployment, as well as the component to gather and distribute the laser fluid used in the process and the fibers for the individual modules. A polished stinger sub can be located at the bottom of the lowest module and is placed thought the sealed bore on the previously set packer, providing isolation and directing the product flow through the modules. At the surface, the umbilical is passed through the wellhead, and the feed fluid/gas, and fibers connected to the source components, and the monitoring devices connected. Once the well is allowed the flow and product is through the modules, the fluid/gas and laser are started, and treatment of the flow begun.

As the produced fluid passes through the module flow path, the laser beam of a determined power is projected into the fluid, and through selective absorption, the asphaltenes or other preselected components are altered, either in whole, or in part, to reduce or eliminate the possibility of precipitation within the system. However, it is noted that applicants do not wish to be bound by any one theory of chemical interaction between the laser beam, laser energy and the complex compositions present in a wellbore. Thus, other processes, such as non-selective absorption, as well as others, could play a role in some circumstances in the laser treatment of borehole fluids and materials.

Laser flow assurance may also be utilized in laser remediation operations, e.g., the removal, opening up, or lessening of flow impediments or restrictions in wells, related equipment and processing equipment. In general, an embodiment of a system for laser remediation operations can have: surface equipment, e.g., above the ground or surface of a body of water; deployment equipment, e.g., an umbilical and an advancement and retrieval device such as a spool, kreel or reel; and down hole components, e.g., a laser treatment assembly or device. The deployment device connects the laser and other surface equipment, such as electrical, control, data acquisition, and operating fluids, with the down hole components; and is used to advance, e.g., lower and raise the down hole components, to the work area, e.g., the location where the laser operation is to take place. The surface equipment and deployment equipment may be of the types disclosed and taught in US Patent Application Publication Nos. 2012/0068086, 2012/0248078, 2010/0044103, 2010/0215326, 2010/0044106, 2012/0020631, and 2013/0266031, the entire disclosures of each of which are incorporated herein by reference.

Figure 4:
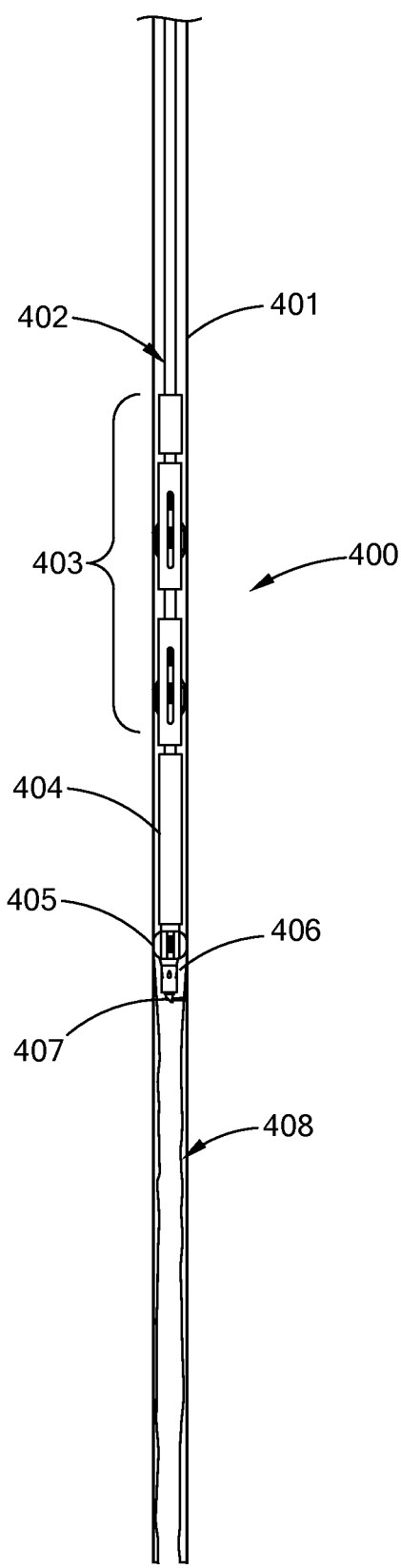
FIG. 4 is a perspective cross sectional view of an embodiment of a laser tool in accordance with the present inventions.

Turning to FIG. 4 there is shown a perspective schematic view of an embodiment of a laser remediation assembly 400, as deployed within production tubing 401 having a deposit 408 that is impeding the flow of crude oil. The assembly 400 is attached to an umbilical 402, e.g., composite tubing, that has a high power laser fiber and other electrical and fluid support channels associated with it. The assembly 400 has a tractor section 402 that can advance and retrieve the tool 400 in the tubing 401, and a motor section 404 that can rotate a lower section of the tool, which has a scraper 405, optics package section 406 and a laser head 407. In operation the high power laser beam is transmitted by the optical fiber to the optics section where the laser beam shaped to a predetermined beam pattern, the laser beam is then launched from the laser head 407 along a laser beam path 409 and onto the deposit 408. The laser head is then rotated, rotating the laser beam, along the inner circumference of the production tubing 401. In this manner the laser beam removes, and/or weakens the deposit, which if any remains is further removed by the scrapper 405. Preferably, very little mechanical force will be required for the scraper to remove any remaining blockages, after the initial laser pass, because the laser beam will have substantially weakened any remaining blockage material. The motor section, optics section and laser head sections may be of the types taught and disclosed in US Patent Application Publication Nos. 2012/0074110 Ser. Nos. 13/403,509, 13/782,869, and 13/768,149, the entire disclosures of each of which are incorporated herein by reference.

Figure 5:
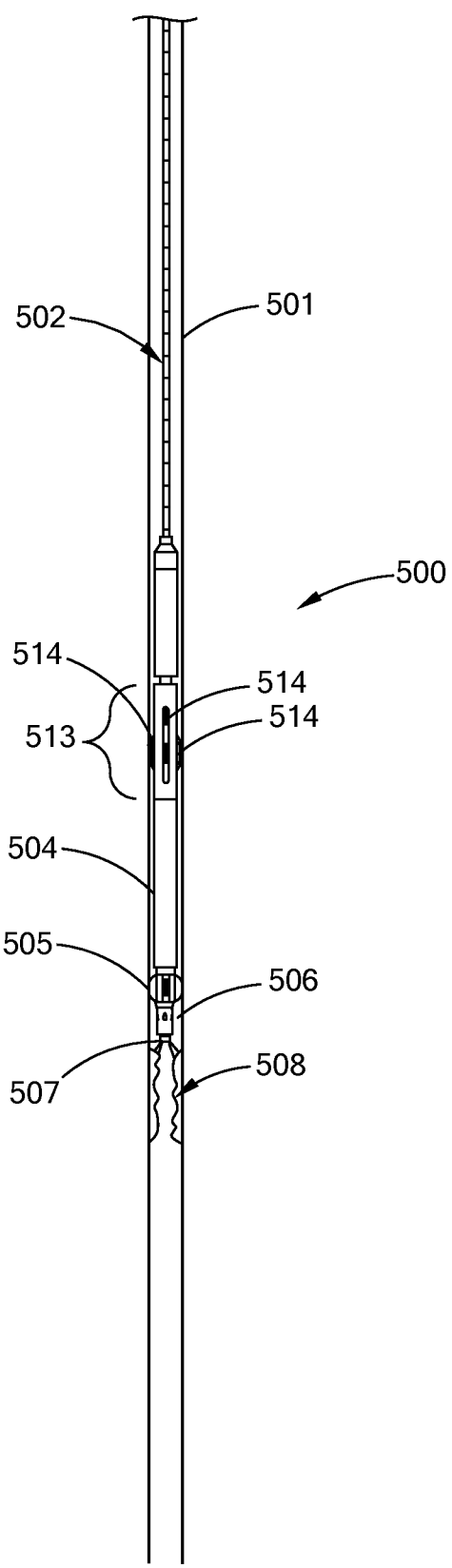
FIG. 5 is a perspective cross sectional view of an embodiment of a laser tool in accordance with the present inventions.

Turning to FIG. 5 there is shown a perspective schematic view of an embodiment of a laser remediation assembly 500, as deployed within production tubing 501 having a deposit 508 that is impeding the flow of crude oil. The assembly 500 is attached to an umbilical 502, e.g., a wire line, that has a high power laser fiber and other electrical and fluid support channels associated with it. The assembly 500 has a centralizer section 513 that has rollers 514. The rollers prevent rotation of the tool when the laser head is rotated, while at the same time allow the tool to be advanced into the well with minimum friction. The umbilical 502 that can advance and retrieve the tool 500 in the production tubing 501, a motor section 504 that can rotate the lower section of the tool, which has the scraper 505, optics package 506 and the laser head 507. The optics package and laser head 507 deliver the laser beam in a planer pattern that contacts the entire inner surface of the tubular 501 and the deposits on that surface in a line around the inner circumference. Preferably, very little mechanical force will be required for the scraper to remove any remaining blockages, after the initial laser pass, because the laser beam will have substantially weakened any remaining blockage material. The motor section, optics section and laser head sections may be of the types taught and disclosed in US Patent Application Publication Nos. 2012/0074110 Ser. Nos. 13/403,509, 13/782,869, and 13/768,149, the entire disclosures of each of which are incorporated herein by reference.

The embodiments of FIGS. 4 and 5, as well as other embodiments, that are referred to as laser remediation assemblies or tools, may also be capable of and can be used for other applications, such as, in situ cracking and resurfacing. Similarly, embodiments that are referred to as preventative or prophylactic may also be capable of, and can be use for, other laser applications.

Generally, in doing laser remedial operations it is desirable to have the well flowing. In this manner as the laser weakens, melts, solubilizes, e.g. effects the material forming the blockage or buildup, this laser affected material can be removed and carried out of the well by the flowing product. To further assist in the removal of the laser affected blockage material a laser gas jet may be used. The gas from the laser jet, in additional to provided a clearer laser beam path for the beam to reach the surface of the blockage, helps to lift or float the removed material out of the well. If an isolation zone is to be utilized at the work area it may be created by isolation members, such as a packer of packers. Laser gas jets and movable isolation zone assemblies and techniques are taught and disclosed in US Patent Application Publication Nos. 2012/0067643 and 2012/0074110, the entire disclosures of each of which are incorporated herein by reference.

Figure 3:
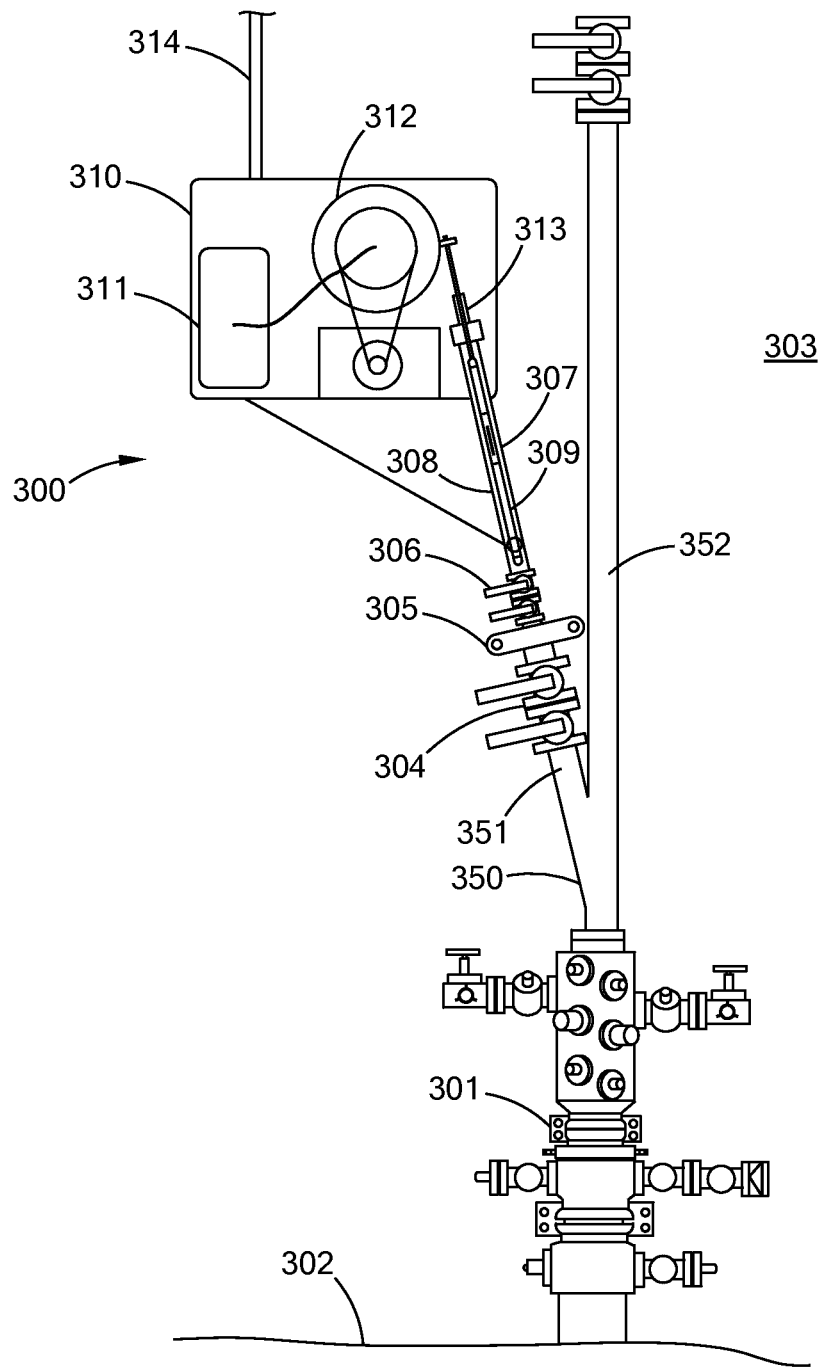
FIG. 3 is a perspective view of an embodiment of a laser system in accordance with the present inventions.

Turning to FIG. 3 there is shown a schematic perspective view of a subsea laser remediation assembly 300. A subsea production tree 301 is located on the sea floor 302 below the surface (not shown in the figure) of a body of water 303. The tree 301 has a permanent riser assembly 350 attached to it. The permanent riser assembly 350 is in a "Y" configuration, with one branch 352 extending vertically to provide intervention access and the other branch 351 providing access for the laser remediation tool. The branch 351 has a riser isolation valve 304, a riser clamp 305. The laser assembly 300 has a deployment valve 306 that is attached to clamp 305 to connect and hold the laser assembly 300 in association with riser 350. The laser assembly 300 has a laser tool deployment housing 307, that forms a cavity 309 in which the laser tool 308 is housed. When the valves 306 and 304 are opened the cavity 309 is in fluid communication with the riser branch 351 and the tree 301. The laser assembly 300 has a laser container 310 that is sealed for protection from the sea and contains a high power laser 311, a conveyance reel 312 and a conveyance pack-off 313. The laser container 310 can be pressure compensated or at atmospheric pressure. Electric power, fluids of any laser jet, communication and data links are provided to the laser assembly 300 by umbilical 314.

Figure 6:
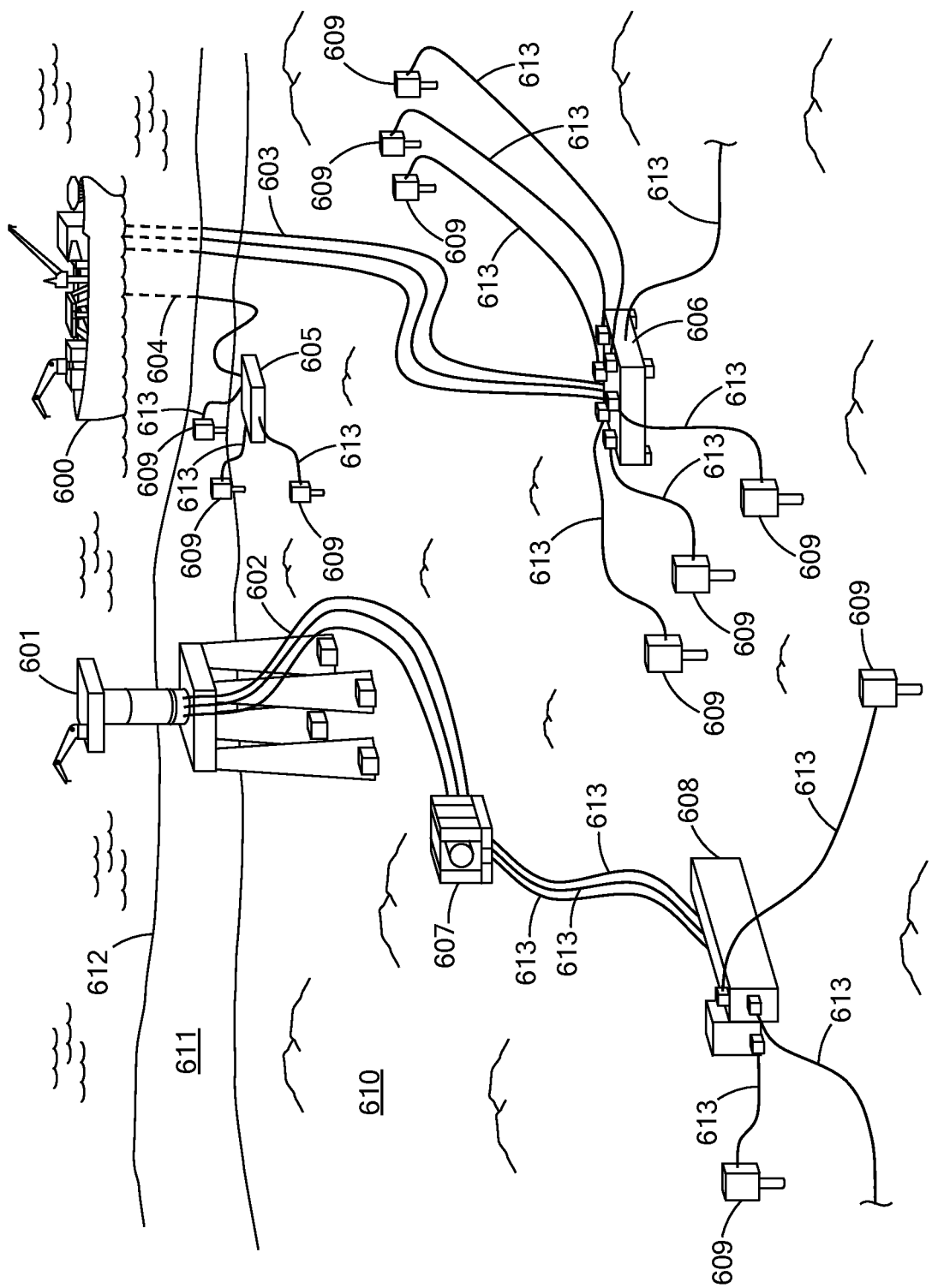
FIG. 6 is a perspective view of an embodiment of a deployment of a laser tool system in a subsea production field in accordance with the present inventions.

Turning to FIG. 6 there is shown a perspective view of a subsea oil field. A FOSP 600 and a spar platform 601 are located on the surface 612 of a body of water 611. These collection platforms 600, 601 are connect to the sea floor oil field equipment by lines 603, 604, and 602, with lines 603 connecting FOSP 600 to manifold 606 on the sea floor 610, with lines 604 connecting FOSP 600 to manifold 605 on sea floor 610, and with lines 602 connection spar 601 to manifold 607 on the sea floor 610. Flow lines 613 connect subsea trees 609 to subsea manifolds 607, 606, 605. Additionally flow lines 613 connect subsea manifold 608 to subsea manifold 607. The laser and riser assembly of the embodiment of FIG. 3 can be associated with one, two, three or all of the trees in the subsea field of the embodiment in FIG. 6.

Buildup, fouling and flow impairment of the subsea flow lines 613 can be a problem, if not a significant problem in some subsea fields. These flow lines are generally horizontal and typically follow the contour of the sea floor. Thus, they may raise and lower with the sea floor, in some field they may be buried beneath the sea floor. Prior to the present inventions conventional flow assurance measures were costly, time consuming and did not fully address the flow assurance needs for such fields. Thus, a laser-tractor PIG assembly may be used to address these needs. The laser-tractor PIG assembly has a high power laser delivery head, an electric driven tractor, and a laser power converter to convert laser energy into electrical energy to power the tractor. Either a single high power laser fiber, or two laser fibers, one for the power converter and the other for the laser head, can be used. Additional fibers may also be used. The high power laser fibers form a laser-PIG tail, e.g., an umbilical, which weighs substantially less than a conventional umbilical and metal wire power supply for the tractor, and thus has substantially less drag as the tractor pulls the PIG-tail along the flow lines on the sea floor. One, some, all and preferably all problematic flow lines on the sea floor are fitted with laser-PIG launchers and receivers. The launchers and receivers allow the laser-tractor PIG to be launched into a flow line, which is still flowing product and be recovered from that line after the laser flow assurance operation has been performed. An ROV may be used to position the laser-tractor PIG in the launcher and recover it, or the laser PIG may be pre-positioned in the launchers. Laser PIG, laser PIG launchers and receivers, Laser ROVs, and laser power converters are taught and disclosed in US Patent Application Publication Nos. 2012/0266803, 2012/0273470 and 2012/0255933, the entire disclosures of each of which are incorporated herein by reference.

Generally embodiments of laser flow systems may be integrated into an embodiment of a "well maintenance" system, with configurations for surface wellheads and subsea wellheads. The surface wellhead configuration, can be typically set up for application on a fixed leg offshore platform, and could be an easily manipulated system that would allow access to all of the well trees on the platforms with minimal effort and equipment movement. These tools would be run into the wells on a frequency dictated by historical data, or real time sensing and analysis, to clean the tubular components of any accumulated deposition. A similar configuration would be used for pipelines running to and from an offshore installation, with the tool passed through the pipe on a schedule to prevent flow assurance issues.

Sub-sea configurations may include a special riser assembly mounted atop the sub-sea production tree, providing two legs, one for the deployment of the laser tool, the other to allow access for intervention other than the laser tool. An atmospheric chamber houses the laser, the reel for the conveyance component, the pack-off for the well seal when operating and the laser tool, and is clamped to the riser assembly by way of a removable clamp to allow the unit to be transported to the surface for maintenance or repair. The unit will be connected to surface equipment via an umbilical, which will provide the power for the unit, the movement of either gas or fluid needed for process, and electrical conductors for remote control of the unit, as well as monitoring.

Laser flow assurance systems may allow for the regular maintenance of wells with known flow assurance issues without the need for installation of chemical injection systems and without an intervention procedure done on a call out basis. Interventions are often put off until absolutely needed due to cost and logistics, with a constantly diminished flow of product occurring between the interventions. These systems will allow a regular cleaning of the well or pipeline, with little or no loss in production.

One of the benefits of some of the embodiments of the present flow assurance systems, tools, techniques and methods is the elimination of the need for, and use of, costly and hazardous chemical, boil out, and flushing procedures, many of which require the shutting down of production. These conventional treatments may still be used with laser flow assurance treatments to enhance the flow assurance processes. Thus, the present inventions contemplate the use of laser energy enhanced chemical treatments and additives, which preferably provide a synergistic effect when used with, or as a part of, a laser flow assurance application.

Hydrate plugs form when gas and water are common in a flow system and the molecules of each combine under certain temperature and pressure situations to form an ice plug in the system, either restricting or stopping the flow of the product. This restriction or plug will result in diminished production and typically requires intervention methods to correct it. The hydrate plugs may occur downhole in wells, within pipelines, and in other pressure containment components within a production system. Laser flow assurance systems provide for the conveyance of a device that uses a high powered laser energy to apply targeted energy to the plug and melt it, without the need for pumping of chemicals to melt the plug or milling on the plug with a motor and bit to remove.

Laser flow assurance systems and techniques may also be used for the removal of chemical scale deposition within wells, which systems may use the laser alone, or in combination with mechanical means, chemical means, and combinations and variations of these. Some formations produce chemicals that, when mixed with or contaminated by produced or injected water, will cause deposits to accumulate on the walls of the downhole tubulars in wells, and in pipelines transporting the produced product to facilities. Laser flow assurance systems and techniques can provide laser devices capable of removing these deposits, preferably with no or minimal mechanical assist, lessening the potential of damage to containment components and not requiring the use of harsh or environmentally unfriendly chemicals.

Laser flow assurance tools, techniques and systems can be used for clearing of plugged perforations by using a downhole laser device. Pressure changes at the well to formation interface can cause the perforations to become restricted or plug with deposits, resulting in diminished production. A laser tool can be used to remove the deposits within the production casing or liner, and re-open the perforations. The process is possible with or without mechanical assist, allowing the process to be done in passing through smaller tubing and removing the deposits within the perforations done in a larger diameter pipe below the tubing. A laser tool is passed through the area of perforations with the centralizer engaged and keeping the laser head centered within the pipe. As the tool is lowered, the laser head spins, providing 360° coverage of the inside of the tubing/pipe. Within the tool an analytical device can be run as the tool is being lowered and spinning to determine the amount of deposit on the tubing, integral to the tool, and adjust the laser power to remove the deposit without risk to the tubing/pipe beneath the deposit. The analysis can also determine when a perforation is being crossed with the beam, and allow the beam to penetrate into the perforation to remove deposits that may be inside of the perforation channel, e.g., reopening the perforations.

Cutting of tail pipe plugged or restricted by scaling within a wellbore can be performed with a laser flow assurance tool. Often deposits will collect within production tubing near where the tubing ends, or at the tubing "tail." This portion of the tubing is typically located below the packer used to isolate the lower perforated section of the casing or liner from the upper section, directing the fluid of product into the production tubing. Often the cutting of the tubing that has been blocked is a better option that attempting to clean, eliminating the affected pipe and reducing the chance of reoccurrence with a repositioning of the entry point of product in to the production tubing. A laser tool can be run in to the well with either for example, coiled tubing or a wireline type of conveyance to the depth of desired cut, centralized and anchored utilizing the electrically actuated tractor/centralizer assembly, then the rotating laser head used to sever the lower section of the tubing. By controlled projection of the beam and the beam properties, the tubing will be cut without possible damage to the casing behind the tubing.

In general, when dealing with cleaning activities, and by way of example, the power of the laser energy that is directed to a surface of the workpiece should preferably be such that the foreign substance, e.g., a biofilm, wax, etc., is removed or sterilized, by heating, spalling, cutting, melting, vaporizing, ablating etc., as a result of the laser beam impinging upon the foreign substance, but the underlying structure or surface is not damaged or adversely affected by the laser beam. In determining this power, the power of the laser beam, the area of surface that the laser beam illuminates, and the time that the laser beam is illuminating that surface area are factors to be balanced.

The parameters of the laser energy delivered to a work area or substrate having an unwanted material should be selected to provide for the efficient removal, or degradation of the unwanted material, while minimizing any harm to the substrate. The laser delivery parameters will vary based upon, for example, such factors as: the desired duty cycle; the surface area of the substrate to be cleaned; the composition of the substrate; the thickness of the substrate; the opacity of the unwanted material; the composition of the unwanted material; the absorptivity and/or reflectivity of the unwanted material for a particular laser wavelength; the absorptivity and/or reflectivity of the wanted material for a particular laser wavelength; the geometry of the laser beam; the laser power; the removal speed (linear or area); as well as, other factors that may be relevant to a particular application. Although continuous wave and pulsed delivery lasers may be useful in addressing the issue of unwanted materials in or on structures such as for example pipelines, or in or on other substrates, pulsed laser have been shown to be particularly beneficial in some applications and situation. Without limitation to the present teachings and inventions set forth in this specification, the following US patents set forth parameters and methods for the delivery of laser energy to a substrate to remove unwanted materials from the substrate: U.S. Pat. No. 5,986,234; RE33,777, U.S. Pat. Nos. 4,756, 765, 4,368,080, 4,063,063, 5,637,245, 5,643,472, 4,737,628, the entire disclosures of each of which are incorporated herein by reference. It is noted, however, that although providing general teachings about laser beam parameters and delivery none of these references provided or suggest laser flow assurance, and in particular laser flow assurance in oil, gas and geothermal energy exploration and production, either down stream or up stream.

Figure 9:
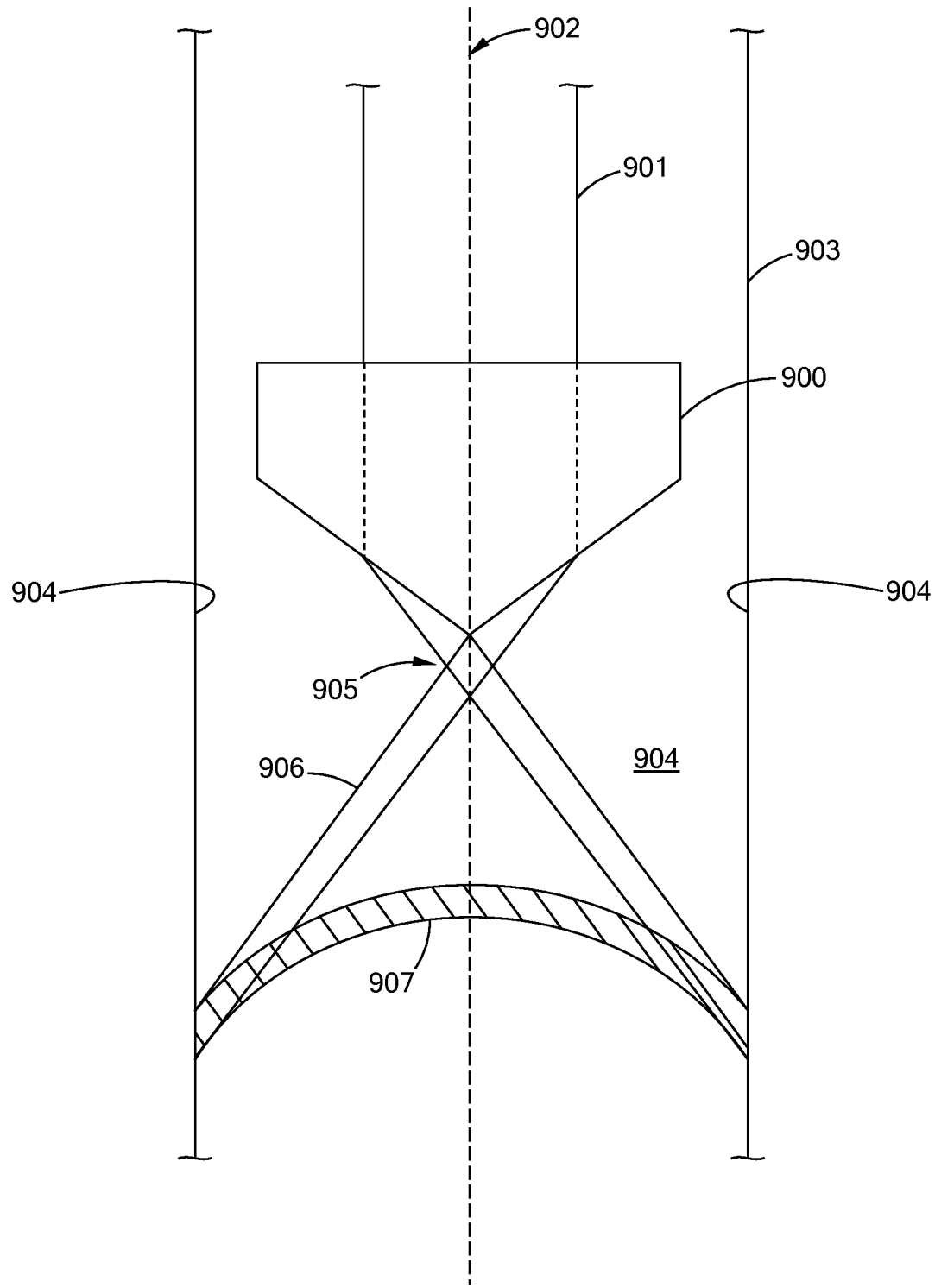
FIG. 9 is a schematic of an embodiment of a laser tool optic and laser beam pattern in accordance with the present inventions.

Turning to FIG. 9 there is shown a schematic of an embodiment of an optics assembly for use in a laser tool. The optics assembly provides a radially expanding conical beam pattern. Thus, the entire inner circumference of a tubular can be contacted by the laser beam without rotating the tool, laser head or optics. An axicon lens 900 is shown positioned relative to a tubular 903 having an inner surface 904, which surface is a work surface to be laser treated. A collimated circular laser beam shown by ray trace lines 901 enters the axicon 900, travels through the axicon and exits in a beam pattern that initially, at arrow 905, is characterized as a Bessel pattern and then becomes an expanding annular pattern, e.g., a hollow cone, arrow 906. The annular pattern strikes the work surface 904 in a ring, or band, shaped pattern 907 that extend around the entirety of the inner circumference of the tubular. Although shown as a collimated beam entering the axicon, the beam may also be diverging or converging, and may have a Gaussian distribution or other distributions.

Figure 10:
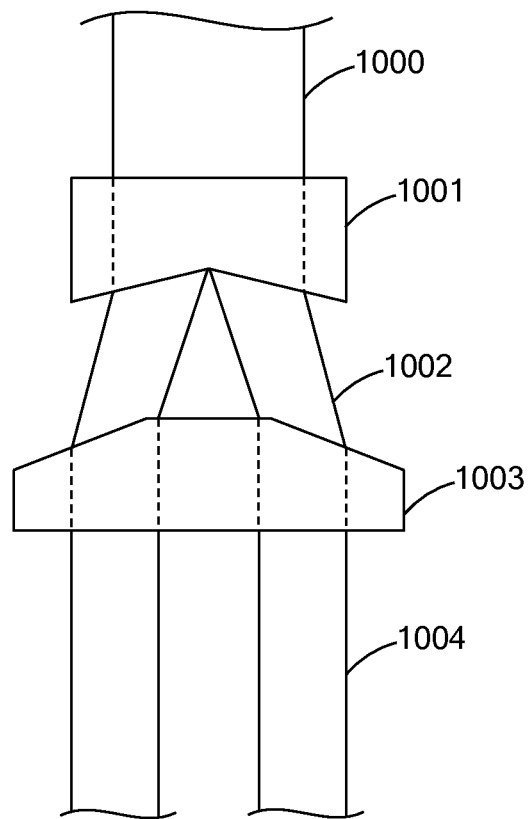
FIG. 10 is a schematic of an embodiment of a laser tool optic and beam pattern in accordance with the present inventions.

Turning to FIG. 10 there is shown an embodiment of an optics assembly to provide a cylindrical beam pattern. A collimated circular laser beam shown by ray trace lines 1000 enters a vaxicon lens 1001 where it is formed into an expanding annular (hollow cone) pattern 1002, which enters a lens 1003, that shapes the beam into a cylindrical beam 1004. A plan view cross section for the cylindrical beam 1004 is shown with respect to a tubular having an inner work surface 1005. The centerline of the beam and tubular is shown by point 1009. The inner side of the cylindrical beam pattern has a radius shown by arrow 1008, the beam pattern has a thickness shown by arrow 1007, and the outer side of the beam pattern has a radius of the sum of the radiu 1007 and and thickness 1008. The distance from the outer side of the beam pattern to the work surface 1005, is shown by double arrow 1006. Although shown as a collimated beam entering the vaxicon, the beam may also be diverging or converging, and may have a Gaussian distribution or other distributions.

Figure 11:
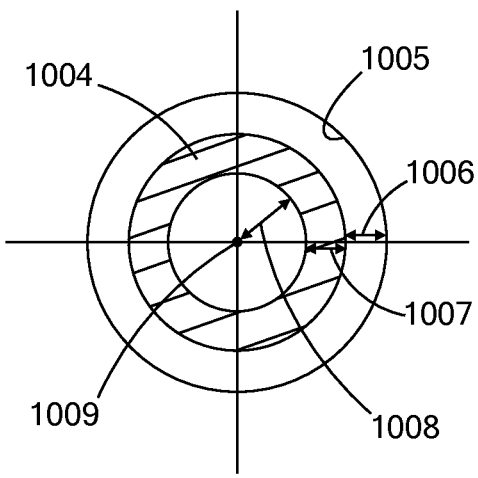
FIG. 11 is a cross sectional view of the embodiment of FIG. 10.

As seen in FIG. 11, for this beam pattern, the distance 1006 from the outside of the cylindrical laser beam pattern to the work surface 1005 can set based upon the amount, extend of build up on the work surface, the nature of the laser beams interaction with the build up (for example if spallation and thermal fracturing are the primary failure mode than the distance should be such to enable the fracturing to reach or other wise remove the build up material from the work surface), the nature of the work surface, (for example preventing it from being damaged by the laser beam), whether other mechanical or laser processes can be used to remove any remaining build up (for example the tool could be configured to have a 20 kW, cylindrical beam extending forward in the direction of travel from a first laser module and a second laser module behind the first providing a lower power, e.g., 2 kW ring pattern to remove any material that the cylindrical beam pattern left behind, while at the same time minimizing the risk that the laser contacting the work surface could damage the work surface), and other factors and consideration. For example, the distance 1006 from the side wall could be from about ⅛" to about 3", could be from about ½" to about 2", could be less than about 3", less than about 1" and less then about ½".

General teachings regarding optics to provide annular beam patterns are provided in D. Zeng, Annular Beam Shaping and Optical Trepanning, Thesis, College of Engineering and Computer Science, University of Central Florida (2006), the entire disclosure of which is incorporated herein by reference.

Figure 12:
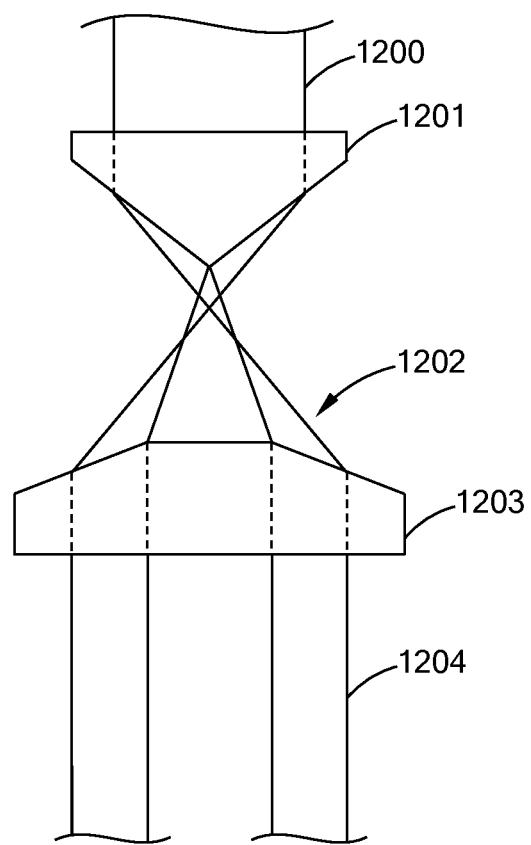
FIG. 12 is a schematic of an embodiment of a laser tool optic and beam pattern in accordance with the present inventions.

Turning to FIG. 12 there is shown an embodiment of an optics assembly to provide a cylindrical beam pattern. A collimated circular laser beam shown by ray trace lines 1200 enters a axicon lens 1201 where it is formed into an expanding annular (hollow cone) pattern 1202, which enters a lens 1203, that shapes the beam into a cylindrical beam 1204. A plan view cross section for the cylindrical beam 1004 is shown with respect to a tubular having an inner work surface 1005. Although shown as a collimated beam entering the axicon, the beam may also be diverging or converging, and may have a Gaussian distribution or other distributions.

Figure 13A:
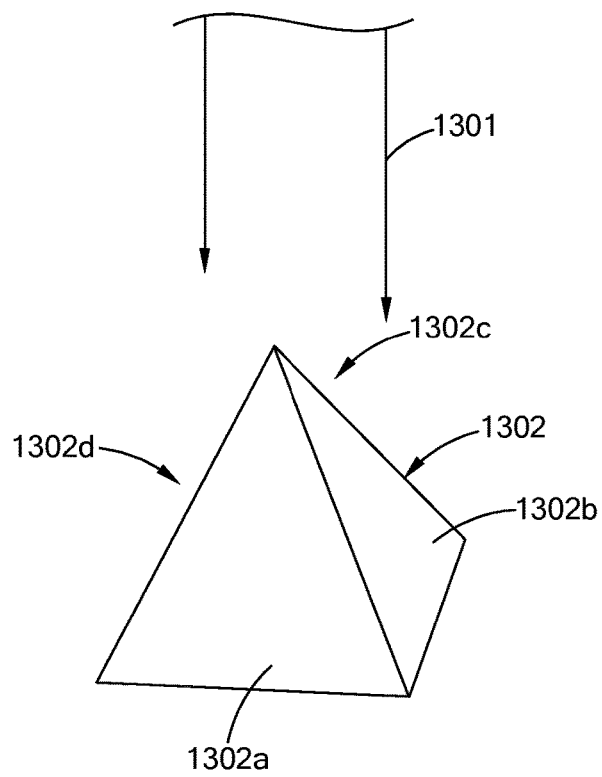
FIGS. 13A and 13B are schematics of an embodiment of a laser tool optic and beam pattern in accordance with the present inventions.
Figure 13B:
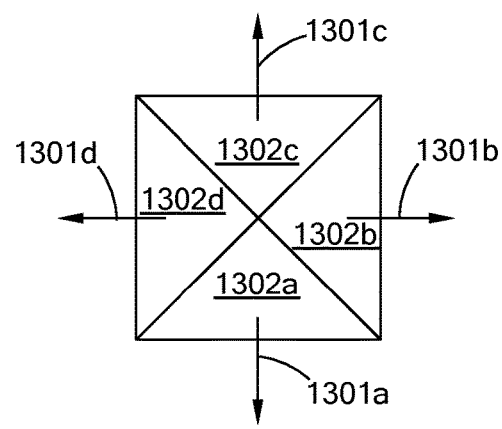

Turning to FIGS. 13A and 13B there is shown an embodiment of an optics assembly to provide a radially extending laser beam pattern of a plurality of laser beams. A laser beam, shown by ray trace lines 1301, preferably collimated, is directed toward a multifaceted optic 1302, which in this embodiment has four faces 1302*a*, 1302*b*, 1302*c*, 1302*d*. Each face directs a laser beam 1301*a*, 1301*b*, 1301*c*, 1301*d* respectively away from the optic 1302 in a radially extending pattern toward a works surface. The multifaceted optic may have n=1, n=2, n=3, n–4 (as shown in FIGS. 13A and 13B), n=5, n=6, and greater, until n=∞ (e.g., becoming essentially a reflective cone). The number of laser beams (which can viewed as spokes on a wheel extending from the optic) is equal to "n," i.e., a radially extending bean for every face. The radially extending beams may be at any angle with respect to the axial, i.e., incoming beam. Thus they may be at about 90°, about 45° and angles greater and less than those angles. The faces may also have beam shaping and characterizing properties, such as having a focusing surface. Preferably all of the faces have similar, or the same beam shaping and characterizing properties, however they can be varied from one face to the next to provide for a predetermined variable radial beam pattern. Depending upon the "n" number, the power of the laser beam, the nature of the material to be removed, and other factors the optics assembly may need to be rotated or may be able to accomplishes the removal of the targeted material without requirement rotation.

Figure 14:
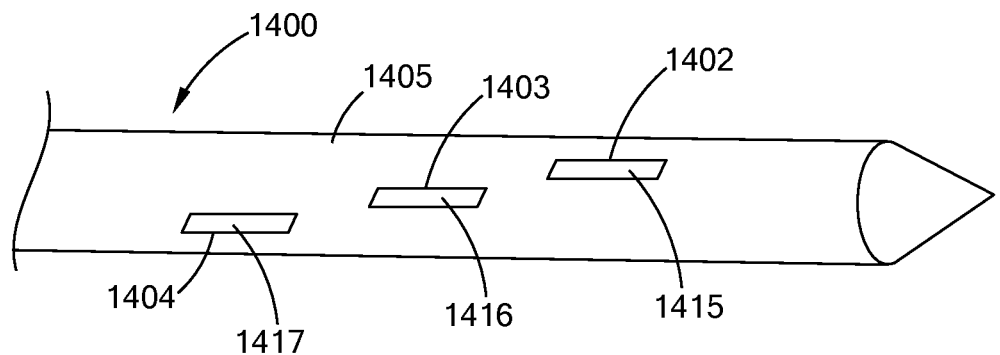
FIGS. 14, 14A and 14B are perspective views of embodiments of laser tool optics in accordance with the present inventions.
Figure 14A:
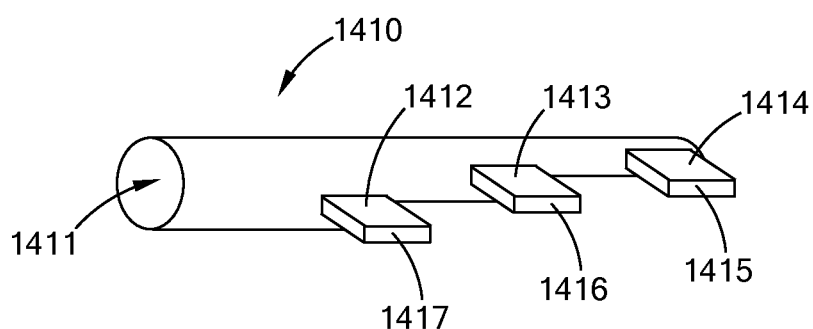
Figure 14B:
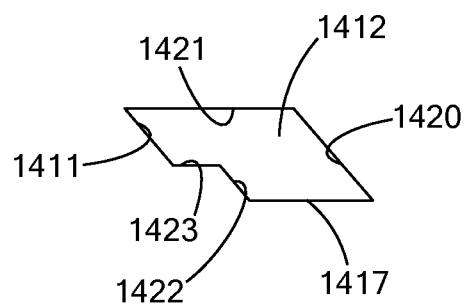

Turning to the embodiment of FIGS. 14, 14A, and 14B there is provided an embodiment of a laser head and optics assembly. The laser head 1400 has an outer body 1405 that has three openings 1402, 1403, 1403. The laser beam in a linear pattern is propagated through those openings. The head 1400 has an optics assembly 1410 that has a laser beam receiving or input face 1411 and three angular laser beam launch members 1412, 1413, 1414. Each laser beam launch member has a laser beam launch face 1417, 1416, and 1415. Turning to FIG. 14B, which by way of example shows a cross sectional view of angular launch member 1412, the member has faces 1420, 1421, 1422 1423 (and side faces not shown) that reflect and thus direct the laser beam to and out of face 1417. These reflective faces may be obtained through the use of total internal reflection (TIR), reflected coatings, and combinations and variations of these. The launch faces, e.g., 1417, of the optics assembly needs to be protected from dirt and debris. This may be accomplished by several means. For example, the faces may be slightly recessed within the body 1405 of the head 1400 with channels in, or associated with, the body directing a fluid across and away from the face. The face may be optically coupled to or have within it micro channels that are configured to form fluid jets into which the laser beam is coupled in the microchanel. A fluid stream could be flowed annularly down, or more preferably up, to help clear away debris along the surface of the tool. Three staggered launch faces are shown in the embodiment of FIG. 14. It should be understood that more or less launch faces and launch members may be employed, that these members may obtain their laser energy for a single optical fiber, multiple fibers, or each having their own associated fiber, and that them may be arranged a long a line, or in other patterns. The tool head may be attached to, or associated with a down hole tool assembly having a centralizer and an advancement device, and for example, could be associated with any of the types and configurations of down hole tools and assemblies in this specification. This laser head has the capability of having very small outside diameters, and thus has the capability of being configured for use in tubulars, channels, passages or pipes that have an internal diameter of less then about 3", less then about 2", less than about 1" and smaller.

The optics assemblies of the embodiments of FIGS. 9, 10, 12, 13A & B, and 14B can be utilized for example, in the various embodiments of tools provided in this specification, including the optics packages and tools of the type disclosed and taught in US Patent Application Publication Nos. 2012/0074110 and 2012/0273470, and in Ser. Nos. 13/403,509, 13/782,869, and 13/768,149, the entire disclosures of each of which are incorporated herein by references, as well as other types of down hole tools and assemblies that are sufficient to protect and hold the optics packages and deliver it to the intended work area.

EXAMPLES

The following examples are provide to illustrate various devices, tools, configurations and activities that may be performed using the high power laser tools, devices and system of the present inventions. These examples are for illustrative purposes, and should not be viewed as, and do not otherwise limit the scope of the present inventions.

Example 1

A metal work surface has a barium sulfate deposit covering it. The deposit averages about 0.18" thick. A CW laser beam having a wavelength of about 1070 nm, a power of about 6 kW, a power density at the spot on the work surface of about 4.6 W/cm$^2$, and a spot size diameter at the work surface of about 12.7 mm, is scanned across the deposit at a rate of about 0.55 in/sec. The laser beam substantially removes the barium sulfate material from the metal work surface, cutting an about 1.6" deep by 0.7" wide trough in the deposit.

Example 2

A metal work surface has a barium sulfate deposit covering it. The deposit averages about 0.18" thick. A CW laser beam having a wavelength of about 1070 nm, a power of about 6 kW, a power density at the spot on the work surface of about 4.6 W/cm$^2$, and a spot size diameter at the work surface of about 12.7 mm, is scanned across the deposit at a rate of about 0.37 in/sec. The laser beam removes the barium sulfate material from the metal work surface, cutting an about 1.8" deep by 0.7" wide trough in the deposit.

Example 3

A metal work surface has a calcium sulfate deposit covering it. The deposit averages about 0.25" thick. A CW laser beam having a wavelength of about 1070 nm, a power of about 6 kW, a power density at the spot on the work surface of about 4.6 W/cm$^2$, and a spot size diameter at the work surface of about 12.7 mm, is scanned across the deposit at a rate of about 0.55 in/sec. The laser beam substantially removes the calcium sulfate material from the metal work surface, cutting an about 1.9" deep by 0.7" wide trough in the deposit.

Example 4

A metal work surface has a calcium carbonate deposit covering it. The deposit averages about 0.25" thick. A CW laser beam having a wavelength of about 1070 nm, a power of about 6 kW, a power density at the spot on the work surface of about 4.6 W/cm$^2$, and a spot size diameter at the work surface of about 12.7 mm, is scanned across the deposit at a rate of about 0.55 in/sec. The laser beam substantially removes the calcium sulfate material from the metal work surface, cutting an about 1.9" deep by 0.7" wide trough in the deposit.

Example 5

A metal work surface has a paraffin wax deposit covering it. The deposit averages about 0.25" thick. A CW laser beam having a wavelength of about 1070 nm, a power of about 6 kW, a power density at the spot on the work surface of about 4.6 W/cm$^2$, and a spot size diameter at the work surface of about 12.7 mm, is scanned across the deposit at a rate of about 0.55 in/sec. The laser beam quickly melts and liquefies the paraffin wax on the work surface, does not structurally damage the work surface, and the liquefied paraffin wax flows from the work surface.

Example 6

A oil well located in the Gulf of Mexico is located in a water depth of about 2,000 feet and has a production tubing that extends to a total vertical depth of about 15,000 ft, at which point there is a production zone, having perforations and screens. The well has been producing a known number of barrels of crude per day for the last 3 years. Recently the production has dropped of significantly. Upon inspection it is determined that about 2,000 feet of the production tubing is 60% occluded, i.e. the internal diameter has been reduced by the blockage by 60%, with a scale that is primarily made up of Barium Sulfate. A laser flow assurance system is deployed to the well site. The system has a 20 kW laser and supporting systems, an umbilical having a high power long distance optical fiber having a core size of about 600 µm and an attenuation of about 1 dB/km. The system has a laser delivery tool of the type shown in herein. The system is moved into position and the tool is advanced into the well. Upon reaching the location where the deposit is located the laser is fired delivery the high power laser beam to the inner diameter of the production tubing ablating the blockage without substantially damaging the tubing. The tool is advanced until the entire 2,000 ft. of obstructed pipe is cleared and the production of the well is returned to the original known production of barrels per day.

Example 7

A well has an occlusion and chemicals that can be active by a laser are used to treat the well providing a laser-chemical treatment, which is synergistic.

Example 8

The laser tools of the present inventions can be used to treat boilers and desalinization equipment.

Example 9

Using a pulsed laser as the source of laser energy in a laser flow assurance operations. A typical pulsed laser may be a semiconductor laser or a fiber laser operating in a pulsed mode. The pulse from the pulsed laser having a pulse characteristic of a 5 kHz modulation rate with a 10%-50% duty cycle.

Example 10

Figure 7A:
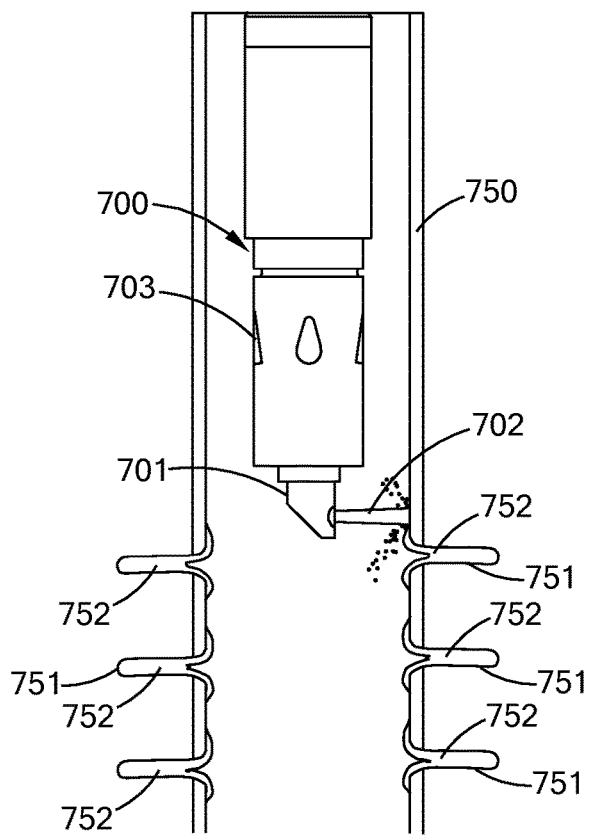
FIGS. 7A and 7B are perspective cross sectional views of an embodiment of a laser tool and process in accordance with the present inventions.
Figure 7B:
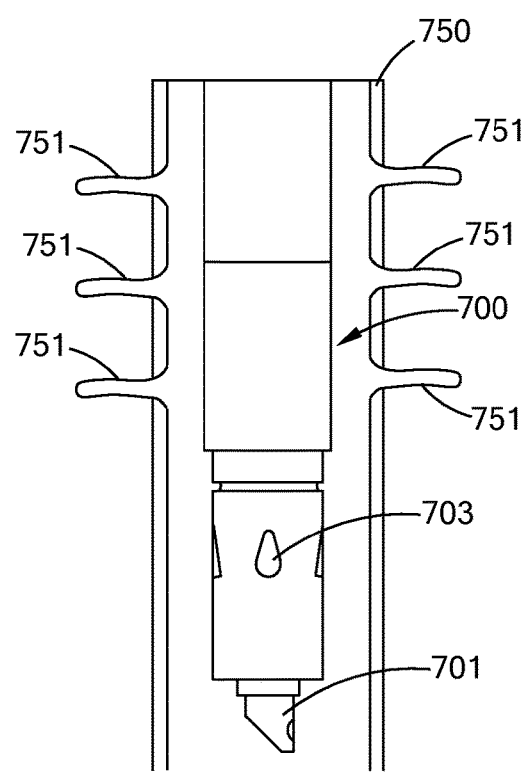

A down hole laser delivery tool is used to remove a deposit from a perforation zone in a well and to reopen fouled perforations. Turning to FIGS. 7A and 7B there is shown a schematic cross section of a down hole laser tool 700 in a casing 750 in a well bore. The down hole laser tool 700 has ports 703, circulating ports, for delivering a circulation fluid, e.g., gas, liquid or both, to assist in carrying away and out of the well any removed material. As shown in FIG. 7A the laser toll is being advanced toward the perforations 751 in the casing 750, which has been fouled by build up 752. Upon reaching the build up area the laser tool fires the laser beam 702 at the build up causing its removal. The laser beam is scanned around the inner diameter of the casing to remove all of the build up. Based upon sensors in the laser tool when the laser beam reaches a perforation 751, scanning of the beam is suspended and the beam is held on the perforation until it is cleared of the build up.

Example 11a

Hydrates form at low-temperature, high-pressure in the presence hydrocarbons and water. Hydrate formation can plug flow lines, equipment and other structures and devices used in deep water offshore hydrocarbon exploration and production. The kinetics of hydrate formation is dependent upon, among other things the nature of the crude oil being produced. Thus, the rate of hydrate formation may be very different from well to well, or as other factors change on a single well. To address, mitigate and manage hydrate related problems there is provided a method of positioning a high power laser tool, for example a laser cutter or a laser illuminator in the areas where hydrate formation is likely, where flow assurance is critical, where hydrate formation has been detected or observed and combinations thereof. The laser tool is connected to a high power laser, preferably on the surface, by way of a high power laser cable. The high power laser energy is then delivered to heat, melt, and/or abate the hydrate formation, for example by heating the structure, by maintaining the structure at a certain level, preferably above a temperature at which hydrate formation can occur, by directly heating, cutting melting, or ablating the hydrate, and combinations of the foregoing.

A preferred wavelength for treating and managing hydrate formation would be about 1.5 μm or greater, more preferably from about 1.5 μm to about 2 μm, which is a wavelength range that can be transmitted down the fiber over great lengths without substantial power losses, and is also a wavelength range that is preferentially absorbed by the hydrate.

Example 11b

A submersible assembly, e.g., an ROV, with a laser tool for directing a laser beam directs a high power laser beam to a subsea structure, such as for example, a manifold, a wellhead, a pump, a pipe, a pipeline, a tree, a conductor, or a BOP. The high power laser beam heats the structure preventing, removing, or mitigating hydrate formation. Examples, of ROVs with laser tools, and sub sea laser ROV operations, including the removal of hydrates, are taught and disclosed in US Patent Publication No. 2012/0266803 the entire disclosure of which is incorporated herein by reference. Preferably, for example, the laser tool can deliver a high power laser beam having a wavelength of less than about 800 nm, and from about 400 nm to about 800 nm. High power laser beams within these wavelength ranges can be provided by, for example, solid state lasers, semiconductor lasers and fiber lasers.

Example 12

In this embodiment of a high power laser system, there is provided the use of high power laser energy, the use of high power laser optical cables for powering, controlling and/or monitoring equipment and components, and/or the use of remote high power laser tools, to provide a system for removing paint. This system would provide the added advantage that it would eliminate the waste, noise and other environmental issues, with conventional abrasive, mechanical or chemical paint removal techniques. This system would also provide the ability to remove paint, or other coatings, from areas that are remote, distant or otherwise difficult to access.

Example 13

Figure 8A:
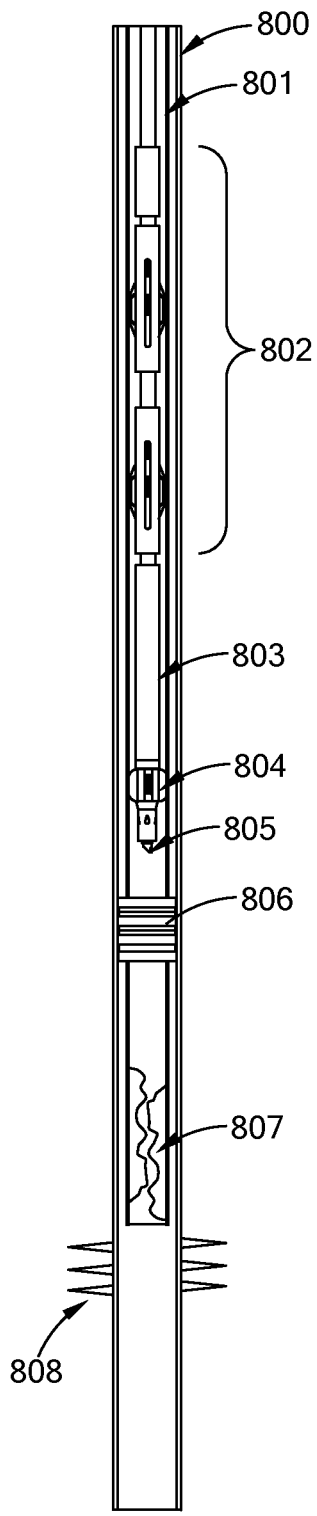
FIGS. 8A, 8B and 8C are perspective cross sectional views of an embodiment of a laser tool and process in accordance with the present inventions.
Figure 8B:
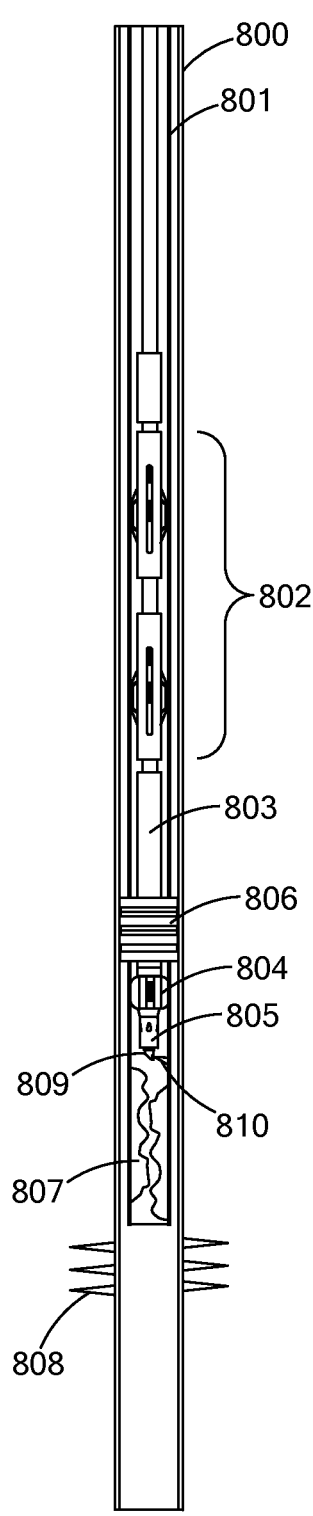
Figure 8C:
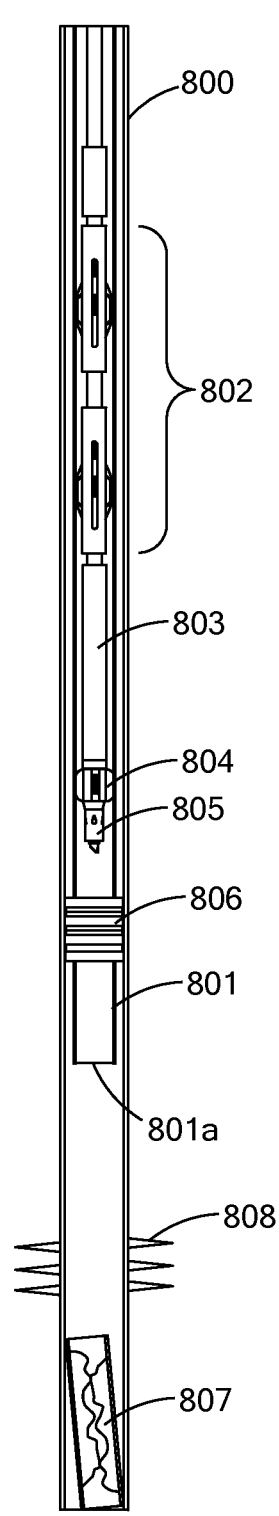

A high power laser down hole tool having a laser cutting head of the type disclose and taught by US Patent Applications Publication No. 2012/0074110 and U.S. Patent Application Ser. No. 13/782,869, and U.S. Patent Application Ser. No. 13/768,149, (the entire disclosures of each of which are incorporated herein by reference) is used to cut off a fouled tail pipe section of a production tubing. Turning to FIG. 8A, 8B, an 8C there are shown cross sectional views of snap shots of an embodiment of this processes. The laser tool assembly has a tractor assembly with a centralizer 802, a motor and communications housing 803, a scraper 804, and a laser head 805. The laser tool is seen in side of a production tubing 801 that is located inside of a well casing 800, the production tubing 801 has a build up 807 that is blocking flow from perforations 808. As shown in FIG. 8B the laser tool is advanced past the packer 806 and to the point of the build up 807, where the laser is fired and delivered to the pipe to cut off the clogged lower section, after which the laser tool is withdrawn, as shown in FIG. 8C.

Example 14

Figure 15A:
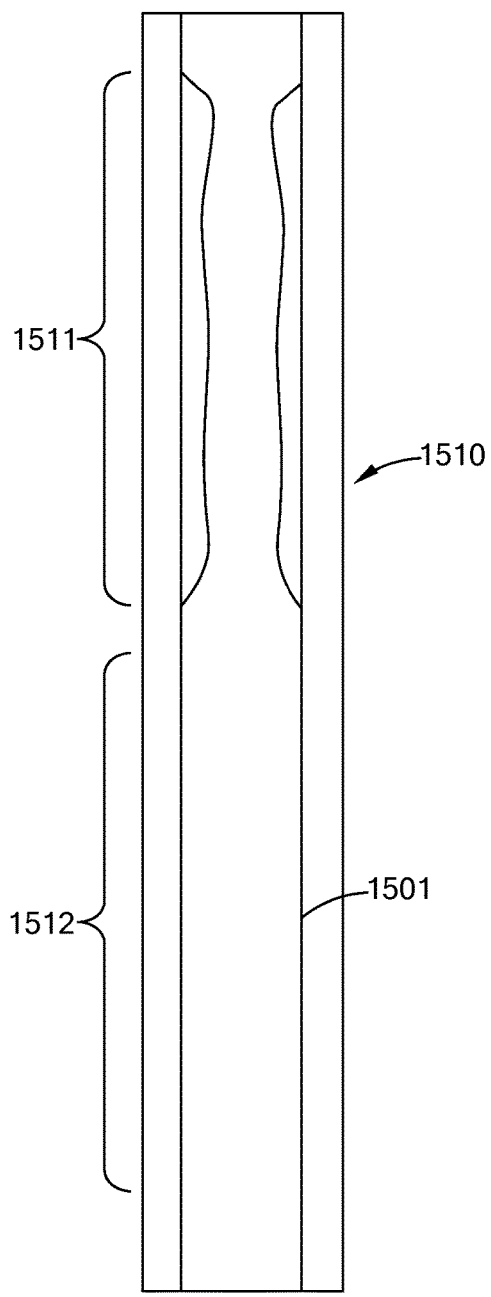
FIGS. 15A to 15C are cross sectional views of an embodiment of a laser tool and process in accordance with the present inventions.
Figure 15B:
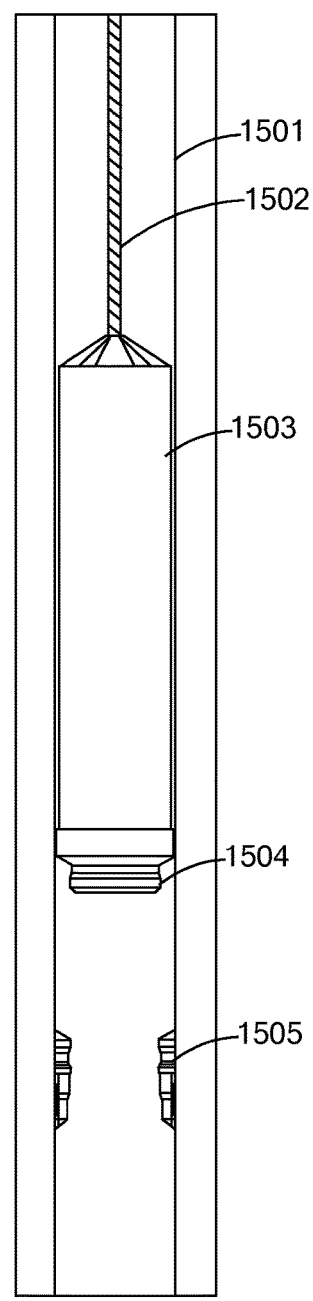
Figure 15C:
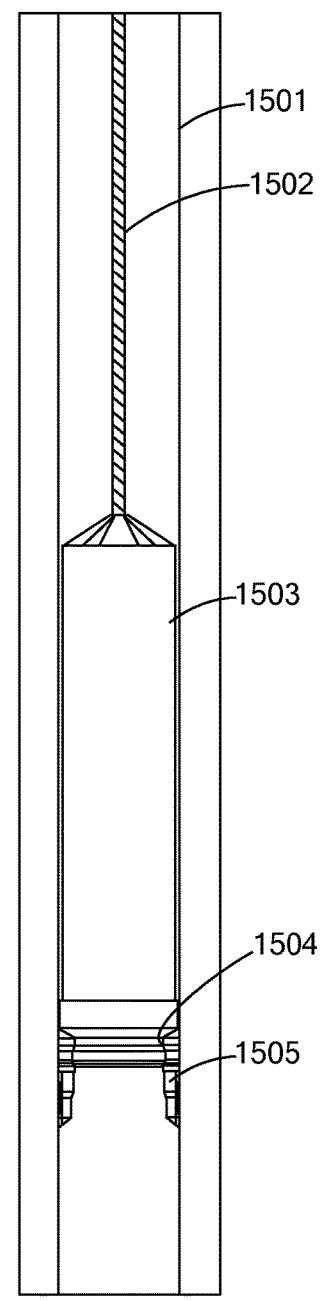

Turning to FIGS. 15A to 15C there are shown three cross sectional schematics of an embodiment of a laser follow assurance application for an existing completion assembly, the existing completion assembly 1510 has a temperature transition area 1512 that results in the formation of deposits in area 1511. An anchor 1505 is set in the production tubing 1501, at an appropriate location in the area of the deposit 1511 and the area of the temperature transition 1512, and preferably toward the lower area of the temperature transition area 1512 as shown in FIG. 15B, the laser heating element 1503 has a tool latch 1504 at its distal end and is connected to an umbilical 1502 having for example a electric line, high power optical fiber, data lines etc. The laser heating element 1503 is lowered by the umbilical 1502 so that the tool latch 1504 engages and is held in place by anchor 1505. In operation the hydrocarbons flow through the laser heating element which keeps the temperature above the point where deposit formation is likely.

Example 15

Figure 16A:
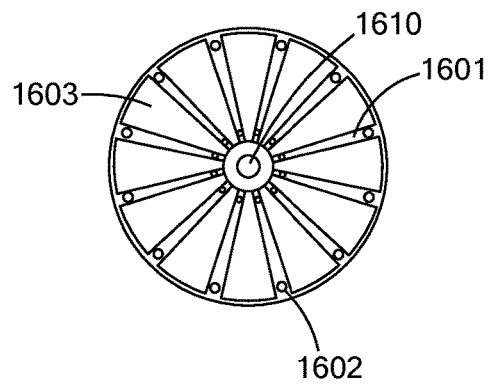
FIGS. 16 and 16A are cross sectional views of an embodiment of a laser tool in accordance with the present inventions.
Figure 16:
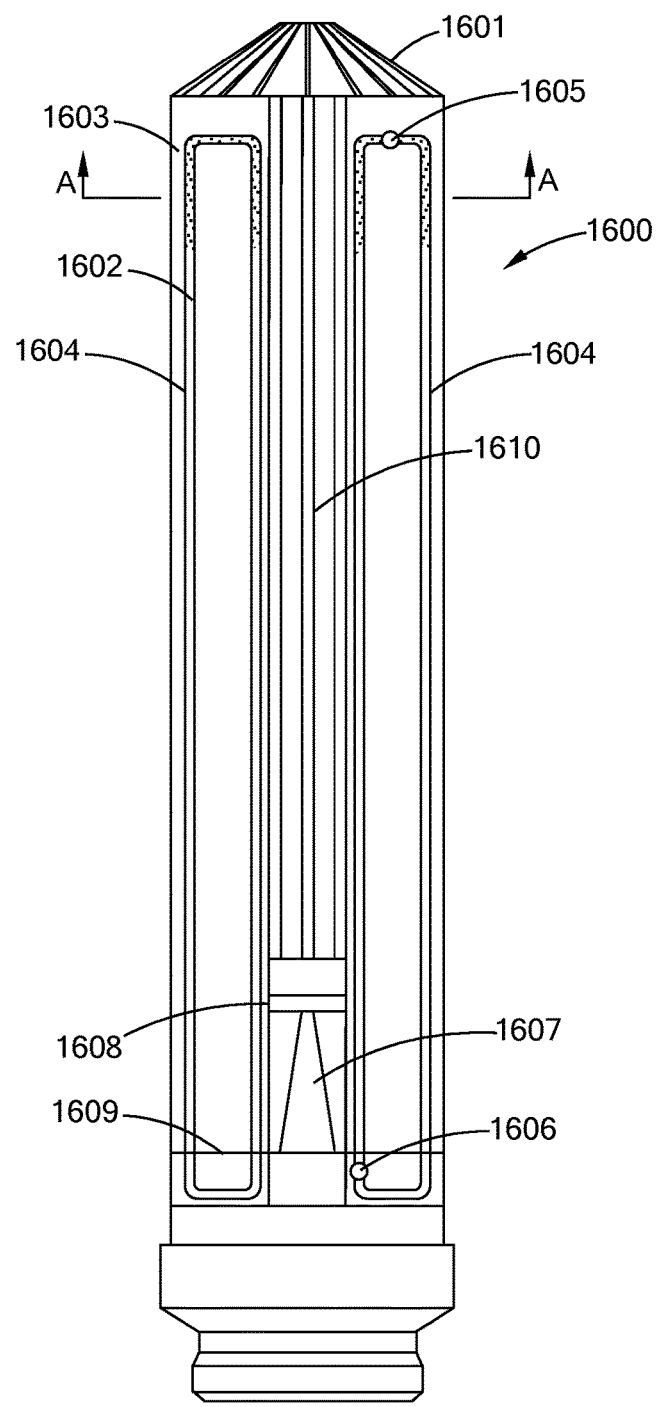

Turning to FIGS. 16 and 16A there is provided a longitudinal cross sectional and transverse cross sectional schematic (taken along line A-A) views, respectively, of an embodiment of a laser heating tool 1600 for use in an existing completion, which for example could be used in Example 14. The laser heating tool 1600 has a sealed closed loop laser heating system. A laser optic fiber 1610 connects to (is in optical communication with) a laser optics assembly 1608 that shapes and delivers the laser beam 1607 to a beam dump 1609, which serves as a heating element. Closed loop heating channels 1604, have tubes 1602 that contain a heat transport fluid. The closed loop heating channels 1604 extend into, or are otherwise in thermal communication with the beam dump 1606 and with fins 1601. In operation, as the laser energy is absorbed and generates heat in the beam dump, the fluid in the tubes will heat, and preferably reach a boiling point. This heating will cause a circulation to occurring with the fluid flowing around the heating channels. Temperature sensors 1605, 1606 are provided to monitor and control the heating and circulating of the fluid. The closed loop heating channels 1604 and their tubes 1602 are associated with fins 1601. In this manner, the fins 1601 are be heated by the circulating fluid. Hydrocarbons flow through channels 1603 and are heated by the fins 1601.

Example 16

Figure 17A:
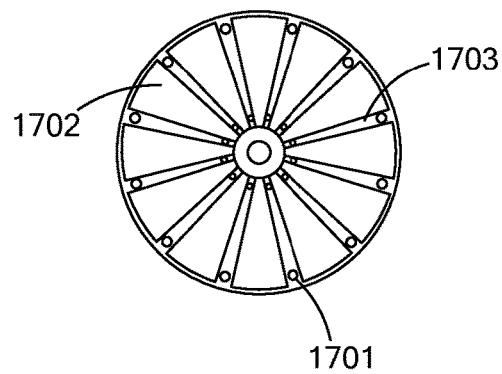
FIGS. 17 and 17A are cross sectional views of an embodiment of a laser tool in accordance with the present inventions.
Figure 17:
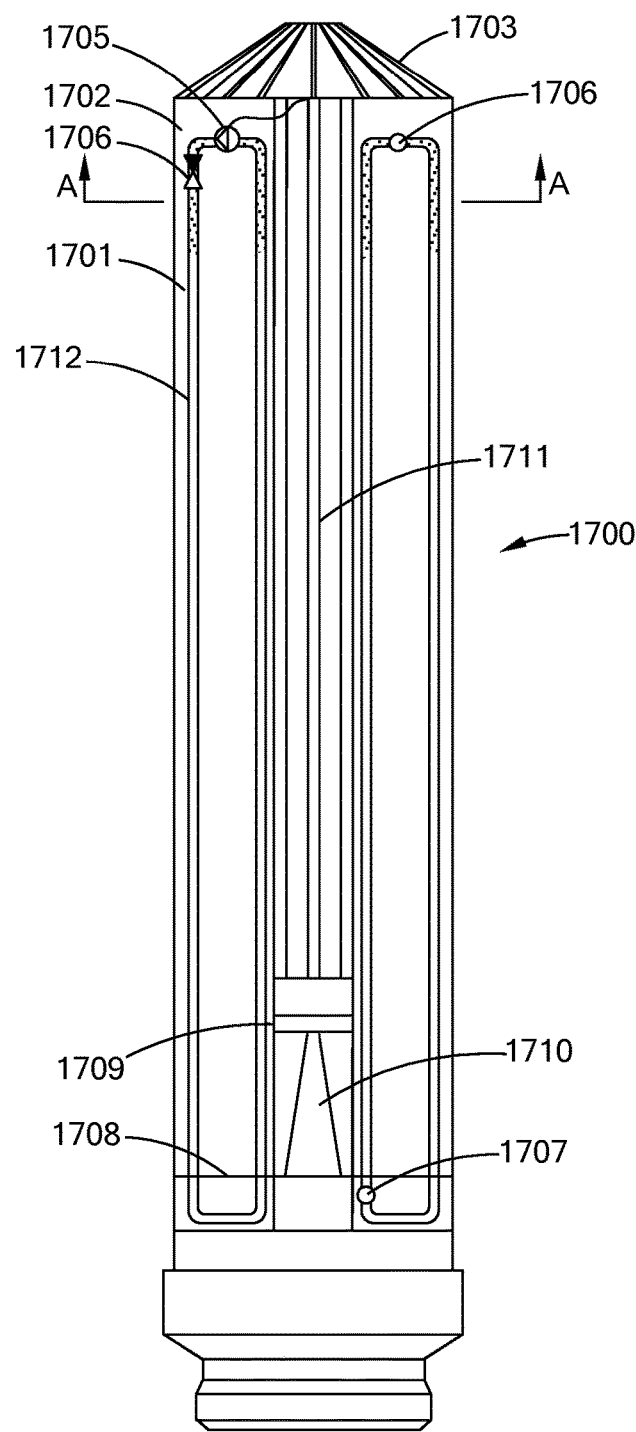

Turning to FIGS. 17 and 17A there is provided a longitudinal cross sectional and transverse cross sectional schematic (taken along line A-A) views, respectively, of an embodiment of a laser heating tool 1700 for use in an existing completion, which for example could be used in Example 14. The laser heating tool 1700 has a sealed closed loop laser heating system. A laser optic fiber 1711 connects to (is in optical communication with) a laser optics assembly 1709 that delivers the laser beam 1710 to a beam dump 1708, which serves as a heating element. Closed loop heating channels 1712, have tubes 1701 that contain a heat transport fluid. The closed loop heating channels 1712 extend into, or are otherwise in thermal communication with the beam dump 1708 and with fins 1703. In operation, as the laser energy is absorbed and generates heat in the beam dump, the fluid in the tubes will heat, and preferably reach a boiling point. An electric pump 1705 and a check valve 1706 are used to cause the fluid to circulate around the heating channels 1712. Temperature sensors 1706, 1607 are provided to monitor and control the heating and circulating of the fluid. The closed loop heating channels 1712 and their tubes 1701 are associated with fins 1703. In this manner, the fins 1703 are be heated by the circulating fluid. Hydrocarbons flow through channels 1702 and are heated by the fins 1703.

Example 17

Figure 18:
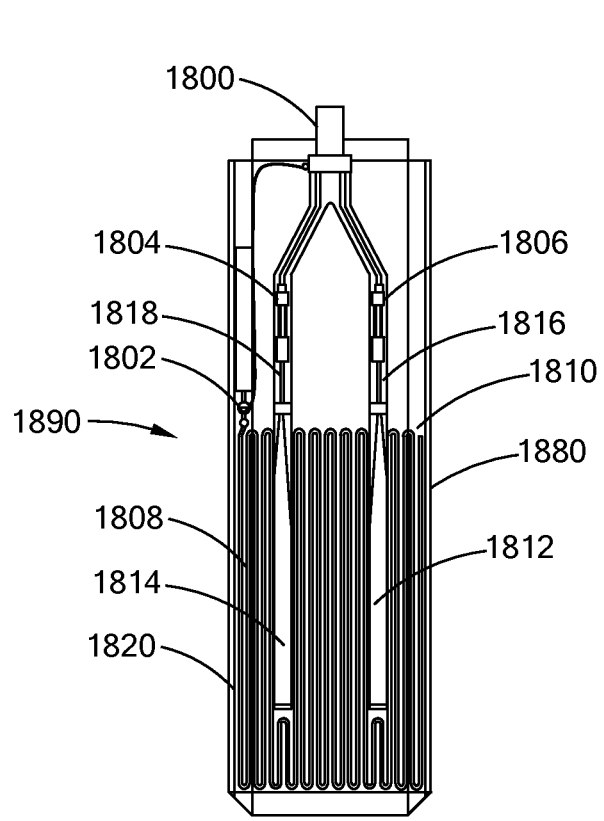
FIGS. 18 and 18A are cross sectional views of an embodiment of a laser tool in accordance with the present inventions.
Figure 18A:
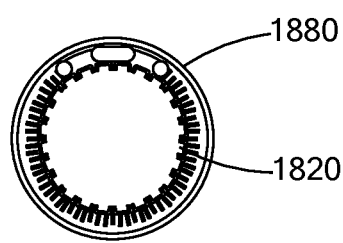
Figure 18B:
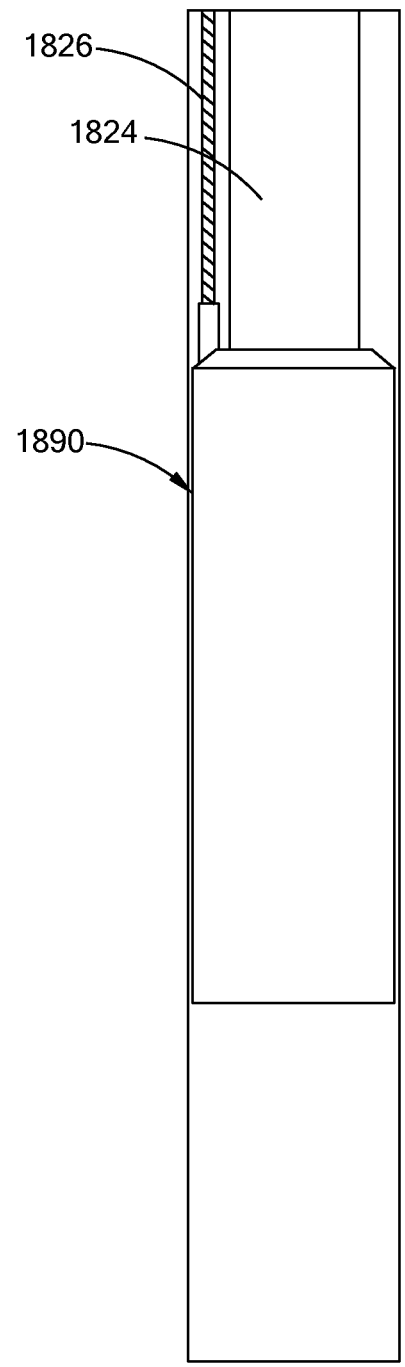
FIG. 18B is a schematic view of the embodiment of FIG. 18 in a tubular.

Turning to FIGS. 18, 18A and 18B there is shown an embodiment of a laser flow assurance assembly for use in a new completion. Turning to FIG. 18 there is shown a cross section of the laser tool 1890 having a high power laser fiber 1800, an electric powered fluid pump 1802, fluid filled coils 1808 that are thermally associated with, and preferably made from and in a high energy absorbent material 1810, and laser beam path chambers 1812, 1816. In this embodiment, two high power laser fibers, or a beam splitter, provide the laser beam to the optics assemblies 1816, 1818. The fibers are connected to the optics by connectors 1804, 1806. Fins 1820 are thermally associated with the fluid filled coils 1808. The fins 1820 are located in the annuls between the high energy absorbent material 1810 and the outer housing 1880 of the tool 1890. In operation the fins are heated and the hydrocarbons flow through the annulus. The outer housing 1880, may not be present and the inner surface of the production tubing may service as the outer wall for the channel that directs the flow of the hydrocarbons by the fins. FIG. 18A is a cross section taken along line A-A, showing the fins and annulus (for clarity the inner comments of the tool are not shown in this figure). FIG. 18 B shown the tool 1890 located in the production tubing 1824. The tool 1890 has an umbilical 1826 having the optical fiber(s), electric line, data lines, etc.

The tool can be built in sections of varying lengths, from several feet, to tens of feet, to longer, multiple sections, and with additional fibers to meet the thermal requirements of the particular application, to enable the laser flow assurance assembly to reduce and preferably eliminate any build up in the production tubing, or the targeted area of that tubing.

Example 18

Figure 19A:
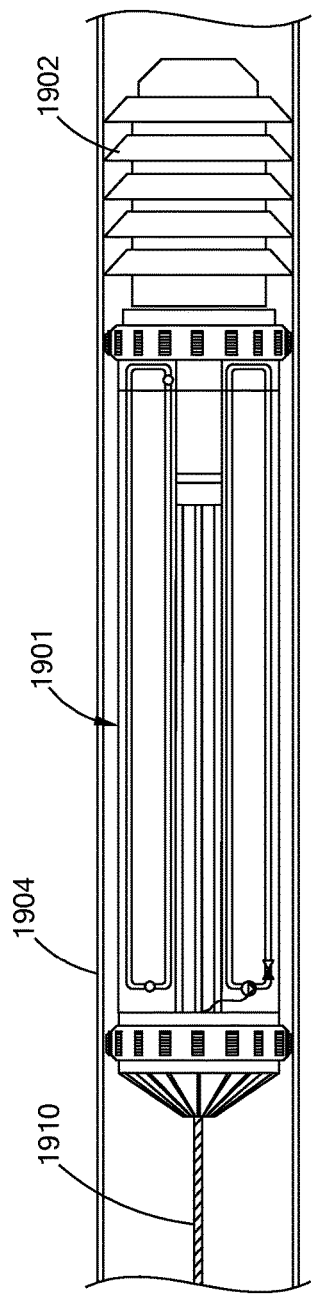
FIGS. 19A to 19C are perspective cross sectional views of an embodiment of a laser tool and process in accordance with the present inventions.
Figure 19B:
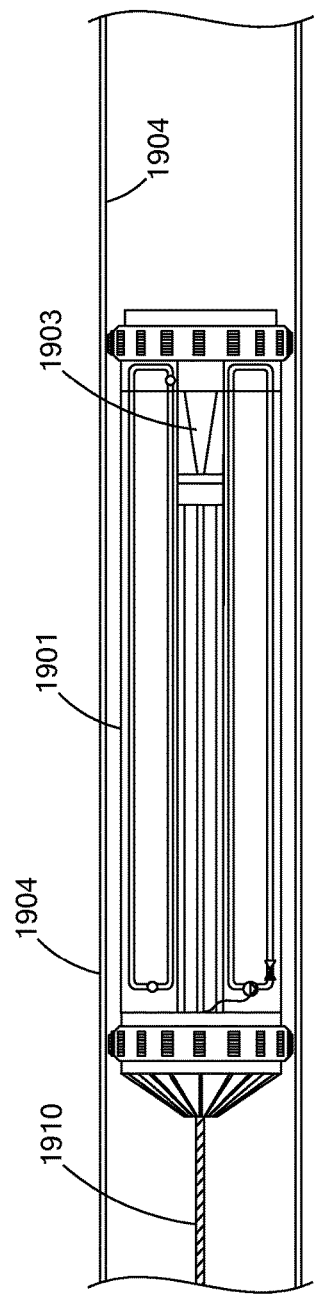
Figure 19C:
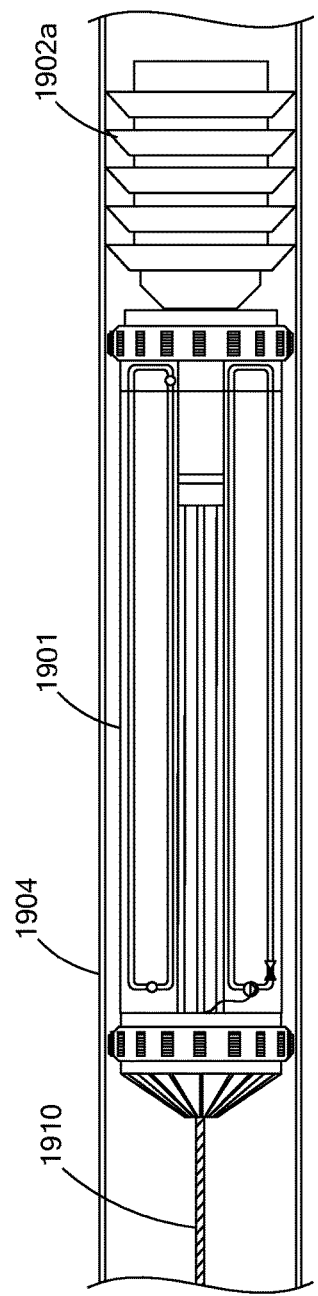

Turning to FIGS. 19A to 19c there is shown an embodiment of the deployment of an embodiment of a laser flow assurance assembly in a pipeline application. A laser heating tool 1901, with an umbilical 1910, is deployed in a pipeline 1904 by way of a pig 1902. The pig 1902 is detached and the laser beam 1903 is fired. The tool 1901 heats the pipeline material as it flows by the tool. The tool 1901 can be recovered by pumping the pig 1902a back to the tool 1901, attaching and recovering.

Example 19

Figure 20:
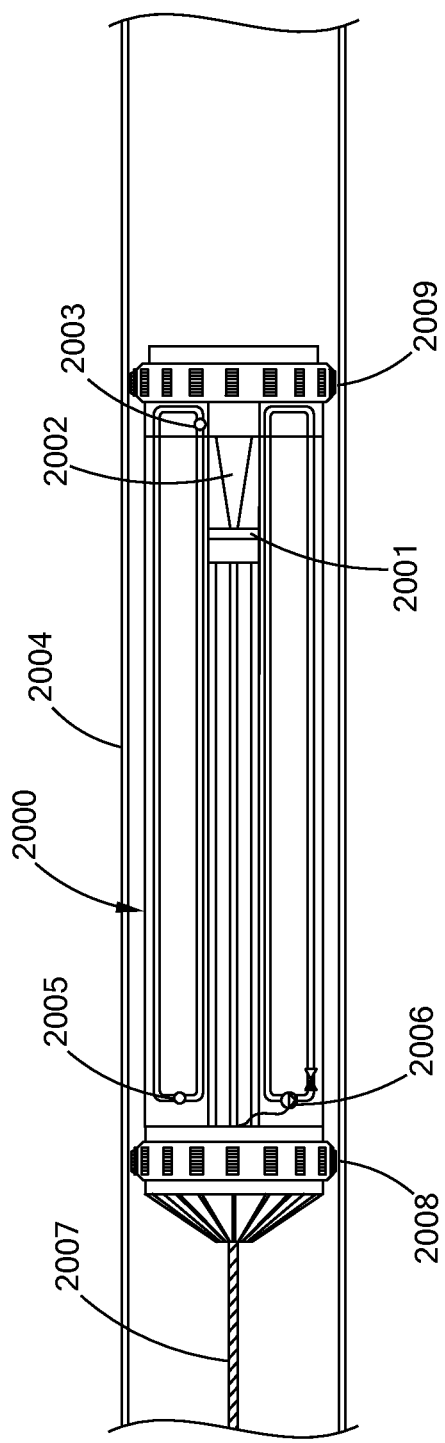
FIG. 20 is a perspective cross sectional view of an embodiment of a laser tool and process in accordance with the present inventions.

Turning to FIG. 20 there is shown a cross sectional view of an embodiment of a laser flow assurance tool 2000 for an embodiment of a pipeline 2004 application. The tool 2000 has electronic actuated slips 2008, 2009 that provide for the predetermined and precise placement of the the tool 2000 in the pipeline 2004. The tool 2000 has an umbilical 2007, which could be a wireline and associated electrical, high power optical fiber and data lines. The tool 2000 has an electric motor-check valve assembly 2006, temperature sensors 2005, 2003, an optics package 2001 and a laser beam path 2002 along with the laser beam travels. The operation of this tool 2000, and the other components of this tool, are along the lines of the tool in Example 16.

The tool can be built in sections of varying lengths, from several feet, to tens of feet, to longer, multiple sections, and with additional fibers to meet the thermal requirements of the particular application, to enable the laser flow assurance assembly to reduce and preferably eliminate any build up in the pipeline, or the targeted area of that pipeline.

Example 20

Figure 21:
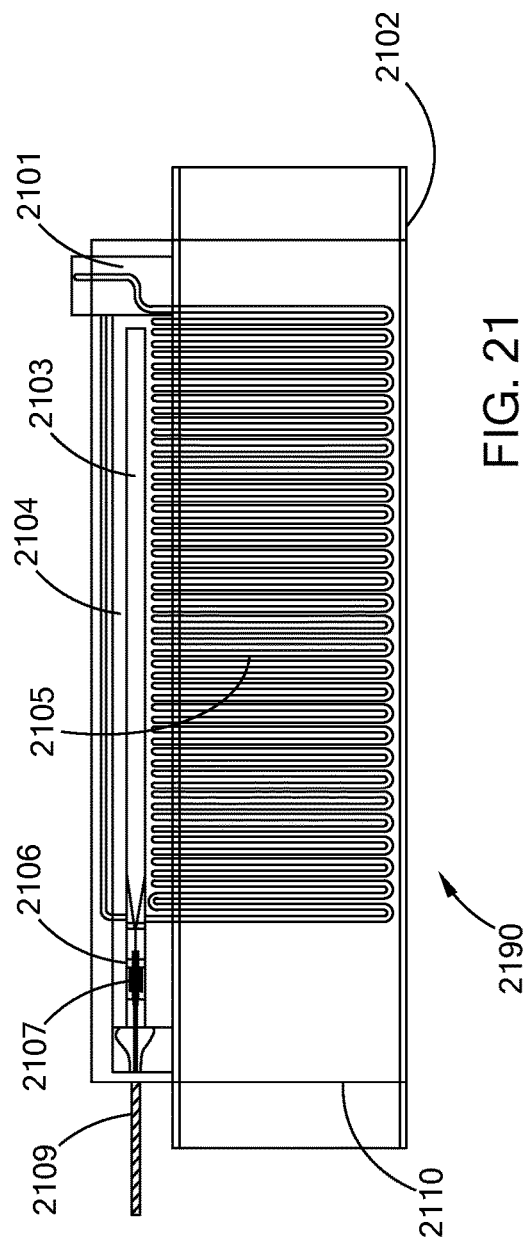
FIGS. 21 to 21A are cross sectional views of an embodiment of a laser tool and process in accordance with the present inventions.
Figure 21A:
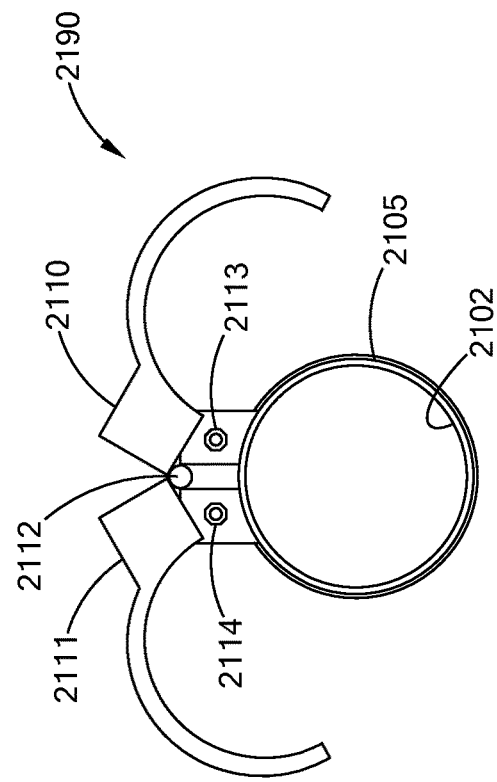

Turning to FIGS. 21 and 21A there is shown a cross sectional longitudinal view (FIG. 21) and a transverse cross sectional view (in the open position) (FIG. 21A) of an embodiment of an external pipeline 2102 laser flow assurance assembly 2190. The assembly has a wireline umbilical 2109, an insulating protective cover 2108, a fiber connector 2107, and optics package 2110 and a fluid filled heating coil assembly 2105, which has its upper section in thermal communication with a high energy absorbent material 2104 that has a laser beam path chamber 2103 and a fluid tank 2101. The assembly has a swing hinge 2112, which allows for the opening of an insulated protective cover 2110, 2111.

The assembly can be built in sections of varying lengths, from several feet, to tens of feet, to longer, multiple sections, and with additional fibers to meet the thermal requirements of the particular application, to enable the laser flow assurance assembly to reduce and preferably eliminate any build up in the pipeline, or the targeted area of that pipeline.

In addition to these, examples, the high power laser systems, tools, devices and methods of the present inventions may find other uses and applications in activities such as: off-shore activities; subsea activities; decommissioning structures such as, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; precise and from a distance, in-place milling and machining; heat treating; and combinations and variations of these and other activities and operations.

The laser tools and down hole processes may also find application in other laser and laser assisted processes in, or associated with a borehole. For example the laser tools and processes may find application in lost circulation events. In this situation the drilling mud flows into the formation and will not return up the borehole. A polymer, or other material that interacts with the laser beams energy, wavelength or both, can be sent down the hole, this material is then alerted, unwound, expands, is release or melts or otherwise plugs that area where the lost circulation is occurring thus return the well to normal operations. An additional example would be the use of these laser tools and down hole processes to perform in situ refining of the hydrocarbons in the well bore, or in a pipe line as they are transported.

A single high power laser may be utilized in the system, tools and operations, or there may be two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths in the range from about 455 nm (nanometers) to about 2100 nm, preferably in the range about 800 nm to about 1600 nm, about 400 nm to about 800 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

An example of this general type of fiber laser is the IPG YLS-20000. The detailed properties of which are disclosed in US patent application Publication Number 2010/0044106.

Examples of lasers, conveyance structures, high power laser fibers, high power laser systems, optics, optics housings to isolate optics from vibration and environment conditions, break detection and safety monitoring, control systems, connectors, cutters, and other laser related devices, systems and methods that may be used with, in, or in conjunction with, the various embodiments of devices systems, tools, activities and operations set forth in this specification are disclosed and taught in the following US patent application publications and US patent applications: Publication Number 2010/0044106; Publication Number 2010/0044105; Publication Number 2010/0044103; Publication Number 2010/0215326; Publication Number 2012/0020631; Publication Number 2012/0074110; Publication No. 2012/0068086; Publication No. 2012/0248078; Ser. No. 13/403,723; Ser. No. 13/403,509; Ser. No. 13/486,795; Ser. No. 13/565,345; Ser. No. 61/605,429; Ser. No. 61/605,434; Ser. No. 13/782,869; and, Ser. No. 13/768,149, the entire disclosures of each of which are incorporated herein by reference.

In addition to the use of high power electromagnetic energy, such as high power laser beams, other forms of directed energy or means to provide the same, may be utilized in, in addition to, or in conjunction with the devices systems, tools, activities and operations set forth in this specification. Such directed energy could include, for example, non-optical stimulated emission electromagnetic energy, non-optical coherent electromagnetic energy, microwaves, sound waves, millimeter waves, plasma, electric arcs, flame, flame jets, steam and combinations of the foregoing, as well as, water jets and particle jets. It is noted, however, that each of these other such directed energies, has significant disadvantages when compared to high power laser energy. Nevertheless, the use of these other less preferred directed energy means is contemplated by the present inventions as directed energy means.

Generally, the laser systems and techniques of the present inventions can be, in part, directed to the cleaning, resurfacing, removal, and clearing away of unwanted materials, e.g., build-ups, deposits, corrosion, or substances, in, on, or around structures, e.g. the work piece, or work surface area. Such unwanted materials would include by way of example rust, corrosion, corrosion by products, degraded or old paint, degraded or old coatings, paint, coatings, waxes, NORM, hydrates, microbes, residual materials, biofilms, tars, sludges, and slimes. The laser energy of sufficient power and characteristics can be transported over great lengths and delivered to remote and difficult to access locations. In addition to the field of flow assurance, the present inventions would also find many applications and uses in other fields. Moreover, the present inventions would have uses and applications beyond oil, gas, geothermal and flow assurance, and would be applicable to the, cleaning, resurfacing, removal and clearing away of unwanted materials in any location that is far removed from a laser source, or difficult to access by conventional technology as well as assembling and monitoring structures in such locations.

The laser tools and systems may also have, or include a laser monitoring tool for illuminating a surface of a work piece to detect surface anomalies, cracks, corrosion, etc. In this type of laser monitoring tool, the laser beam may be scanned as a spot, or other shape, along the surface of the work area, in a pattern, or it may be directed to a surface in a continuous line that impacts some or all of the inner circumference of the inner wall of the work piece. The light reflect by and/or absorbed by the surface would then be analyzed to determine if any anomalies were present, identify their location and potentially characterize them. A laser radar type of system may be used for this application, a laser topographic system may be used for this application, as well as, other known laser scanning, measuring and analyzing techniques. The laser tool may also be, or have, a laser cutter that is used to remove unwanted material from a surface, cut a hole through, or otherwise remove a section of materials, such as milling a window in a well casing, or weld a joint between two sections of a structure, or repair a grout line between two section of structure by for example activating a heat activated grout material. The laser tool may be a laser illumination tool that provides sufficient high power laser energy to an area of the surface to kill or remove microbes and microbial related materials such as a biofilm. This type of laser illumination tool may also be used to clear and remove other materials, such as waxes, from an interior surface of for example a tank, a pipeline or a well. Combinations of laser tools, e.g., a cutter, an illuminator, a measurement tool, and non-laser tools, may be utilized in a single assembly, or they may be used in separate assemblies that are used sequentially or in parallel activities.

The various embodiments of devices systems, tools, activities and operations set forth in this specification may be used with various high power laser systems and conveyance structures and systems, in addition to those embodiments of the Figures in this specification. The various embodiments of devices systems, tools, activities and operations set forth in this specification may be used with: other high power laser systems that may be developed in the future: with existing non-high power laser systems, which may be modified, in-part, based on the teachings of this specification, to create a high power laser system; and with high power directed energy systems. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

It is also noted that the laser systems, methods, tools and devices of the present inventions may be used in whole or in part in conjunction with, in whole or in part in addition to, or in whole or in part as an alternative to existing methodologies for, e.g., monitoring, welding, cladding, annealing, heating, cleaning, drilling, advancing boreholes, controlling, assembling, assuring flow, drilling, machining, powering equipment, and cutting without departing from the spirit and scope of the present inventions. Additionally, it is noted that the sequence or timing of the various laser steps, laser activities and laser methods (whether solely based on the laser system, methods, tools and devices or in conjunction with existing methodologies) may be varied, repeated, sequential, consecutive and combinations and variations of these, without departing from the spirit and scope of the present inventions.

The invention may be embodied in other forms than those specifically disclosed herein without departing from its spirit or essential characteristics. The described embodiments are to be considered in all respects only as illustrative and not restrictive.

What is claimed:

1. A method for stimulation a hydrocarbon well using a high power laser system for performing laser operation on a material in a borehole in the earth, the method comprising:
   a. providing a laser beam having at least about 20 kW of power;
   b. launching the laser beam into a long distance high power transmission cable that extends from a surface of the earth to a depth within a borehole; thereby transmitting the laser beam within a borehole hole to a laser tool that is in the borehole and in optical communication with the high power transmission cable; and,
   c. wherein the laser tool comprises an outer structure capable of withstanding down hole conditions and having a high power laser optic assembly to provide an predetermined laser beam pattern to the interior of a surface of the borehole; the optic assembly comprising a collimator to provide a collimated circular laser beam, which follows ray trace lines to enter an axicon, wherein the laser beam travels through the axicon and whereby the laser beam exits the axicon in a beam pattern that initially is characterized as a Bessel pattern and then expands and becomes an annular ring pattern on the inner borehole surface; whereby the laser beam removes a material on the inner borehole surface.

2. A method of performing a laser operation in a borehole, using a high power laser system for performing in situ high power laser processing of a material in a borehole in the earth, the method comprising:
   a. positioning in the borehole a laser capability of providing a laser beam having at least about 20 kW of power;
   b. positioning in the borehole a long distance high power transmission cable for transmitting the high power laser;
   c. positioning in the borehole a high power in situ processing laser tool optically associated with the transmission cable and the laser;
   d. positioning in the borehole the laser tool positioned in the borehole adjacent an area of likely flow impediment; and,
   e. wherein the high power laser tool comprising: (i) a high power laser optic to provide the laser beam in a laser beam pattern and along a laser beam path; (ii) a laser flow passage, contained within the high power laser tool, the flow passage configured to operationally influence a flowing hydrocarbons in the borehole;
   f. propagating the laser beam along the laser beam path, whereby the laser beam path, at least in part, travels through the laser flow passage, wherein flowing hydrocarbons are capable of being processed by the laser beam delivered along the laser beam path in the laser beam pattern, whereby the hydrocarbons are process within the laser flow passage.

3. The method of claim 2, wherein the laser tool is located at least about 1,000 feet from a surface of the borehole.

4. The method of claim 2, wherein the laser tool is located at least about 2,000 feet from a surface of the borehole.

5. The method of claim 2, wherein the laser tool is located at least about 3,000 feet from a surface of the borehole.

6. The method of claim 2, wherein the laser tool is located at least about 1,000 feet from a surface of the borehole and the system comprises a second high power laser tool comprising a high power laser optic to provide the laser beam in a laser beam pattern and along a laser beam path, a laser flow passage, the flow passage configured to, at least in part, operationally influence the flowing hydrocarbons in the borehole.

7. The method of claim 2, wherein hydrocarbons are flowing in the borehole and the flowing hydrocarbon has at least about 0.4 wt % asphaltene.

8. The method of claim 2, wherein hydrocarbons are flowing in the borehole and the flowing hydrocarbon has at least about 4 wt % asphaltene.

9. The method of claim 2, wherein the system is capable of increasing the S-value of the flowing hydrocarbon by at about 0.05.

10. The method of claim 2, wherein the system is capable of increasing the S-value of the flowing hydrocarbon by at about 1.

11. A method of performing a laser operation in a borehole in the earth, using a high power laser system for performing in situ high power laser processing of a material in a borehole in the earth, the method comprising:
   a. positioning in the borehole a long distance high power transmission cable for transmitting the high power laser;
   b. positioning in the borehole a high power in situ processing laser tool optically associated with the transmission cable and positioned in the borehole; and,
   c. positioning in the borehole the high power laser tool comprising a high power laser optic assembly to provide the laser beam in a laser beam pattern and along a laser beam path, the laser beam path intersecting a borehole sidewall; the optic assembly comprising a collimator to provide a collimated circular laser beam, which follows ray trace lines to enter an axicon, wherein the laser beam travels through the axicon and whereby the laser beam exits the axicon in a beam pattern that initially is characterized as a Bessel pattern and then expands and becomes an annular ring pattern on the borehole sidewall;
   d. generating a laser beam along the laser beam path, wherein the laser beam path, at least in part, travels through a flow impediment material, whereby the flow impediment material is removed without damaging the sidewall of the borehole.

12. The method of claim 11, wherein the flow impediment material comprises at least about a 10% blockage of a passage in the borehole.

13. The method of claim 11, wherein the flow impediment material comprises at least about a 20% blockage of a passage in the borehole.

14. The method of claim 11, wherein the flow impediment material comprises at least about a 50% blockage of a passage in the borehole.

15. The method of claim 11, wherein the flow impediment material comprises at least about a 90% blockage of a passage in the borehole.

16. The method of claim 11, wherein the flow impediment material comprises at least about a 10% blockage of a passage in the borehole and the flow impediment material comprises a material selected from the group consisting of a precipitate, a solid, a paraffins, a wax, an asphaltene, a gas hydrate, a scale, Barium Sulfate, and calcium carbonate.

17. The method of claim 11, wherein the flow impediment material comprises at least about a 20% blockage of a passage in the borehole and the flow impediment material comprises a material selected from the group consisting of a precipitate, a solid, a paraffins, a wax, an asphaltene, a gas hydrate, a scale, Barium Sulfate, and calcium carbonate.

18. The method of claim 11, wherein the flow impediment material comprises at least about a 50% blockage of a passage in the borehole and the flow impediment material comprises a material selected from the group consisting of a precipitate, a solid, a paraffins, a wax, an asphaltene, a gas hydrate, a scale, Barium Sulfate, and calcium carbonate.

* * * * *